US008337353B2

United States Patent
Iwaki et al.

(10) Patent No.: US 8,337,353 B2
(45) Date of Patent: Dec. 25, 2012

(54) TRAVELING SYSTEM TRANSMISSION STRUCTURE FOR VEHICLE

(75) Inventors: Koji Iwaki, Hyogo (JP); Fumitoshi Ishino, Hyogo (JP); Hideki Kanenobu, Hyogo (JP); Kazunari Koga, Hyogo (JP); Norihiro Ishii, Hyogo (JP); Toshiaki Okanishi, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 703 days.

(21) Appl. No.: 12/549,077

(22) Filed: Aug. 27, 2009

(65) Prior Publication Data

US 2010/0051410 A1    Mar. 4, 2010

(30) Foreign Application Priority Data

Aug. 29, 2008  (JP) ................. 2008-221672
Jun. 24, 2009  (JP) ................. 2009-149356

(51) Int. Cl.
*F16H 47/04*   (2006.01)
(52) U.S. Cl. .......................... 475/73; 475/302
(58) Field of Classification Search .......... 475/72–74, 475/80, 83, 302; 74/15.4, 606 R, 665
See application file for complete search history.

(56) References Cited

U.S. PATENT DOCUMENTS

| 6,199,441 | B1 * | 3/2001 | Kanenobu et al. | 74/331 |
| 7,958,798 | B2 * | 6/2011 | Hasegawa | 74/325 |
| 2005/0192148 | A1 * | 9/2005 | Hasegawa et al. | 475/72 |
| 2008/0214348 | A1 * | 9/2008 | Hasegawa et al. | 475/80 |

FOREIGN PATENT DOCUMENTS

| EP | 1 329 354 A2 | 7/2003 |
| EP | 1 582 389 A2 | 10/2005 |
| EP | 1 906 055 A1 | 4/2008 |
| JP | 2003-130174 | 5/2003 |
| JP | 2003-276461 | 9/2003 |
| JP | 2008-202721 A | 9/2008 |
| WO | WO 2008/096473 A1 | 8/2008 |

OTHER PUBLICATIONS

Partial European Search Report for European Application No. EP 09 1688 16.8, European Patent Office, mailed Dec. 8, 2009, 6 pgs.
Extended European Search Report for European Application No. EP 09 1688 16.8, European Patent Office, mailed Feb. 17, 2010, 14 pgs.

* cited by examiner

*Primary Examiner* — Justin Holmes
*Assistant Examiner* — Huan Le
(74) *Attorney, Agent, or Firm* — Sterne, Kessler, Goldstein & Fox, P.L.L.C.

(57) ABSTRACT

The traveling system transmission structure for vehicle includes a planetary gear unit, a forward/rearward-travel switch unit and a transmission case. A front end portion of a sun gear shaft is directly or indirectly supported by a front bearing wall that is detachably connected to a front side of the transmission case and a rear end portion of a planetary outputting member is directly or indirectly supported by an intermediate bearing wall, so that the planetary gear unit is accommodated in a front chamber that is sandwiched by the front bearing wall and the intermediate bearing wall. A front end portion of a forward/rearward-travel input shaft is directly or indirectly supported by the intermediate bearing wall and a rear end portion of a clutch shaft is supported by a rear bearing wall that is detachably connected to the rear side of the transmission case, so that the forward/rearward-travel switch unit is accommodated in a rear chamber that is sandwiched by the intermediate bearing wall and the rear bearing wall.

7 Claims, 26 Drawing Sheets

TRAVELING SYSTEM TRANSMISSION STRUCTURE FOR VEHICLE

BACKGROUND OF THE INVENTION

1. Field of the Invention

The present invention relates to a traveling system transmission structure for a vehicle in which a planetary gear unit and a forward/rearward-travel switch unit are arranged in series.

2. Related Art

There has been publicly known a traveling system transmission structure including a planetary gear unit that has first and second components for receiving a constant-speed rotational power and a variable-speed rotational power respectively as well as a third component for outputting a combined rotational power of the constant-speed power and variable-speed rotational power, a forward/rearward-travel switch unit that operatively receives the combined rotational power outputted from the third component, and a transmission case that accommodates the planetary gear unit and the forward/rearward-travel switch unit (see, for example, Japanese Patent Unexamined Publication No. 2003-130174 (hereinafter, referred to as Patent Document 1)).

The traveling system transmission structure configured as described above can use a whole speed range of the variable-speed rotational power for each of forward and rearward variable speed ranges. Accordingly, this traveling system transmission structure is useful in expanding variable range of travel speed in which travel speed could be change in a non-stepwise manner without involving increase in size of a variable-speed rotational power outputting member, such as an electric motor or an HST, for outputting the variable-speed rotational power.

However, the conventional traveling system transmission structure described in Patent Document 1 has problems that the planetary gear unit is radially enlarged as well as that the planetary gear unit and the forward/rearward-travel switch unit are difficult to be assembled to the transmission case.

More specifically, the transmission case has a hollow peripheral wall part that configures an accommodating space for accommodating the planetary gear unit and the forward/rearward-travel switch unit, a rear support wall provided to the rear portion of the peripheral wall part, and a front support wall provided to the front portion of the peripheral wall part.

The forward/rearward-travel switch unit has a forward/rearward-travel input shaft that operatively receives the combined rotational power from the planetary gear unit, a forward/rearward-travel output shaft that outputs the rotational power to a travel unit, a forward/rearward-travel clutch mechanism that is capable of changing a rotational direction of the rotational power transmitted from the forward/rearward-travel input shaft to the forward/rearward-travel output shaft, and a clutch shaft that supports the forward/rearward-travel clutch mechanism.

The clutch shaft has a rear end supported by the rear support wall and a front end supported by the front support wall. The forward/rearward-travel clutch mechanism is supported by a rear portion of the clutch shaft that is positioned on a rear side, while the planetary gear unit is supported by a front portion of the clutch shaft that is positioned on a front side.

Specifically, the planetary gear unit has a hollow sun gear shaft provided with a sun gear that functions as the second component for receiving the variable-speed rotational power. The hollow sun gear shaft is externally inserted to the front portion of the clutch shaft, so that the planetary gear unit is accommodated in the accommodation space.

In other words, in the conventional traveling system transmission structure described in Patent Document 1, the clutch shaft, of which front end is supported by the front support wall and of which rear end is supported by the rear support wall, supports the planetary gear unit in addition to the forward/rearward-travel clutch mechanism.

In the configuration described above, the clutch shaft is required to have a large diameter in order to ensure enough strength thereof, which also requires increase in diameter of the sun gear shaft to be externally inserted to the clutch shaft.

The planetary gear unit needs be radially enlarged in order to obtain a predetermined speed reduction ratio with use of the sun gear shaft of a large diameter.

Further, in the conventional traveling system transmission structure described in Patent Document 1, the rear end of the clutch shaft is supported by the rear support wall that is formed integrally with the peripheral wall part, and the front end thereof is supported by the front support wall that is detachably connected to the front portion of the peripheral wall part. The forward/rearward-travel clutch mechanism and the planetary gear unit are supported by the clutch shaft that is supported by the rear support wall and the front support wall.

In the configuration described above, the forward/rearward-travel switch unit and the planetary gear unit need to be installed into the transmission case from the front end thereof, thereby resulting in another problem of deteriorated efficiency in assembling these units into the transmission case.

As disclosed in Japanese Patent Unexamined Publication No. 2003-276461 (hereinafter, referred to as Patent Document 2), there is another traveling system transmission structure including a planetary gear unit that has first and second components for receiving a constant-speed rotational power and a variable-speed rotational power respectively, as well as a third component for outputting a combined rotational power of the constant and variable-speed rotational powers, and a forward/rearward-travel switch unit that operatively receives the combined rotational power outputted from the third component, in which the constant-speed rotational power and the variable-speed rotational power are operatively transmitted from a pump shaft and a motor shaft of an HST respectively to the first and second components of the planetary gear unit.

In short, Patent Document 2 proposes the vehicle traveling system transmission structure that realizes an expanded variable range of travel speed in which travel speed could be changed in a non-stepwise manner by arranging the HST, the planetary gear unit and the forward/rearward-travel switch unit in series.

Specifically, the conventional traveling system transmission structure described in Patent Document 2 includes the HST that non-stepwisely changes a speed of the constant-speed rotational power, which has been operatively transmitted from a driving power source, into both normal and reverse directions and also outputs the changed variable-speed rotational power, the planetary gear unit that has the first component for operatively receiving the constant-speed rotational power from the driving power source, the second component for operatively receiving the variable-speed rotational power from the HST, and the third component for outputting a combined rotational power, the forward/rearward-travel switch unit that has a driving side for operatively receiving the rotational power from the third component and a driven side capable of outputting any one of forward and rearward rotational powers, and a speed-change operating member and a forward/rearward-travel switch operating member both of which can be manually operated.

The HST is configured so as to be shifted from a first maximum output state of outputting the rotational power that has a maximum rotational speed in one of the normal and reverse directions to a second maximum output state of outputting the rotational power that has a maximum rotational speed in the other of the normal and reverse directions. The planetary gear unit is shifted from a substantially non-output state to a maximum output state as the HST is shifted from the first maximum output state to the second maximum output state.

The traveling system transmission structure configured as described above can use a whole variable speed range of the HST that includes a normal rotation range and a reverse rotation range for each of the forward and rearward travel variable speed ranges, thereby being useful in expanding the variable range of travel speed in which the travel speed can be changed in a non-stepwise manner without involving increase of the HST in size. However, on the other hand, there arise problems that the HST and the planetary gear unit need to be accurately manufactured as well as to be controlled with higher accuracy in order to realize a vehicle stop state.

More specifically, in order to cause the vehicle to be stopped, the vehicle including the traveling system transmission structure configured so that the planetary gear unit is shifted from the substantially non-output state to the maximum output state as the HST that is shifted from the first maximum output state to the second maximum output state, it is necessary to accurately perform, with no variation, manufacture and assembly of the HST as well as establishment of the connection between the HST and the speed-change operating member such that the HST is accurately in the first maximum output state when the speed-change operating member is located at the initial position. Furthermore, in order that the planetary gear unit is in the non-output state when the HST is in the first maximum output state, it is necessary to accurately manufacture the respective gears of the planetary gear unit inclusive of a large number of components as well as to strictly control engagement among the respective gears.

It is possible to bring the planetary gear unit into the non-output state by repeatedly performing a cycle of electrically monitoring the non-output state of the planetary gear unit, determining with use of a controller whether or not the planetary gear unit is in the non-output state, and, in a case where the planetary gear unit is not in the non-output state, changing the output state of the HST so that the planetary gear unit is brought into the non-output state. However, repetition of such control cycles possibly causes hunting motion of the vehicle as well as requires highly accurate control.

SUMMARY OF THE INVENTION

In view of the prior art, it is a first object of the present invention to provide a traveling system transmission structure for a vehicle including a planetary gear unit that has a first component and a second component for respectively receiving a constant-speed rotational power and a variable-speed rotational power and also has a third component for outputting a combined rotational power formed by combining the rotational powers of the first and second components, a forward/rearward-travel switch unit that operatively receives the combined rotational power outputted from the third component, and a transmission case that accommodates the planetary gear unit and the forward/rearward-travel switch unit, the traveling system transmission structure being capable of enhancing freedom regarding reduction ration of the planetary gear unit without involving enlargement of the planetary gear unit as well as improving efficiency in assembling the planetary gear unit and the forward/rearward-travel switch unit into the transmission case.

Further, it is a second object of the present invention to provide a traveling system transmission structure for a vehicle in which an HST, a planetary gear unit is connected one another in series, the HST is shifted in a non-stepwise manner from a first maximum output state of outputting the rotational power that has a maximum rotational speed in one of the normal and reverse directions to a second maximum output state of outputting the rotational power that has a maximum rotational speed in the other one of the normal and reverse directions in accordance with manipulation of a speed-change operating member from an initial position to a maximum operating position, and the planetary gear unit is shifted from a substantially non-output state to a maximum output state as the HST is shifted from the first maximum output state to the second maximum output state, the traveling system transmission structure being capable of reliably realizing a vehicle stop state without necessity of strict accuracy in manufacturing and assembling the HST and the planetary gear unit as well as necessity of strict accuracy of control.

In order to achieve the first object, a first aspect of the present invention provides a traveling system transmission structure for a vehicle including a planetary gear unit that has a first component and a second component for respectively receiving a constant-speed rotational power and a variable-speed rotational power and also has a third component for outputting a combined rotational power formed by combining the rotational powers of the first and second components, a forward/rearward-travel switch unit that operatively receives the combined rotational power outputted from the third component, and a transmission case that accommodates the planetary gear unit and the forward/rearward-travel switch unit, the traveling system transmission structure being configured as follows.

The transmission case has a front opening that is provided on a front side and has such a size as to allow the planetary gear unit to be inserted therethrough, a rear opening that is provided on a rear side and has such a size as to allow the forward/rearward-travel switch unit to be inserted therethrough, and an intermediate bearing wall that is provided at an intermediate portion in a fore-and-aft direction.

The planetary gear unit has a sun gear shaft that supports a sun gear in a relatively non-rotatable manner with respect thereto, the sun gear functioning as one of the first and second components, and a planetary outputting member that is connected to the third component in a relatively non-rotatable manner with respect thereto about the axis line of the planetary gear unit.

The forward/rearward-travel switch unit has a forward/rearward-travel input shaft that operatively receives the combined rotational power, a forward/rearward-travel output shaft that outputs the rotational power to a travel unit, a forward/rearward-travel clutch mechanism capable of changing the rotational direction of the rotational power transmitted from the forward/rearward-travel input shaft to the forward/rearward-travel output shaft, and a clutch shaft that is disposed coaxially with the forward/rearward-travel input shaft and supports the forward/rearward-travel clutch mechanism.

A front end portion of the sun gear shaft is directly or indirectly supported in a rotatable manner around the axis line by a front bearing wall that is detachably connected to a front side of the transmission case and a rear end portion of the planetary outputting member is directly or indirectly supported in a rotatable manner around the axis line by the intermediate bearing wall, so that the planetary gear unit is accommodated in a front chamber that is sandwiched by the front bearing wall and the intermediate bearing wall.

A front end portion of the forward/rearward-travel input shaft is directly or indirectly supported by the intermediate bearing wall in a rotatable manner around the axis line in a state of being connected to the planetary outputting member so as to be relatively non-rotatable with respect thereto about the axis line and a rear end portion of the clutch shaft is supported in a rotatable manner around the axis line by a rear bearing wall that is detachably connected to the rear side of the transmission case, so that the forward/rearward-travel switch unit is accommodated in a rear chamber that is sandwiched by the intermediate bearing wall and the rear bearing wall.

The traveling system transmission structure for a vehicle according to the first aspect of the present invention makes it possible to enhance freedom regarding reduction ration of the planetary gear unit without involving enlargement of the planetary gear unit, and also improve efficiency in assembling the planetary gear unit and the forward/rearward-travel switch unit into the transmission case.

In a preferable configuration, the planetary output shaft has a connecting portion that is connected to the third component, and a hollow cylindrical portion that extends from the connecting portion toward the forward/rearward-travel switch unit and is directly or indirectly supported by the intermediate bearing wall.

The front end portion of the forward/rearward-travel input shaft is fitted into the cylindrical portion from the rear side of the cylindrical portion so as to be relatively non-rotatable with respect thereto about the axis line.

The sun gear shaft has a rear end portion that is inserted into the cylindrical portion from the front side of the cylindrical portion so as to be faced the front end of the forward/rearward-travel input shaft and is supported by the cylindrical portion in a relatively rotatable manner with respect thereto about the axis line.

In a case where the forward/rearward-travel clutch mechanism is of a hydraulic clutch type, and the clutch shaft is formed with a forward/rearward-travel lubricant fluid supply channel for guiding lubricant fluid from a fluid source to the forward/rearward-travel clutch mechanism, the forward/rearward-travel input shaft may be preferably formed with a lubricant fluid connective channel that has a front end opened at the front end surface of the forward/rearward-travel input shaft inside the cylindrical portion in a state of being fluidly connected to the forward/rearward-travel lubricant fluid supply channel, and the sun gear shaft may be formed with a lubricant fluid introductive channel that has a rear end opened at the rear end surface of the sun gear shaft inside the cylindrical portion, so that the lubricant fluid is introduced from the front end of the lubricant fluid connective channel to the rear end of the lubricant fluid introductive channel through the cylindrical portion.

In one configuration, the forward/rearward-travel input shaft and the clutch shaft are formed integrally with each other by a single shaft.

In this case, the intermediate bearing wall may include a planetary-gear-unit-side support region that supports the cylindrical portion via a bearing member, a forward/rearward-travel-switch-unit-side support region that supports the single shaft via a bearing member, and an intermediate region that is located between the planetary-gear-unit-side support region and the forward/rearward-travel-switch-unit-side support region.

The intermediate region is formed with a forward/rearward-travel lubricant rotary joint that fluidly connects an intermediate-bearing-wall-side forward/rearward-travel lubricant fluid channel, which is formed in the intermediate bearing wall, with the forward/rearward-travel lubricant fluid supply channel or the lubricant fluid connective channel.

For example, the planetary gear unit may have a carrier that support a planetary gear, which engages with the sun gear, in a rotatable manner around the axis line and revolve about the sun gear together with the planetary gear, the carrier functioning as one of the first to third components; an internal gear that is provided with an internal teeth in engagement with the planetary gear and functions as the other one of the first to third components; a carrier supporting member that supports the carrier so as to be rotated about the sun gear together with the carrier 41; and a rotational power input gear that is connected to one of the carrier supporting member and the internal gear so as to transmit the constant-speed rotational power or the variable-speed rotational power to the same one of the carrier supporting member and the internal gear, the rotational power input gear being supported by the sun gear shaft in a relatively rotatable manner with respect thereto.

The carrier supporting member may have a front wall that is provided with a front support hole for supporting a front end of the carrier and a central opening for allowing the sun gear shaft to be inserted therethrough, a rear wall that is provided with a rear support hole for supporting the rear end of the carrier and a central opening for allowing the sun gear shaft to be inserted therethrough, and a connecting portion for connecting the front wall with the rear wall.

In the configuration, a fluid pocket space is preferably provided in at least one of between the front wall and the rotational power input gear and between the rear wall and the planetary outputting member so as to radially extend with the sun gear shaft as a reference, the fluid pocket space having a radially inner portion opened toward the outer peripheral surface of the sun gear shaft and a radially outer portion opened toward the corresponding end of the carrier.

The sun gear shaft is formed with a carrier lubricant fluid distributive channel that has a first end fluidly connected to the lubricant fluid introductive channel and a second end opened at the outer peripheral surface of the sun gear shaft so as to be directed to the fluid pocket space.

The carrier is formed with a planetary gear lubricant fluid channel having a first end opened at an end of the carrier that faces the fluid pocket space and a second end opened at the outer surface of a portion of the carrier that supports the planetary gear.

More preferably, the radially inner portion of the fluid pocket space is opened toward the outer peripheral surface of the sun gear shaft over an entire region in a circumferential direction.

In a preferable configuration, the front wall, the rear wall and the connecting portion may be formed integrally together such that the carrier supporting member has a planetary gear accommodation space that is sandwiched by the front wall and the rear wall and is located at a position corresponding to the front support hole and the rear support hole in the circumferential direction.

The planetary gear accommodation space has a radially inner portion opened inward so as to allow the planetary gear to be engaged with the sun gear, and a radially outer portion opened outward so as to allow the planetary gear to be inserted from radially outside into the planetary gear accommodation space.

In order to achieve the second object, a second aspect of the present invention provides a traveling system transmission structure for a vehicle including an HST capable of changing speed of a constant-speed rotational power, which has been operatively input from a driving power source, in a non-stepwise manner in both of normal and reverse directions and outputting the same; a planetary gear unit that has a first component operatively receiving the constant-speed rotational power from the driving power source, a second component operatively receiving a variable-speed rotational power from the HST and a third component outputting a combined rotational power formed by combining the rotational powers of the first and second components; a forward/rearward-travel switch unit that has a driving side operatively receiving the rotational power from the third component and a driven side outputting toward a driving wheel the rotational power as one of forward and rearward rotational powers; a speed-change operating member and a forward/rearward-travel switch operating member both of which are capable of being manually operated, wherein the HST is shifted in a non-stepwise manner from a first maximum output state of outputting the rotational power that has a maximum rotational speed in one of the normal and reverse directions to a second maximum output state of outputting the rotational power that has a maximum rotational speed in the other one of the normal and reverse directions in accordance with manipulation of the speed-change operating member from an initial position to a maximum operating position, and the planetary gear unit is shifted from a substantially non-output state to a maximum output state as the HST is shifted from the first maximum output state to the second maximum output state, the traveling system transmission structure being configured as follows.

The traveling system transmission structure further includes an HST output detecting member that directly or indirectly detects the output state of the HST; a hydraulic brake unit that operatively applies a braking power to the driving wheel in accordance with supply or discharge of hydraulic fluid; a brake solenoid valve that switches between supply and discharge of hydraulic fluid with respect to the hydraulic brake unit, the brake solenoid valve taking a brake actuating position and a brake release position that causes the hydraulic brake unit to be brought into a brake actuating state and a brake release state, respectively, and a control unit that controls positioning of the brake solenoid valve.

The control unit locates the brake solenoid valve at the brake actuating position upon determination that, based on a signal from the HST output detecting member, the HST is in a power-neutral output state within a predetermined range with the first maximum output state as the reference.

The traveling system transmission structure for a vehicle according to the second aspect of the present invention makes it possible to effectively expand a variable range of travel speed in both forward-travel and rearward-travel directions.

Further, the travel system transmission structure makes it possible to reliably realize the vehicle stop state without necessity of strict accuracy in manufacturing and assembling the HST and the planetary gear unit as well as necessity of strict accuracy of control, since the travel system transmission structure includes the hydraulic brake unit that operatively applies a braking power to the driving wheel in accordance with supply or discharge of hydraulic fluid and is configured so as to cause the hydraulic brake unit to be brought into a brake actuating state upon the power-neutral state of the HST in which the output of the HST is fallen within a predetermined range with the maximum rotational speed in one of the normal and reverse directions with a reference.

In the configurations, the forward/rearward-travel switch unit may be brought into a forward-travel power-transmission state at which the driven side rotates in the forward-travel direction, a rearward-travel power-transmission state at which the driven side rotates in the rearward-travel direction, and a power-transmission disengagement state at which the driven side is disengaged from the driving side, in accordance with supply or discharge of hydraulic fluid.

The traveling system transmission structure further includes a forward/rearward-travel switch-position detecting member that detects an operating position of the forward/rearward-travel switch operating member, and a forward/rearward-travel solenoid valve that switches between supply and discharge of hydraulic fluid with respect to the forward/rearward-travel switch unit, the forward/rearward-travel solenoid valve taking a forward-travel position, a rearward-travel position and an interrupting position that cause the forward/rearward-travel switch unit to be brought into the forward-travel power-transmission state, the rearward-travel power-transmission state and the power-transmission disengagement state, respectively.

The control unit performs the position-control of the forward/rearward-travel solenoid valve based on the signal from the forward/rearward-travel switch-position detecting member, and forcibly locates the forward/rearward-travel solenoid valve at the interrupting position when the control unit determines that the HST is in the power-neutral output state based on the signal from the HST output detecting member.

In a preferable configuration, the traveling system transmission structure further includes a vehicle body case that includes an internal space for accommodating the HST, the planetary gear unit and the forward/rearward-travel switch unit, a constant-speed power input shaft that is supported by the vehicle body case so as to be disposed along a vehicle lengthwise direction in a state of operatively receiving the constant-speed rotational power from a pump shaft of the HST and is also operatively connected to the first component, a variable-speed power input shaft that is supported by the vehicle body case so as to be substantially parallel to the constant-speed power input shaft in a state of operatively receiving the variable-speed rotational power from a motor shaft of the HST and is also operatively connected to the second component, a forward/rearward-travel driving shaft that functions as the driving side of the forward/rearward-travel switch unit, the forward/rearward-travel driving shaft being disposed on a rear side of and coaxially with the variable-speed power input shaft, and being operatively connected to the third component, a forward/rearward-travel driven shaft that functions as the driven side of the forward/rearward-travel switch unit, the forward/rearward-travel driven shaft being disposed on a rear side of and coaxially with the constant-speed power input shaft, a bearing wall provided in the vehicle body case so as to directly or indirectly support rear ends of the constant-speed power input shaft and the variable-speed power input shaft as well as front ends of the forward/rearward-travel driving shaft and the forward/rearward-travel driven shaft.

The forward/rearward-travel switch unit includes a forward-travel hydraulic clutch of hydraulically-actuated type that realizes and releases the forward-travel power-transmission state in response to supply and discharge of hydraulic fluid, respectively, and a rearward-travel hydraulic clutch of hydraulically-actuated type that realizes and releases the rearward-travel power-transmission state in response to supply and discharge of hydraulic fluid, respectively.

The forward-travel hydraulic clutch and the rearward-travel hydraulic clutch are supported by the forward/rearward-travel driving shaft, and the hydraulic brake unit is supported by the forward/rearward-travel driven shaft.

The forward/rearward-travel driving shaft is formed with a forward-travel-clutch axial hole and a rearward-travel-clutch axial hole for supplying and discharging hydraulic fluid with respect to the forward-travel hydraulic clutch and the rearward-travel hydraulic clutch, respectively.

The bearing wall is formed with a forward-travel-clutch fluid channel and a rearward-travel-clutch fluid channel that are fluidly connected to the forward-travel-clutch axial hole and the rearward-travel-clutch axial hole through respective rotary joints, and a brake fluid channel that supplies and discharge hydraulic fluid with respect to the hydraulic brake unit.

BRIEF DESCRIPTION OF THE DRAWINGS

The above, and other objects, features and advantages of the present invention will become apparent from the detailed description thereof in conjunction with the accompanying drawings therein.

FIGS. 25A to 25D are a relationship between time and an operating position of a speed-change operating member, a relationship between time and an angle of a movable swash plate of the HST, a relationship between time and a clutch pressure of the forward/rearward-travel switch unit, and a relationship between time and a vehicle traveling speed.

DETAILED DESCRIPTION OF THE PREFERRED EMBODIMENTS

First Embodiment

Described below with reference to the accompanying drawings is a traveling system transmission structure of a vehicle according to a preferred embodiment of the present invention.

Figure 1:
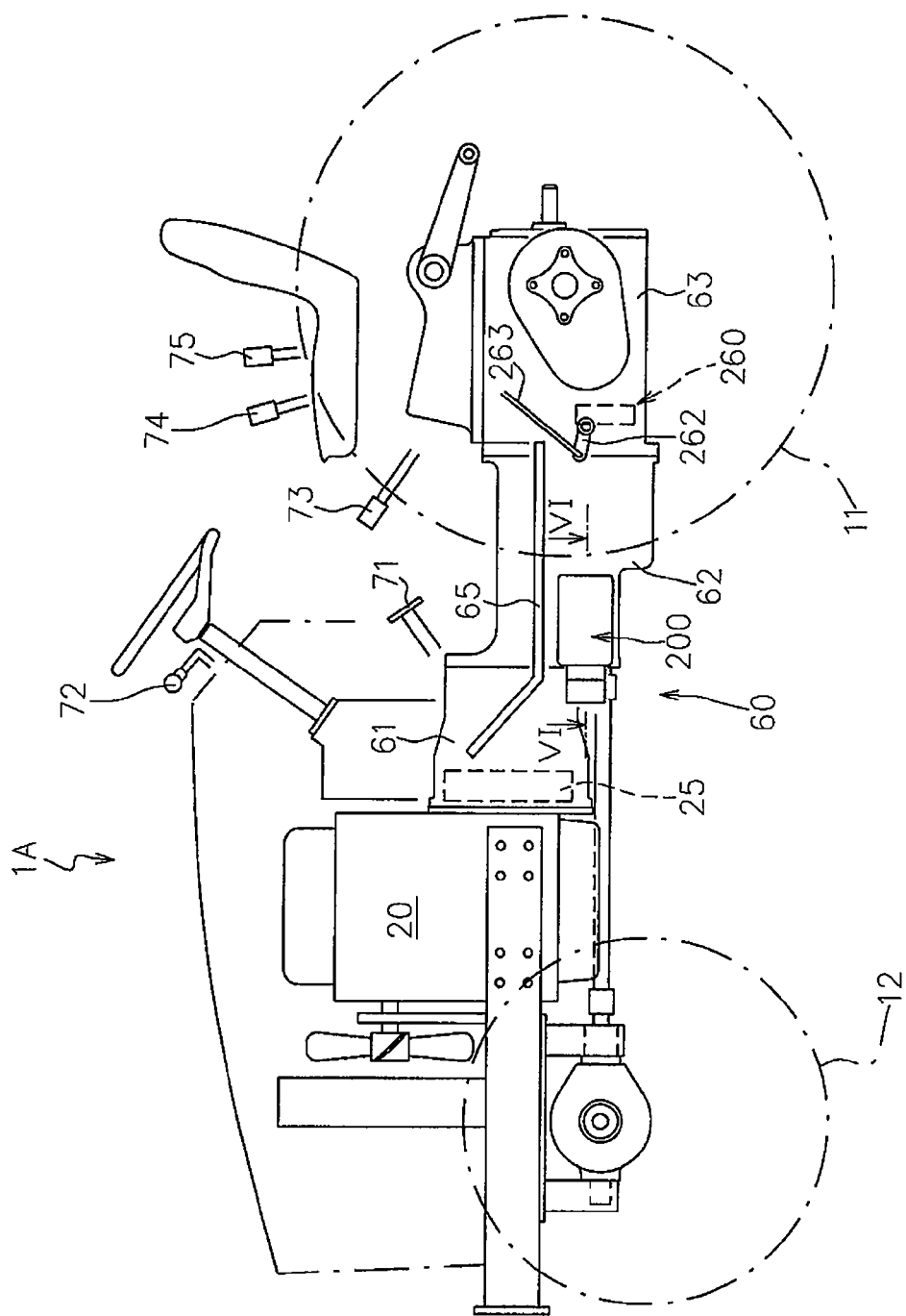
FIG. 1 is a side view of a working vehicle to which a traveling system transmission structure according to a first embodiment of the present invention is applied.

FIG. 1 is a side view of a tractor exemplified as a working vehicle 1A to which the traveling system transmission structure according to the present embodiment is applicable.

Figure 2:
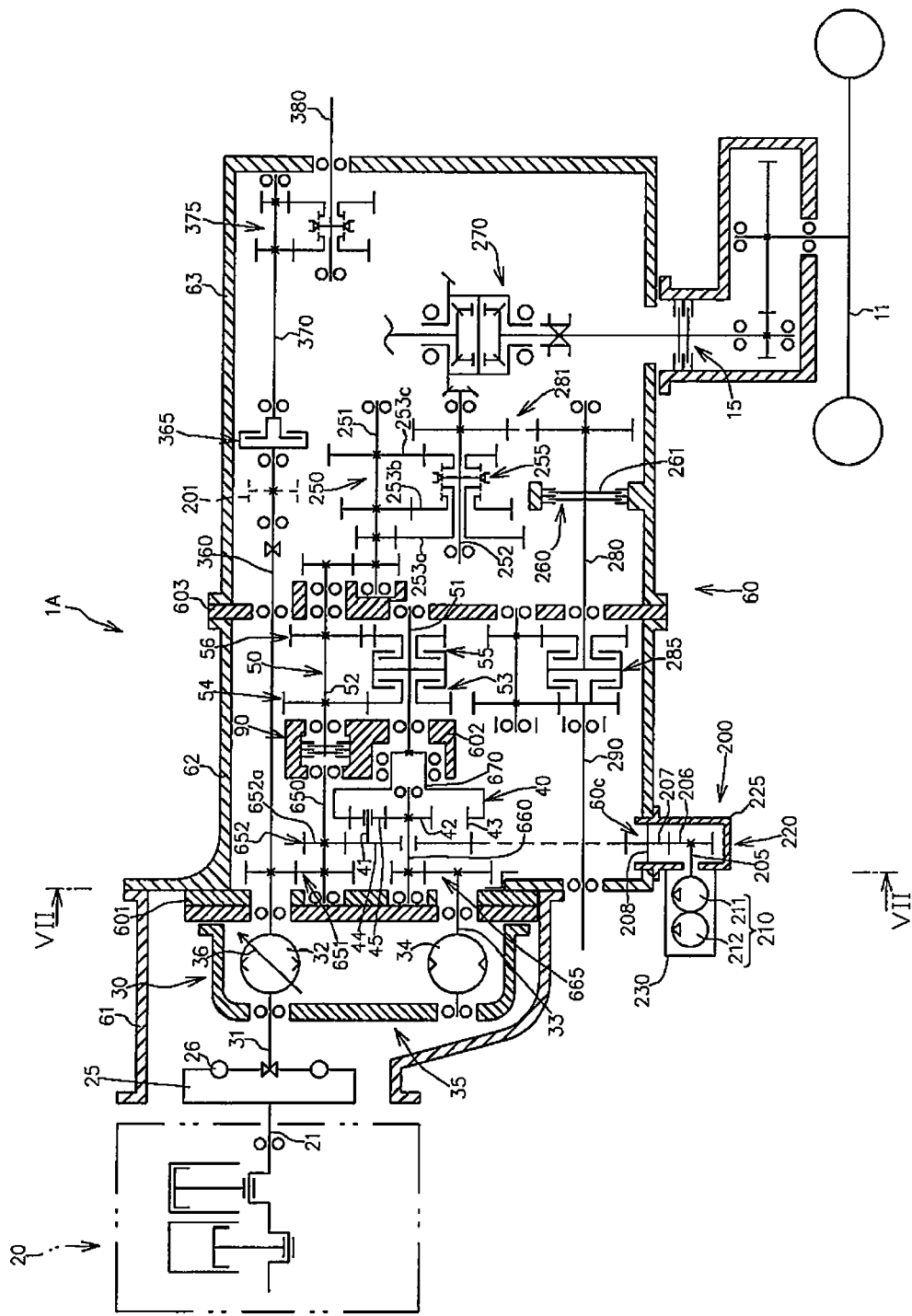
FIG. 2 is a schematic view of a power transmission the working vehicle shown in FIG. 1.
Figure 3:
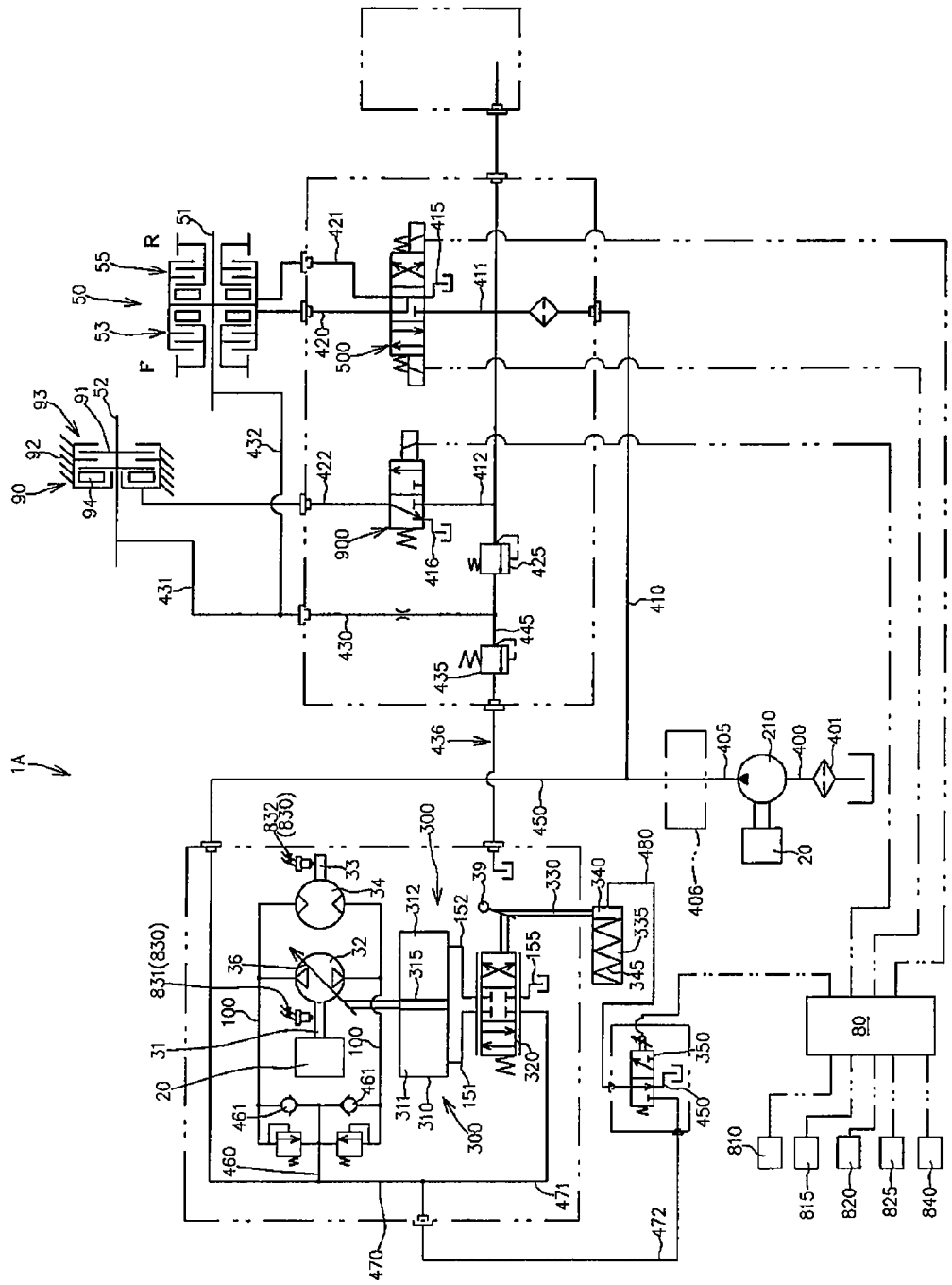
FIG. 3 is a hydraulic circuit diagram of the working vehicle shown in FIGS. 1 and 2.

FIGS. 2 and 3 are a schematic view of a power transmission and a hydraulic circuit diagram of the working vehicle 1A, respectively.

As shown in FIGS. 1 to 3, the working vehicle 1A includes main driving wheels 11 and sub driving wheels 12 that are disposed on a first side (a rear side in the present embodiment) and on a second side (a front side in the present embodiment) respectively in a vehicle lengthwise direction, a driving power source 20, an HST 30 that is operatively driven by the driving power source 20 and functions as a main speed-change unit, a planetary gear unit 40 that operatively receives a constant-speed rotational power from the driving power source 20 as well as a variable-speed rotational power from the HST 30 and outputs a combined rotational power, a forward/rearward-travel switch unit 50 that operatively receives a rotational power from the planetary gear unit 40 and is capable of outputting toward the main driving wheels 11 the rotational power as one of forward and rearward rotational powers, and a vehicle body case 60 that includes a transmission case 62 for accommodating the HST 30, the planetary gear unit 40 and the forward/rearward-travel switch unit 50, and configures a vehicle frame.

In the working vehicle 1A, the rotational power from the driving power source 20 is transmitted to the main driving wheels 11 (and the auxiliary driving wheel 12) by way of the HST 30, the planetary gear unit 40 and the forward/rearward-travel switch unit 50, in a state that its rotational speed is changed.

In short, the HST 30, the planetary gear unit 40 and the forward/rearward-travel switch unit 50 form a principal part of the traveling system transmission structure.

As shown in FIG. 2, the HST 30 is operatively connected to the driving power source 20 via a flywheel 25.

More specifically, the working vehicle 1A further includes the flywheel 25 that is supported by an output shaft 21 of the driving power source 20 in a relatively non-rotatable manner with respect thereto, and a flywheel housing 61 that is connected to a front portion of the transmission case 62 so as to surround the flywheel 25. The HST 30 has a pump shaft 31 that is connected to the flywheel 25 via a damper 26.

The flywheel housing 61 together with the transmission case 61 forms the vehicle body case 60.

Figure 4A:
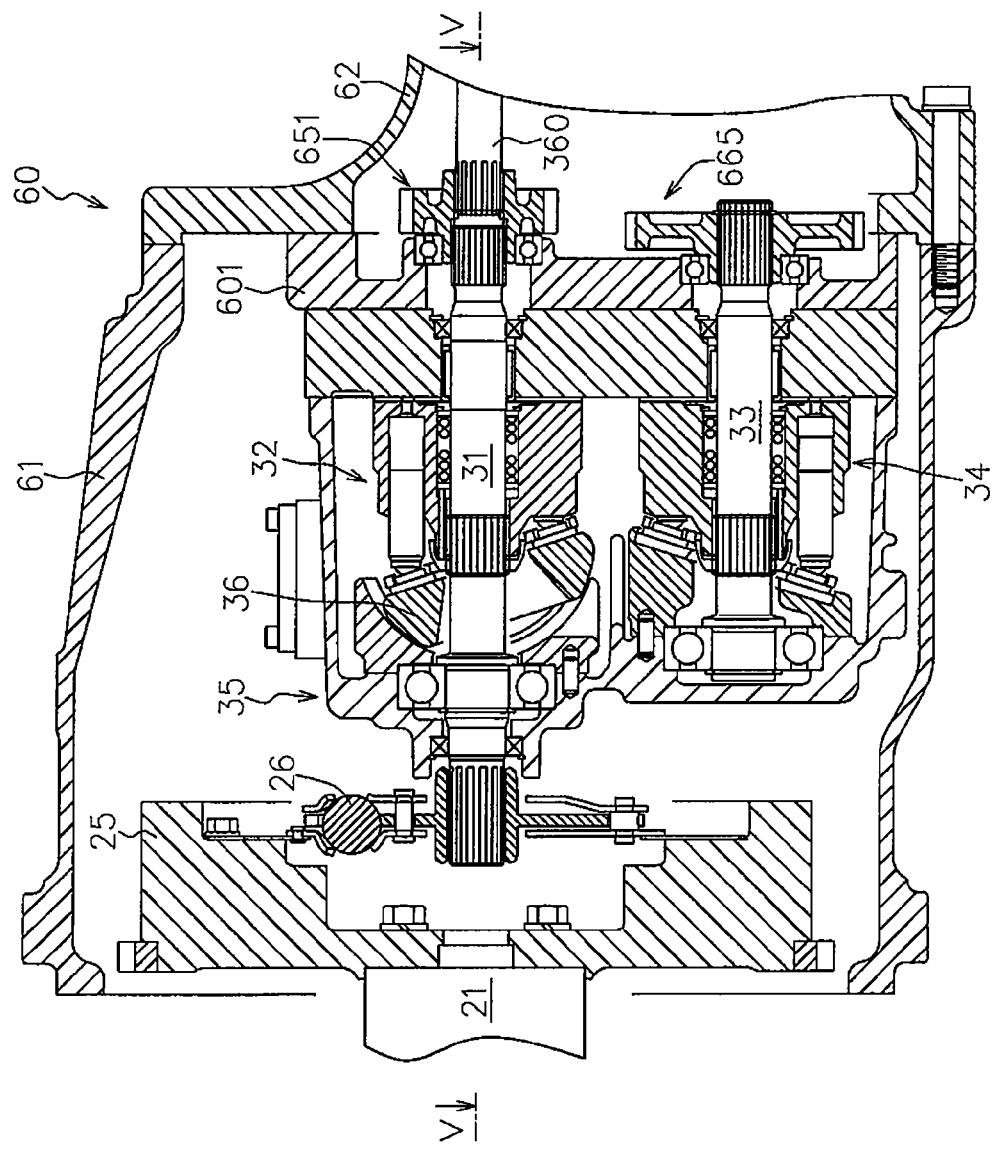
FIG. 4A is a vertical cross-sectional side view of a front portion of a vehicle body case in the working vehicle.
Figure 4B:
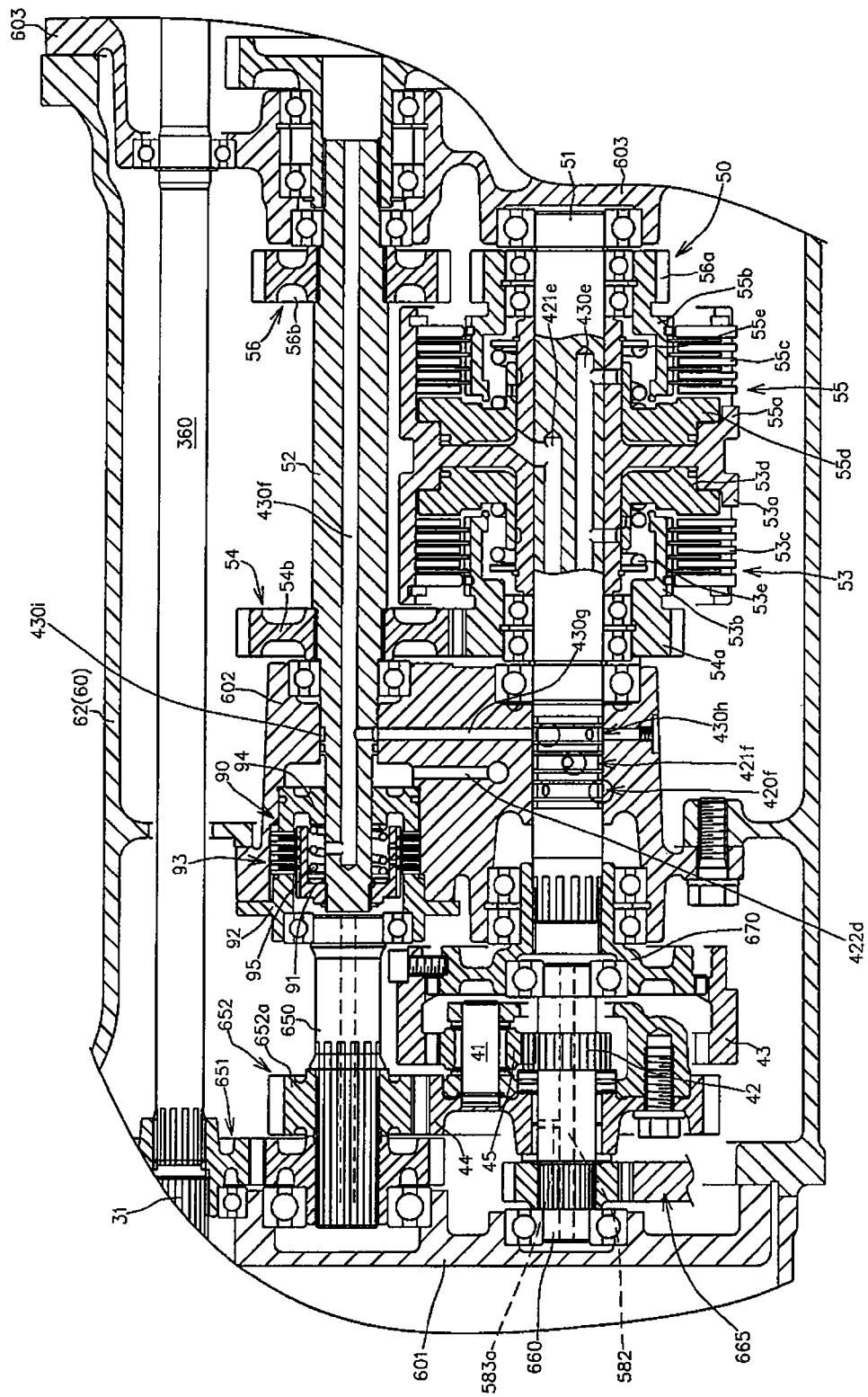
FIG. 4B is a vertical cross-sectional side view of a rear portion of the vehicle body case.

FIGS. 4A and 4B are vertical cross-sectional side views of the vehicle body case 60 that includes the flywheel housing 61 and the transmission case 62.

FIGS. 4A and 4B show a front portion and a rear portion of the vehicle body case 60, respectively.

Figure 5:
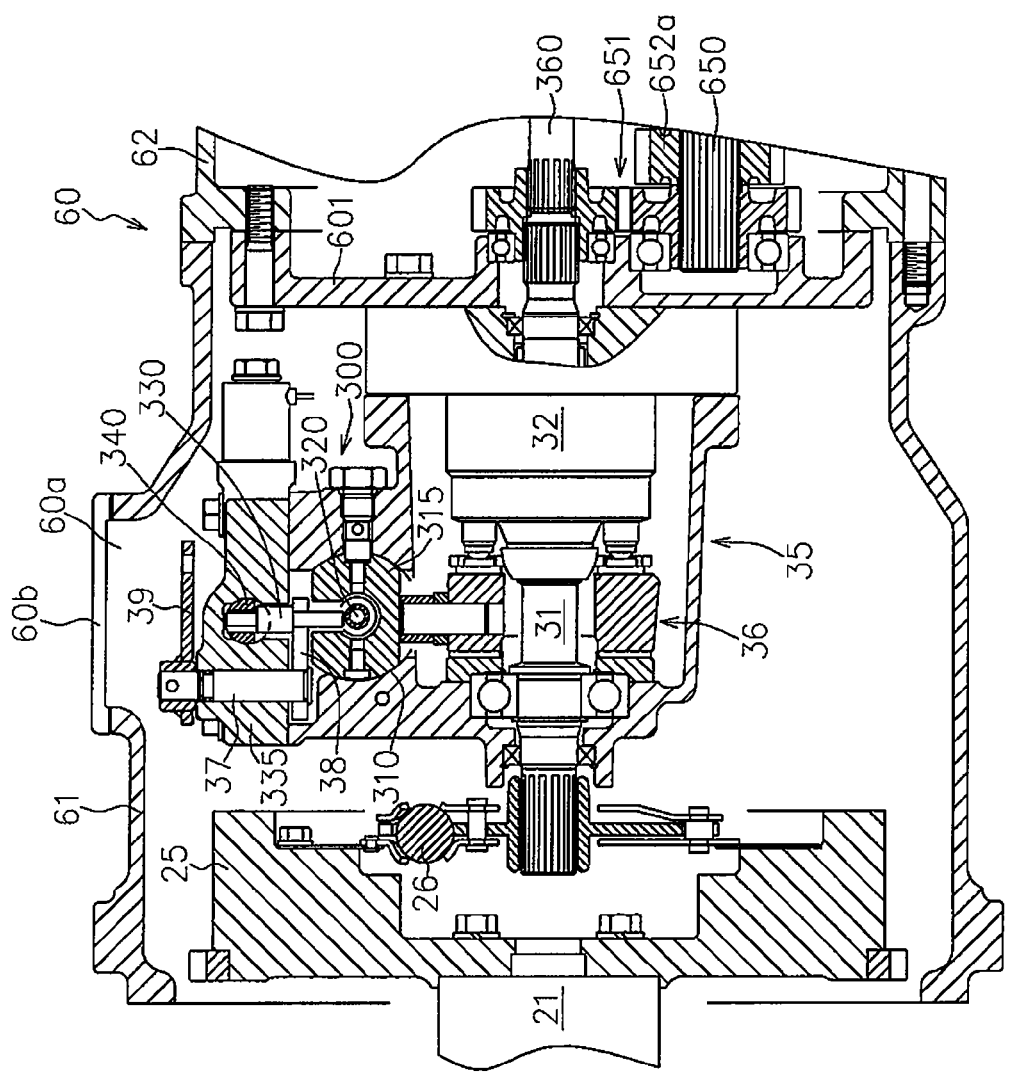
FIG. 5 is a horizontal cross-sectional plan view taken along line V-V indicated in FIG. 4A.

FIG. 5 is a horizontal cross-sectional plan view taken along line V-V indicated in FIG. 4A.

As shown in FIGS. 2, 3, 4A, and 5, the HST 30 has the pump shaft 31 that is operatively connected to the driving power source 20, a hydraulic pump main body 32 that is supported by the pump shaft 31 in a relatively non-rotatable manner with respect thereto, a hydraulic motor main body 34 that is fluidly connected to the hydraulic pump main body 32 via a pair of HST lines 100, a motor shaft 33 that supports the hydraulic motor main body 34 in a relatively non-rotatable manner with respect thereto, and an HST case 35 that accommodates the hydraulic pump main body 32 and the hydraulic motor main body 34 as well as supports the pump shaft 31 and the motor shaft 33 in a rotatable manner around respective axis lines.

Both of the hydraulic pump main body 32 and the hydraulic motor main body 34 are of the axial piston type, at least one of which is of the variable displacement type.

As shown in FIGS. 2, 3, and 5, in the present embodiment, the hydraulic pump main body 32 is of the variable displacement type while the hydraulic motor main body 34 is of the fixed displacement type.

More specifically, the HST 30 is further provided with, in addition to the components recited above, an output adjusting member 36.

The output adjusting member 36 may have a movable swash plate that changes a suction/discharge amount of the hydraulic pump main body 32 in accordance with its slanting position about a swing reference line.

In the present embodiment, the HST 30 is capable of outputting both normal and reverse rotational powers from the motor shaft 33.

More specifically, the movable swash plate is made slantable from a neutral position into both of one and the other directions about the swing reference line. The motor shaft 33 has a rotational speed that is increased in the normal direction in accordance with the slanting amount of the movable swash plate in the one direction about the swing reference line, and the motor shaft 33 has a rotational speed that is increased in the reverse direction in accordance with the slanting amount of the movable swash plate in the other direction about the swing reference line.

In the present embodiment, as shown in FIGS. 3 and 5, the HST 30 has a hydraulic servo mechanism 300 for operating the output adjusting member.

As shown in FIGS. 3 and 5, the hydraulic servo mechanism 300 has a servo cylinder 310 that is provided so as to extend perpendicularly to the pump shaft 31 in a thick portion of a first side wall of the HST case 35, a servo piston 315 that is accommodated in the servo cylinder 310 in a reciprocating manner while liquid-tightly dividing an internal space of the servo cylinder 310 into a first fluid chamber 311 and a second fluid chamber 312, a first supply/discharge line 151 and a second supply/discharge line 152 that are fluidly connected to the first fluid chamber 311 and the second fluid chamber 312 respectively, a servo switch valve 320 that switches between supply and exhaust of hydraulic fluid with respect to the first supply/discharge line 151 and the second supply/discharge line 152, and a servo solenoid valve 350 that controls positioning of the servo switch valve 320.

The servo piston 315 is accommodated in the servo cylinder 310 in a reciprocating manner in a state of being directly or indirectly connected to the movable swash plate. When the hydraulic fluid is supplied to the first fluid chamber 311 and is exhausted from the second fluid chamber 312, the servo piston 315 causes the movable swash plate to swing in one of the normal and reverse directions about the swing reference line. On the other hand, when the hydraulic fluid is exhausted from the first fluid chamber 311 and is supplied to the second fluid chamber 312, the servo piston 315 causes the movable swash plate to swing in the other of the normal and reverse directions about the swing reference line.

The servo switch valve 320 is accommodated in the servo piston 315 in a reciprocating manner and is configured so as to selectively take a first position of supplying hydraulic fluid to the first supply/discharge line 151 and discharging hydraulic fluid from the second supply/discharge line 152, a holding position of blocking the first supply/discharge line 151 and the second supply/discharge line 152, and a second position of discharging hydraulic fluid from the first supply/discharge line 151 and supplying hydraulic fluid to the second supply/discharge line 152.

As shown in FIG. 3, in the present embodiment, the working vehicle 1A further includes an auxiliary pump 210 that is operatively driven by the driving power source 20, and a part of pressurized fluid from the auxiliary pump 210 is used as a hydraulic pressure source for the hydraulic servo mechanism 300.

More specifically, the servo switch valve 320 has a primary side and a secondary side. The primary side is fluidly connected to a servo first supply line 471 that is fluidly connected to a discharge side of the auxiliary pump 210 and is also fluidly connected to a servo first drain line 155 that is fluidly connected to a fluid sump. The secondary side is fluidly connected to the first supply/discharge line 151 and to the second supply/discharge line 152.

The servo switch valve 320 fluidly connects the first supply/discharge line 151 to the servo first supply line 471 and also fluidly connects the second supply/discharge line 152 to the servo first drain line 155 when being positioned at the first position, closes the first supply/discharge line 151 and the second supply/discharge line 152 when being positioned at the holding position, and fluidly connects the first supply/discharge line 151 to the servo first drain line 155 and also fluidly connects the second supply/discharge line 152 to the servo first supply line 471 when being positioned at the second position.

The servo switch valve 320 is configured so as to take the first and second positions by being moved in one and the other sides in the axial line direction, respectively.

As shown in FIG. 3, the servo switch valve 320 is biased toward an initial position, which corresponds to one of the first position and the second position, by a control piston biasing member 345 acting on a control piston 340 to be described later. When a hydraulic pressure is applied to the control piston 340, the servo switch valve 320 is shifted from the initial position to the holding position or the other one of the first position and the second position.

More specifically, as shown in FIGS. 3 and 5, the hydraulic servo mechanism 300 has a servo arm 330 that has a proximal end engaged with the servo switch valve 320, a switch cylinder case 335 that is attached to the first side wall of the HST case 335, the control piston 340 that is accommodated in the switch cylinder case 335 in a reciprocating manner in a state of being engaged with a distal end of the servo arm 330, and the control piston biasing member 345 that biases the control piston 340 in such a direction of pressing the servo switch valve 320 toward the initial position via the servo arm 330. The servo solenoid valve 350 is mounted to a rear end surface of the switch cylinder case 335 such that a valve body (not shown) is located inside the switch cylinder case 335, and is configured so as to switch between supply and discharge of hydraulic fluid with respect to the control piston 340 by way of the valve body (not shown).

Specifically, the servo solenoid valve 350 is of the proportional solenoid valve type. As shown in FIG. 3, the servo solenoid valve 350 is configured so as to selectively take a supply position for supplying hydraulic fluid to the control piston 340 and a stop position for discharging hydraulic fluid from the control piston 340, in accordance with manipulation of a speed-change operating member 71 (see FIG. 1), which can be manually operated.

More specifically, as shown in FIGS. 1 and 3, the traveling system transmission structure includes the speed-change operating member 71 capable of being manually operated, a speed-change operating-position detecting member 810 that detects an operating position of the speed-change operating member 71, an HST operating-state detecting member 815 that detects an operation state of the output adjusting member 36, and a control unit 80.

The control unit 80 controls positioning of the servo solenoid valve 350 such that the output adjusting member 36 is brought into the operation state corresponding to manipulation of the speed-change operating member 71, based on signals from the speed-change operating-position detecting member 810 and the HST operating-state detecting member 815.

In the present embodiment, the HST 30 is configured so that the movable swash plate is slanted not only by the hydraulic servo mechanism 300 but also by a manual operation in an emergency case where the servo solenoid valve 350 is inoperable due to some trouble in the electrical system or the like.

Specifically, as shown in FIG. 5, the HST 30 is further provided with a control shaft 37 that is supported by the switch cylinder case 335 in a rotatable manner around its axis line.

The control shaft 37 is connected to the servo arm 330 via a connecting arm 38 so that the control piston 340 is moved along the axis line by way of the connecting arm 38 and the servo arm 330 when the control arm 37 is rotated around its axis line.

A reference numeral 39 in FIGS. 3 and 5 denotes an operating arm that is supported by an outer end of the control shaft 37 in a relatively non-rotatable manner with respect thereto.

The operating arm 39 is accessible from an outside of the vehicle body case 60 by way of an access opening 60a (see FIG. 5) that is formed in a first side wall of the vehicle body case 60 (the flywheel housing 61 in the present embodiment). The access opening 60a is blocked by a lid member 60b that is detachably attached to the vehicle body case 60.

The planetary gear unit 40 configures, in cooperation with the HST 30, an HMT.

Specifically, the planetary gear unit 40 has a first component for operatively receiving a constant-speed rotational power from the driving power source 20, a second component for operatively receiving a variable-speed rotational power from the motor shaft 33 of the HST 30, and a third component for outputting a combined rotational power formed by combining the rotational powers from the first and second components. The planetary gear unit 40 is configured so that the third component is shifted from a substantially non-output state to a maximum output state as the HST 30 is shifted from a first maximum output state of outputting a rotational power that has a maximum rotational speed in one of normal and reverse directions to a second maximum output state of outputting the rotational power that has a maximum rotational speed in the other of the normal and reverse directions.

As shown in FIGS. 2 and 4B, in the present embodiment, carriers 41, a sun gear 42, and an internal gear 43 function as the first to third components, respectively.

More specifically, as shown in FIGS. 4A and 4B, there is provided on a front end surface of the transmission case 62 a first bearing wall 601, and the HST case 35 is supported by a front surface of the first bearing wall 601 such that the pump shaft 31 and the motor shaft 33 are disposed along the vehicle lengthwise direction.

As shown in FIGS. 2, 4A, 4B, and 5, the pump shaft 31 has a rear end that penetrates through the first bearing wall 601 so as to be extended into the transmission case 62, and is operatively connected to the carriers 41 functioning as the first component via a constant-speed power input shaft 650 that is supported by the transmission case 62 so as to be disposed along the vehicle lengthwise direction.

Similarly, the motor shaft 33 has a rear end that penetrates through the first bearing wall 601 so as to be extended into the transmission case 62, and is operatively connected to the sun gear 42 functioning as the second component via a variable-speed power input shaft 660 that is supported by the transmission case 62 so as to be disposed along the vehicle lengthwise direction.

Each of the constant-speed power input shaft 650 and the variable-speed power input shaft 660 has a front end supported by the first bearing wall 601 and a rear end directly or indirectly supported by a second bearing wall 602 (see FIGS. 2 and 4B) that is provided in an intermediate portion of the transmission case 62 in the vehicle lengthwise direction.

As shown in FIG. 2, the variable-speed power input shaft 660 according to the present embodiment is operatively connected to the motor shaft 33 via a variable-speed power-transmission gear train 665.

A shown in FIG. 2, the constant-speed power input shaft 650 is operatively connected to the pump shaft 31 via a first constant-speed power-transmission gear train 651, and the carriers 41 are operatively connected to the constant-speed power input shaft 650 via a second constant-speed power-transmission gear train 652.

More specifically, as shown in FIGS. 2 and 4B, the planetary gear unit 40 is provided with, in addition to the carriers 41, the sun gear 42 and the internal gear 43 respectively functioning as the first to third components, planetary gears 45 and a carrier gear 44. Each of the planetary gears 45 is engaged with both of the sun gear 42 and the internal gear 43, and is supported by the corresponding carrier 41 in a rotatable manner around an axis line. The carrier gear 44 supports the carriers 41 so as to be rotatable about the axis of the sun gear 42 along with the carriers 41.

The carrier gear 44 is engaged with a constant-speed driving gear 652a that is supported by the constant-speed power input shaft 650 in a relatively non-rotatable manner with respect thereto.

In this embodiment, the constant-speed driving gear 652a and the carrier gear 44 configure the second constant-speed power-transmission gear train 652.

As shown in FIGS. 2 and 4B, the internal gear 43 functioning as the third component is connected to an HMT output shaft 670 so as to be relatively non-rotatable with respect thereto, the HMT output shaft 670 being supported by the second bearing wall 602 so as to be rotatable around its axis line and to be located coaxially with the sun gear 42.

As shown in FIG. 4B, the HMT output shaft 670 has a hollow cylindrical portion that is supported by the second bearing wall 602 in a rotatable manner around the axis line, and a connecting portion that is extended radially outward from the cylindrical portion and is connected to the internal gear 43.

As shown in FIG. 3, the auxiliary pump 210 functions as the hydraulic pressure source for the hydraulic servo mechanism 300 and is also used as the hydraulic pressure source for a charge fluid of the HST 30.

Figure 6:
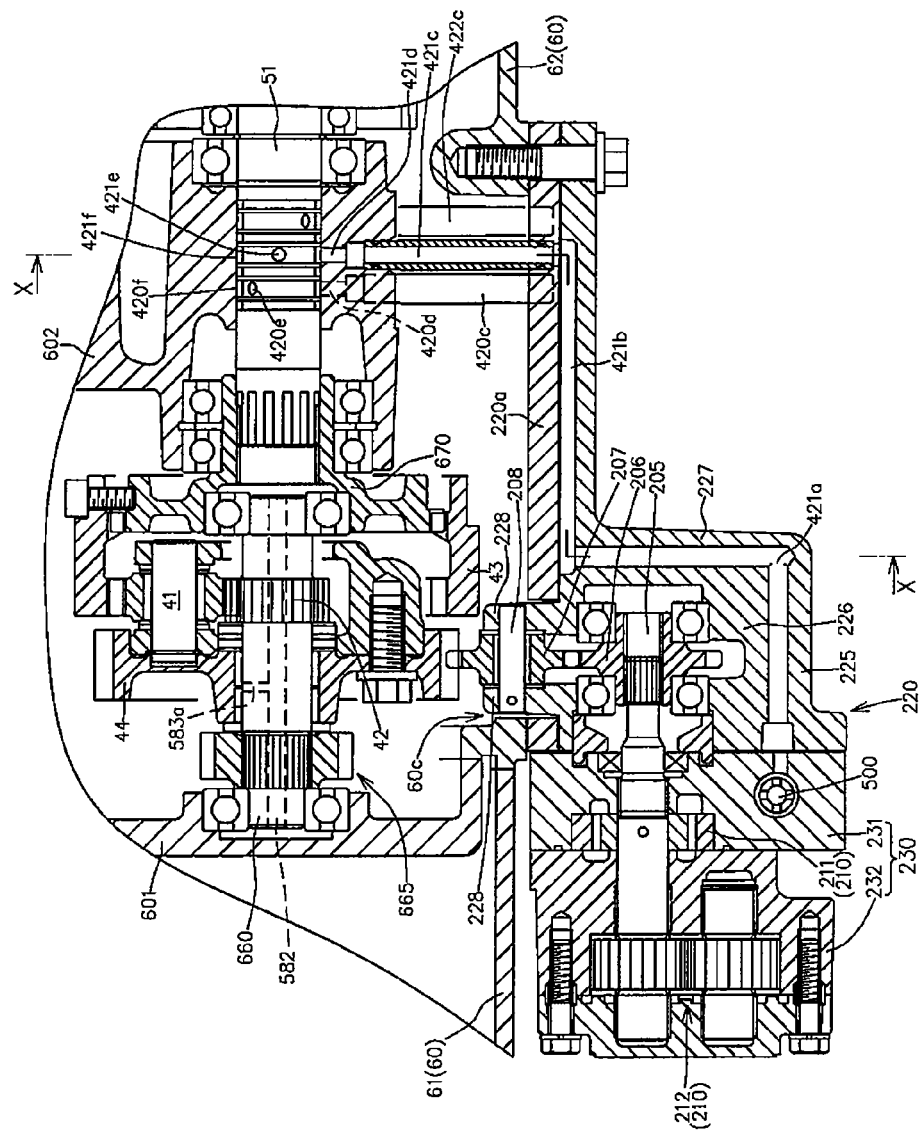
FIG. 6 is a partial cross-sectional view taken along line VI-VI indicated in FIG. 1.

FIG. 6 is a partial cross-sectional view taken along line VI-VI indicated in FIG. 1.

Figure 7:
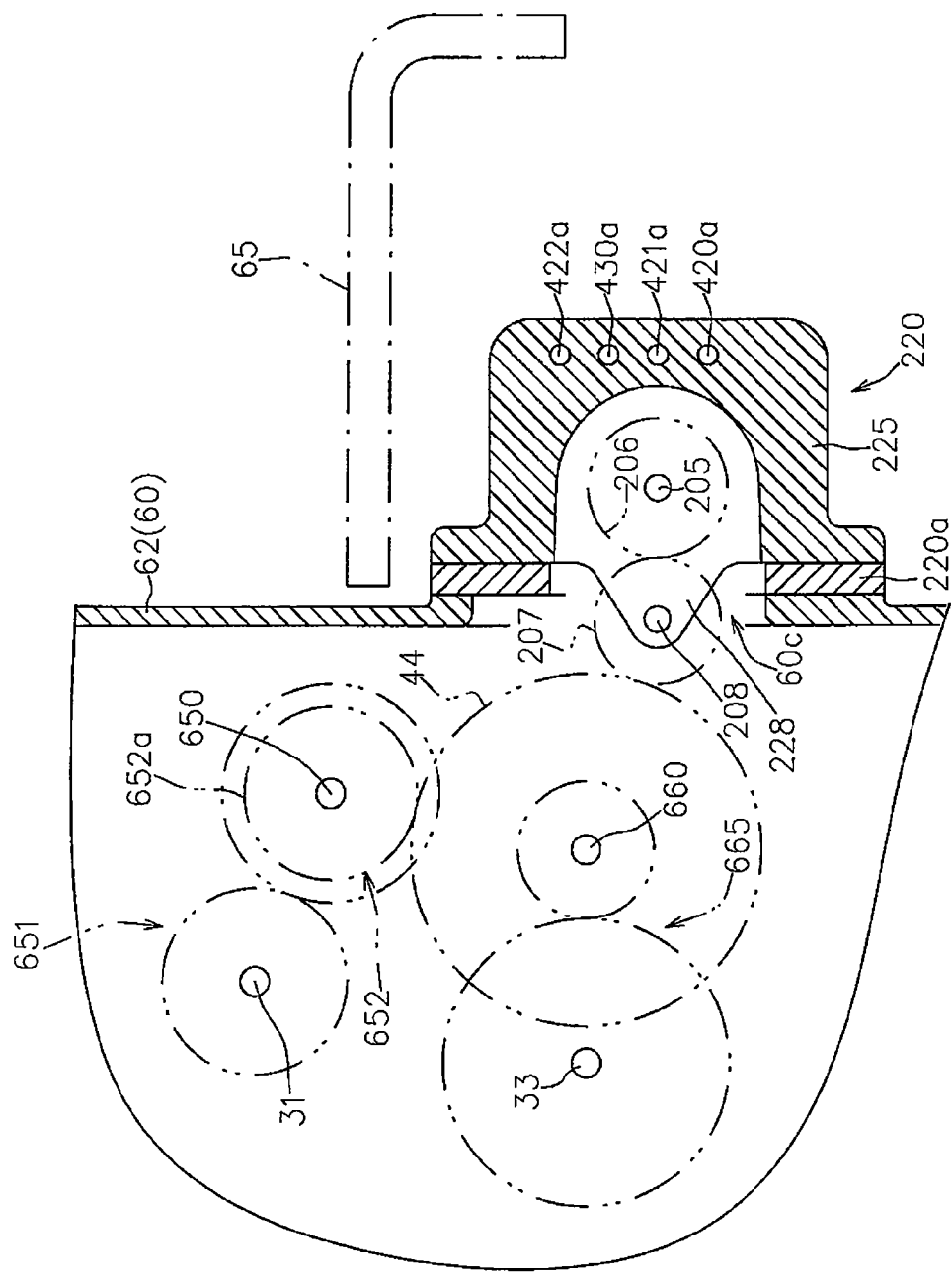
FIG. 7 is a partial cross-sectional view taken along line VII-VII indicated in FIG. 2.

Further, FIG. 7 is a partial cross-sectional view taken along line VII-VII indicated in FIG. 2.

As shown in FIGS. 2, 6, and 7, the traveling system transmission structure according to the present embodiment further includes an auxiliary pump unit 200 having the auxiliary pump 210.

The auxiliary pump unit 200 is detachably connected to the vehicle body case 60 such that the auxiliary pump 210 is operatively driven by a rotational power transmitted via the carrier gear 44.

More specifically, as shown in FIGS. 2, 6, and 7, the vehicle body case 60 (the transmission case 62 in the embodiment shown in the drawings) is provided in an outer side surface thereof with an access opening 60c so as to be overlapped with the carrier gear 44 in side view (as viewed from side).

As shown in FIGS. 2, 6, and 7, the auxiliary pump unit 200 has an auxiliary pump case 220 attached to an outer surface of a lid 220a, which is detachably connected to an outer side surface of the vehicle body case 60 so as to block the access opening 60c, an auxiliary pump driving shaft 205 that is supported by the auxiliary pump case 220 in a rotatable manner around its axis line, the auxiliary pump 210 that is driven by the auxiliary pump driving shaft 205, a driving gear 206 that is supported by the auxiliary pump driving shaft 205 in a relatively non-rotatable manner with respect thereto, and a power-transmission gear 207 that is supported by the auxiliary pump case 220 so as to be engaged with the driving gear 206.

As shown in FIG. 6, the power-transmission gear 207 is supported by the auxiliary pump case 220 so that at least a part thereof is located in the internal space of the vehicle body case 60 to be engaged with the carrier gear 44 through an opening provided in the lid 220a as well as through the access opening 60c in a state where the auxiliary pump case 220 is connected to the vehicle body case 60.

As shown in FIGS. 2 and 6, in the present embodiment, the auxiliary pump case 220 has a case main body 225 that accommodates the driving gear 206 and the power-transmission gear 207, and an auxiliary pump support block 230 that is detachably connected to the case main body 225.

As shown in FIG. 6, the case main body 225 has a hollow peripheral wall part 226 that defines an accommodation space for the driving gear 206 outside the vehicle body case 60 in a vehicle widthwise direction in a state where the case main body 225 is connected to an outer side surface of the vehicle body case 60, and an end wall part 227 that blocks one side (a rear side in the embodiment shown in the drawing) of the peripheral wall part 226 in the vehicle lengthwise direction, wherein the other side (a front side in the embodiment shown in the drawing) of the peripheral wall part 226 in the vehicle lengthwise direction is opened.

The case main body 225 is further provided with a pair of front and rear internal support walls 228 that are each extended into the vehicle body case 60 through the opening in the lid 220a and the access opening 60c in a state where the case main body 225 is connected to the outer side surface of the vehicle body case 60.

As shown in FIG. 6, there is provided a countershaft 208 that is supported by the pair of internal support walls 228 so as to be in parallel with the auxiliary pump driving shaft 205, while the power-transmission gear 207 is supported by the countershaft 208.

As shown in FIG. 6, the auxiliary pump support block 230 is detachably connected to the case main body 225 so as to block the opening.

The auxiliary pump driving shaft 205 is directly or indirectly supported by the case main body 225 and the auxiliary pump support block 230, and the auxiliary pump 210 is accommodated in the auxiliary pump support block 230 while being supported by the auxiliary pump driving shaft 205 in a relatively non-rotatable manner with respect thereto.

As shown in FIGS. 2 and 6, in the present embodiment, the auxiliary pump 210 includes a first auxiliary pump 211 and a second auxiliary pump 212.

Accordingly, the auxiliary pump support block 230 includes a first auxiliary pump support block 231 that is detachably connected to the case main body 225 so as to block the opening, and a second auxiliary pump support block 232 that is detachably connected to the first auxiliary pump support block 231. The first auxiliary pump support block 231 and the second auxiliary pump support block 232 accommodate therein the first auxiliary pump 211 and the second auxiliary pump 212, respectively.

For example, the first auxiliary pump 211 can be used as the hydraulic pressure source for the hydraulic servo mechanism 300 and also be used as the hydraulic pressure source for the charge fluid of the HST 30, while the second auxiliary pump 212 can be used as a hydraulic pressure source for a hydraulic fluid of an external hydraulic device.

In the present embodiment, the first auxiliary pump 211 is configured as a trochoid pump, while the second auxiliary pump 212 is configured as a gear pump.

As shown in FIG. 1, the auxiliary pump unit 200 is preferably connected to the vehicle body case 60 with use of a dead space located below a step 65 that is fixed to an outer side surface of the vehicle body case 60 in the vehicle widthwise direction.

As shown in FIGS. 2 and 4B, the forward/rearward-travel switch unit 50 has a forward/rearward-travel driving shaft 51, a forward/rearward-travel driven shaft 52 that is disposed in parallel with the forward/rearward-travel driving shaft 51, a forward-travel hydraulic clutch 53 that operatively connects the forward/rearward-travel driving shaft 51 with the forward/rearward-travel driven shaft 52 via a forward-travel gear train 54 so as to rotate the forward/rearward-travel driven shaft 52 in the vehicle forward-travel direction, and a rearward-travel hydraulic clutch 55 that operatively connects the forward/rearward-travel driving shaft 51 with the forward/rearward-travel driven shaft 52 via a rearward-travel gear train 56 so as to rotate the forward/rearward-travel driven shaft 52 in a vehicle rearward-travel direction.

The forward/rearward-travel driving shaft 51 is supported by the transmission case 62 so as to be located coaxially with the variable-speed power input shaft 660 in a state of being operatively connected to the internal gear 43.

In the present embodiment, the forward/rearward-travel driving shaft 51 has a front end that is connected to the cylindrical portion of the HMT output shaft 670 through a spline engagement and a rear end that is supported by a third bearing wall 603 provided on the rear end surface of the transmission case 62.

The forward/rearward-ravel driven shaft 52 is supported by the transmission case 62 so as to be located coaxially with the constant-speed power input shaft 650.

In the present embodiment, the forward/rearward-travel driven shaft 52 has a front end that is supported by the second bearing wall 602 and a rear end that is supported by the third bearing wall 603.

As shown in FIG. 4B, the forward-travel hydraulic clutch 53 has a forward-travel clutch housing 53a that is supported by the forward/rearward-travel driving shaft 51 in a relatively non-rotatable manner with respect thereto, a forward-travel transmitting member 53b that is supported by the forward/rearward-travel driving shaft 51 in a relatively rotatable manner with respect thereto, and a forward-travel friction plate group 53c that selectively engages or interrupts blocks power transmission from the forward-travel clutch housing 53a to the forward-travel transmitting member 53b.

In the present embodiment, the forward-travel hydraulic clutch 53 is of the hydraulically-actuated type.

As shown in FIG. 4B, the forward-travel hydraulic clutch 53 is thus further provided with a forward-travel piston 53d that causes the forward-travel friction plate group 53c to be in the frictional engagement state upon reception of hydraulic pressure, and a forward-travel interrupting spring 53e that presses the forward-travel piston 53d in a direction away apart from the forward-travel friction plate group 53c.

As shown in FIG. 4B, the rearward-travel hydraulic clutch 55 has a rearward-travel clutch housing 55a that is supported by the forward/rearward-travel driving shaft 51 in a relatively non-rotatable manner with respect thereto, a rearward-travel transmitting member 55b that is supported by the forward/rearward-travel driving shaft 51 in a relatively rotatable manner with respect thereto, and a rearward-travel friction plate group 55c that selectively engages or interrupts power transmission from the rearward-travel clutch housing 55a to the rearward-travel transmitting member 55b.

In the present embodiment, the rearward-travel hydraulic clutch 55 is of the hydraulically-actuated type.

As shown in FIG. 4B, the rearward-travel hydraulic clutch 55 is thus further provided with a rearward-travel piston 55d that causes the rearward-travel friction plate group 55c to be in the frictional engagement state upon reception of hydraulic pressure, and a rearward-travel interrupting spring 55e that presses the rearward-travel piston 55d in a direction away from the rearward-travel friction plate group 55c.

In the present embodiment, the forward-travel clutch housing 53a and the rearward-travel clutch housing 55a are formed integrally with each other.

As shown in FIG. 4B, the forward-travel gear train 54 has a forward-travel driving gear 54a that is provided to the forward-travel transmitting member 53b so as to be relatively non-rotatable with respect thereto, and a forward-travel driven gear 54b that is supported by the forward/rearward-travel driven shaft 52 in a relatively non-rotatable with respect thereto in a state of being engaged with the forward-travel driving gear 54a.

The rearward-travel gear train 56 has a rearward-travel driving gear 56a that is provided to the rearward-travel transmitting member 55b so as to be relatively non-rotatable with respect thereto, and a rearward-travel driven gear 56b that is supported by the forward/rearward-travel driven shaft 52 in a relatively non-rotatable manner with respect thereto in a state of being engaged with the rearward-travel driving gear 56a via a counter gear (not shown).

As shown in FIG. 3, supply and discharge of hydraulic fluid with respect to the forward-travel hydraulic clutch 53 and the rearward-travel hydraulic clutch 55 is performed by a forward/rearward-travel solenoid valve 500.

More specifically, the traveling system transmission structure further includes a forward/rearward-travel switch operating member 72 (see FIG. 1) capable of being manually operated, a forward/rearward-travel switch-position detecting member 820 (see FIG. 3) that detects the operating position of the forward/rearward-travel switch operating member 72, and the forward/rearward-travel solenoid valve 500 that switches between supply and discharge of hydraulic fluid with respect to the forward/rearward-travel switch unit 50.

The forward/rearward-travel solenoid valve 500 is configured so as to selectively take a forward-travel position, a rearward-travel position and an interrupting position that cause the forward/rearward-travel switch unit 50 to be brought into a forward-travel power-transmission state, a rearward-travel power-transmission state, and a power-transmission disengagement state, respectively.

Positioning of the forward/rearward-travel solenoid valve 500 is controlled by the control unit 80.

Specifically, as shown in FIG. 3, the control unit 80 is configured so as to cause the forward/rearward-travel solenoid valve 500 to be located at the forward-travel position, the rearward-travel position and the interrupting position, based on a signal from the forward/rearward-travel switch-position detecting member 820.

As shown in FIGS. 2, 3, and 4B, the traveling system transmission structure is also provided with a hydraulic brake unit 90 that is capable of operatively applying a braking power to the main driving wheels 11 in accordance with supply or discharge of the hydraulic fluid.

The hydraulic brake unit 90 will be described later in detail.

As shown in FIG. 2, the traveling system transmission structure further includes a multistage speed-change unit 250 that functions as a sub speed-change unit, and a parking brake unit 260 that is capable of operatively and selectively applying a braking power to a driven side of the multistage speed-change unit 250.

The working vehicle 1A includes the pair of right and left main driving wheels 11.

Accordingly, the traveling system transmission structure further includes a main differential gear unit 270 that differentially transmits to the pair of main driving wheels 11 a rotational power from the multistage speed-change unit 250.

As shown in FIG. 2, in the present embodiment, the multistage speed-change unit 250, the parking brake unit 260 and the main differential gear unit 270 are accommodated in a rear case 63 that is connected to the rear end of the transmission case 62 and forms, together with the flywheel housing 61 and the transmission case 62, the vehicle body case 60.

More specifically, the forward/rearward-travel driven shaft 52 has the rear end that is extended into the rear case 63 beyond the third bearing wall 603.

As shown in FIG. 2, the multistage speed-change unit 250 has a sub speed-change driving shaft 251 that is operatively connected to the forward/rearward-travel driven shaft 52, a sub speed-change driven shaft 252 that is disposed in parallel with the sub speed-change driving shaft 251, a first-speed gear train 253a, a second-speed gear train 253b, and a third-speed gear train 253c, which are respectively supported by the sub speed-change driving shaft 251 and the sub speed-change driven shaft 252, and an sub speed-change clutch 255 that can be selectively brought into a first-speed state to a third-speed state where a power is transmitted from the sub speed-change driving shaft 251 to the sub speed-change driven shaft 252 by way of the first-speed gear train 253a to the third-speed gear train 253c, respectively.

The sub speed-change clutch 255 is operatively controlled by a sub speed-change operating member 74 (see FIG. 1) capable of being manually operated.

The main differential gear unit 270 differentially transmits, to the pair of right and left main driving wheels 11, the rotational power that has been operatively transmitted from the sub speed-change driven shaft 252.

The parking brake unit 260 is capable of operatively and selectively applying a braking power to the sub speed-change driven shaft 252.

The working vehicle 1A according to the present embodiment is configured so that the front wheels serve as the sub driving wheels 12, and the parking brake unit 260 is inserted in a front-wheel power-transmission structure that transmits a rotational power from the sub speed-change driven shaft 252 to the front wheels.

Specifically, the front-wheel power-transmission structure includes a front-wheel power-transmission shaft 280 that is disposed in parallel with the sub speed-change driven shaft 252 and is operatively connected to the sub speed-change driven shaft 252 via a power-transmission gear train 281. The parking brake unit 260 is capable of selectively applying a braking power to the front-wheel power-transmission shaft 280.

Practically, the parking brake unit 260 has a parking friction plate group 261 including rotatable friction plates supported by the front-wheel power-transmission shaft 280 in a relatively non-rotatable manner with respect thereto and fixed friction plates supported by the rear case 63 so as to be non-rotatable, wherein a braking power is applied to or released from the front-wheel power-transmission shaft 280 in accordance with frictional engagement or release of engagement of the parking friction plate group 261.

In the present embodiment, the parking brake unit 260 has a parking-brake actuating arm 262 (see FIG. 1) that is disposed outside the vehicle body case 60. The parking-brake actuating arm 262 is mechanically connected via a connecting member 263 to a parking-brake operating member 73 (see FIG. 1) capable of being manually operated.

As shown in FIG. 2, the front-wheel power-transmission structure includes, in addition to the front-wheel power-transmission shaft 280, a front-wheel output shaft 290 that is disposed coaxially with the front-wheel power-transmission shaft 280 in a state where its front end is extended forward from the transmission case 62, and a front-wheel clutch mechanism 285 inserted between the front-wheel power-transmission shaft 280 and the front-wheel output shaft 290.

As shown in FIG. 2, the front-wheel clutch mechanism 285 can be selectively brought into a constant-speed power-transmission state where the front-wheel power-transmission shaft 280 is directly connected to the front-wheel output shaft 290, an increased-speed power-transmission state where a rotational power of the front-wheel power-transmission shaft 280 is transmitted to the front-wheel output shaft 290 while the speed thereof being increased, and an interrupting state where power transmission from the front-wheel power-transmission shaft 280 to the front-wheel output shaft 290 is disengaged.

The front-wheel clutch mechanism 285 may have a clutch of the hydraulically-actuated type in order to be brought into each of the above operation states. The auxiliary pump unit 200 can be used as the hydraulic pressure source for a hydraulic fluid with respect to the clutch.

As shown in FIG. 2, in the present embodiment, the working vehicle 1A includes, in addition to the traveling system transmission structure described above, a PTO system transmission structure that is capable of externally outputting a rotational power of the driving power source 20.

The PTO system transmission structure may include a first PTO transmission shaft 360 that is connected to the pump shaft 31 so as to be relatively non-rotatable about the axis line with respect thereto while being coaxially with the pump shaft 31, a PTO clutch mechanism 365 that has a driving side connected to the first PTO transmission shaft 360, a second PTO transmission shaft 370 that is connected to a driven side of the PTO clutch mechanism 365, a PTO shaft 380 that has a first end extended outward from the vehicle body case 60 while being disposed in parallel with the second PTO transmission shaft 370, and a PTO speed-change mechanism 375 that is capable of transmitting a rotational power from the second PTO transmission shaft 370 to the PTO shaft 380 while changing a speed thereof. The PTO clutch mechanism 365 may be of the hydraulically-actuated type, in which case the auxiliary pump unit 200 can be used as a hydraulic pressure source therefore.

The PTO speed-change mechanism 375 is operatively controlled by a PTO speed-change operating member 75 (see FIG. 1) capable of being manually operated.

Next described in detail is the hydraulic brake unit 90.

The hydraulic brake unit 90 is provided in order to reliably achieve the vehicle stop state without necessity of strict manufacture of the HST 30 and the planetary gear unit 40 and/or without necessity of highly accurate control thereof.

Specifically, In order to achieve the vehicle stop state in the vehicle where (i) the HST, the planetary gear unit and the forward/rearward-travel switch unit are connected in series, (ii) the HST 30 is shifted from a first maximum output state of outputting a rotational power that has a maximum rotational speed in one of the normal and reverse directions to a second maximum output state of outputting a rotational power that has a maximum rotational speed in the other of the normal and reverse directions in accordance with manipulation of the speed-change operating member from the initial position to the maximum operating position, and (iii) the planetary gear unit is shifted from the substantially non-output state to the maximum output state as the HST is shifted from the first maximum output state to the second maximum output state it is necessary to accurately assemble the HST and/or a connecting structure between the HST and the speed-change operating member without variation so that the HST is accurately brought into the first maximum output state when the speed-change operating member is located at the initial position, and it is also necessary to accurately manufacture the respective gears of the planetary gear unit so that the planetary gear unit is brought into the non-output state when the HST is in the first maximum output state.

It is also necessary that the planetary gear unit is brought closer into the non-output state by repeating the cycle of electrically monitoring the non-output state of the planetary gear unit, determining with use of a controller whether or not the planetary gear unit is in the non-output state, and, in a case where the planetary gear unit is not in the non-output state, changing the output state of the HST and determining whether or not the planetary gear unit is in the non-output state. However, in this case, there may be caused a hunting phenomenon to the vehicle, and there is required highly accurate control in order to prevent such a hunting phenomenon.

In view of the above, the traveling system transmission structure according to the present embodiment includes the hydraulic brake unit 90 that is capable of operatively applying a braking power to the main driving wheels 11, and is configured so that the hydraulic brake unit 90 is brought into a brake actuating state when the HST 30 is in a power-neutral output state within a predetermined range with the first maximum output state being set as a reference.

According to the configuration described above, the vehicle stop state is reliably achieved without necessity of strict manufacture and assembly of the components configuring the traveling system transmission structure, such as the HST 30 and the planetary gear unit 40, and/or without necessity of control thereof with a high degree of accuracy.

Specifically, as shown in FIGS. 3 and 4B, the traveling system transmission structure includes an HST output detecting member 830 that directly or indirectly detects the output state of the HST 30, the hydraulic brake unit 90 that operatively applies a braking power to the main driving wheels 11 in accordance with supply or discharge of the hydraulic fluid, a brake solenoid valve 900 that switches between supply and discharge of hydraulic fluid with respect to the hydraulic brake unit 90, and the control unit 80 that controls positioning of the brake solenoid valve 900. The control unit 80 locates the brake solenoid valve 900 at the brake actuating position upon determination that, based on a signal from the HST output detecting member 830, the HST 30 is in the power-neutral output state within a predetermined range with the first maximum output state as the reference.

As shown in FIG. 3, in the present embodiment, the HST output detecting member 830 includes a pump sensor 831 and a motor sensor 832 that directly or indirectly detect the rotational speeds of the pump shaft 31 and the motor shaft 33 of the HST 30, respectively.

The control unit 80 determines that the HST 30 is in the power-neutral output state in accordance with a judgment of the control unit 80 based on signals from the pump sensor 831 and the motor sensor 832 that the HST 30 has a speed-change ratio within a predetermined range with a maximum speed-change ratio in one of the normal and reverse directions being set as the reference.

According to the configuration, the power-neutral output state of the HST 30 can be reliably detected even in a case where there is caused variation in the output rotational speed of the driving power source 20. Therefore, the working vehicle 1A can be brought into the stop state with excellent controllability.

Alternatively, the HST output detecting member 830 may include only the motor sensor 832 that directly or indirectly detects the rotational speed of the motor shaft 33 in the HST 30.

In this case, the control unit 80 determines that the HST 30 is in the power-neutral output state in accordance with a judgment of the control unit 80 based on a signal from the motor sensor 832 that the motor shaft 33 has a rotational speed within a predetermined range with a maximum rotational speed in one of the normal and reverse directions as a reference.

The configuration makes it possible to achieve the vehicle stop state of the working vehicle 1A while realizing reduction in cost by not providing the pump sensor 831.

In a case such as the present embodiment where the output adjusting member 36 of the HST 30 is operatively controlled by the hydraulic servo mechanism 300, the speed-change operating-position detecting member 810 and/or the HST operating-state detecting member 815 can be used as the HST output detecting member 830.

This case realizes no provision of both the pump sensor 831 and the motor sensor 832.

When the speed-change operating member 71 is manipulated in order to cause the working vehicle 1A to travel from a state where the control unit 80 detects the power-neutral output state and causes the hydraulic brake unit 90 to be in the brake actuating state so as to stop the working vehicle 1A, it is preferable that the control unit 80 firstly brings the hydraulic brake unit 90 into the brake release state, secondly brings the forward/rearward-travel switch unit 50 into a transmission state in accordance with a signal from the forward/rearward-travel switch-position detecting member 820, and lastly causes the HST 30 to actuate in accordance with a signal from the speed-change operating-position detecting member 810.

According to the configuration, there is no need to control so that the forward/rearward-travel switch unit 50 is gradually brought into an engagement state.

In the present embodiment, the hydraulic brake unit 90 is configured so as to apply a braking power to the forward/rearward-travel driven shaft 52.

More specifically, as shown in FIGS. 2 and 4B, the hydraulic brake unit 90 has a rotatable member 91 that is supported by the forward/rearward-travel driven shaft 52 in a relatively non-rotatable manner with respect thereto, a fixed member 92 that is supported by the vehicle body case 60 (the second bearing wall 602 in the embodiment shown in the drawings) so as to be non-rotatable, and a brake friction plate group 93 that includes a rotatable friction plate supported by the rotatable member 91 in a relatively non-rotatable manner with respect thereto and a fixed friction plate supported by the fixed member 92 in a relatively non-rotatable manner with respect thereto, wherein a braking power is applied to or released from the forward/rearward-travel driven shaft 52 in accordance with frictional engagement or release of engagement of the brake friction plate group 93.

In the present embodiment, the hydraulic brake unit 90 is of the hydraulically-actuated type in which the brake actuating state is realized in accordance with supply of hydraulic fluid and achieves the brake release state is realized in accordance with discharge of hydraulic fluid.

As shown in FIG. 4B, the hydraulic brake unit 90 is thus provided with, in addition to the above components, a brake piston 94 that frictionally engages the brake friction plate group 93 upon receipt of a hydraulic pressure of the hydraulic fluid, and a brake return spring 95 that biases the brake piston 94 in a direction away from the brake friction plate group 93.

Alternatively, the hydraulic brake unit 90 may be of the spring-actuated type in which the brake actuating state is realized by a biasing force of a spring and the brake release state is realized in accordance with supply of hydraulic fluid.

Figure 8:
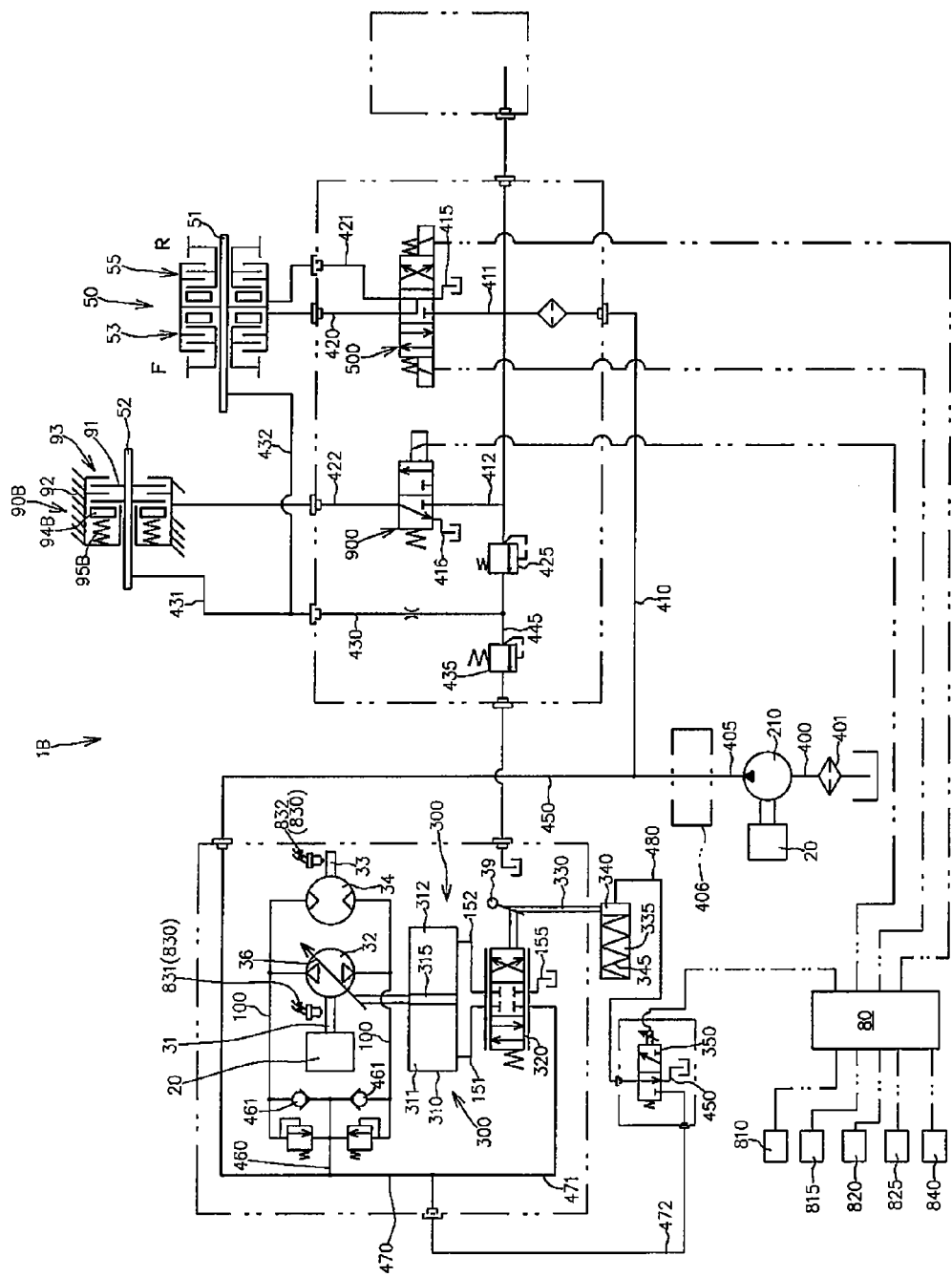
FIG. 8 is a hydraulic circuit diagram of a working vehicle to which a traveling system transmission structure according to one modification of the first embodiment is applied.

FIG. 8 is a hydraulic circuit diagram of a working vehicle 1B that includes a hydraulic brake unit 90B of the spring-actuated type.

The hydraulic brake unit 90B of the spring-actuated type shown in FIG. 8 has the rotatable member 91, the fixed member 92, the brake friction plate group 93, a brake actuating spring 95B, and a brake piston 94B that frictionally engages the brake friction plate group 93 with use of a biasing force of the brake actuating spring 95B and is spaced apart from the brake friction plate group 93 against the biasing force of the brake actuating spring 95B upon receipt of a hydraulic pressure of the hydraulic fluid.

As shown in FIGS. 3 and 8, the brake solenoid valve 900 is configured so as to take a brake actuating position and a brake release position at which the hydraulic brake unit 90 or 90B is brought into the brake actuating state and into the brake release state, respectively.

As already described, in the present embodiment, the hydraulic brake unit 90 is of the hydraulically-actuated type.

As shown in FIG. 3, the brake solenoid valve 900 thus causes hydraulic fluid to be supplied to the hydraulic brake unit 90 when being positioned at the brake actuating position and causes hydraulic fluid to be discharged from the hydraulic brake unit when being positioned at the brake release position, respectively.

As shown in FIG. 8, in a case where the hydraulic brake unit 90B of the spring-actuated type is utilized, the brake solenoid valve 900 is obviously configured to cause hydraulic fluid to be discharged from the hydraulic brake unit 90B when being positioned at the brake actuating position and causes hydraulic fluid to be supplied to the hydraulic brake unit when being positioned at the brake release position, respectively.

Other than the hydraulic brake unit 90B, as shown in FIG. 8, in which the hydraulic fluid acts on the hydraulic piston for frictionally engaging the friction plate group, the hydraulic brake unit of the spring-actuated type may be alternatively configured to operate, with use of a hydraulic actuator, a brake actuating arm for causing frictional engagement or release of engagement of the friction plate group.

Further alternatively, the parking brake unit 260 can be configured to apply a braking power to the main driving wheels 11 in a case where the control unit 80 determines the power-neutral output state. This configuration does not require the dedicated hydraulic brake unit 90 or 90B, thereby achieving reduction in cost.

In this case, the parking brake unit 260 functions to stop the working vehicle 1A when the driving power source 20 is stopped, and also functions to prevent unintentional movement of the working vehicle 1A when the control unit 80 determines the power-neutral output state while the driving power source 20 is in motion.

In the case where the parking brake unit 260 is also used as a brake for the power-neutral output state, the parking brake unit 260 may be provided with the parking-brake operating member 73, the parking-brake actuating arm 262, a parking-brake operation detecting member 825 (see FIG. 3) that detects whether the parking-brake operating member 73 is manipulated or not, and a parking-brake hydraulic actuator (not shown) that causes the parking-brake actuating arm 262 to operate.

The parking-brake hydraulic actuator may have a parking-brake piston that is liquid-tightly and reciprocatably accommodated in a cylinder, the connecting member 263 that connects the piston with the parking-brake actuating arm 262, and a parking-brake actuating spring that operatively biases the piston into a brake actuating direction. When the piston is pressed into the brake actuating direction due to the biasing force of the operative spring, the parking-brake actuating arm 262 is turned into the brake actuating direction via the connecting member 263. On the other hand, when the piston is pressed into a brake release direction against the biasing force of the operative spring due to the influence of a hydraulic pressure, the parking-brake actuating arm 262 is turned into the brake release direction via the connecting member 263.

The actuating spring may be configured to bias the parking-brake actuating arm 262 into the brake actuating direction, or to bias the piston into the brake actuating direction.

Supply and discharge of hydraulic fluid with respect to the piston may be controlled with use of an solenoid valve similar to the brake solenoid valve 900 that can be located at a hydraulic fluid supply position and a hydraulic fluid discharge position.

The solenoid valve is controlled in its position by the control unit 80 based on a signal from the parking-brake operation detecting member 825.

It is obviously possible to adopt, as the parking-brake hydraulic actuator, a hydraulic piston that frictionally engages the friction plate group as shown in FIG. 8.

In other words, the parking brake unit 260 can be configured similarly to the hydraulic brake unit 90B.

As already described, in the present embodiment, the control unit 80 controls positioning of the forward/rearward-travel solenoid valve 500 based on a signal from the forward/rearward-travel switch-position detecting member 820, and also controls positioning of the brake solenoid valve 900 based on a signal from the HST output detecting member 830.

In this configuration, preferably, the control unit 80 forcibly locates the forward/rearward-travel solenoid valve 500 at the interrupting position when the control unit 80 determines that the HST 30 is in the power-neutral output state based on a signal from the HST output detecting member 830.

More specifically, the control unit 80 is configured so as to selectively locate the forward/rearward-travel solenoid valve 500 at the forward-travel position, the rearward-travel position or the interrupting position, based on a signal from the forward/rearward-travel switch-position detecting member 820, and is also configured so as to forcibly locate the forward/rearward-travel solenoid valve 500 at the interrupting position regardless of the signal from the forward/rearward-travel switch-position detecting member 820 in the case where the control unit 80 determines that the HST 30 is in the power-neutral output state based on a signal from the HST output detecting member 830.

The above configuration can prevent a case where a braking power is applied from the hydraulic brake unit 90 to the forward/rearward-travel driven shaft 52 while a rotational power is being transmitted from the driving power source 20 to the forward/rearward-travel driven shaft 52 via the HST 30, the planetary gear unit 40, and the forward/rearward-travel switch unit 50. Accordingly, it is possible to effectively prevent excessive abrasion of the brake friction plate groups 93, 53c, and 55c in the hydraulic brake unit 90 and the forward/rearward-travel switch unit 50, respectively.

In the present embodiment (see FIG. 2) and in the modified embodiment shown in FIG. 8, the brake solenoid valve 900 is provided separately from the forward/rearward-travel solenoid valve 500. Alternatively, these solenoid valves can be replaced by a single solenoid valve 910.

Figure 9:
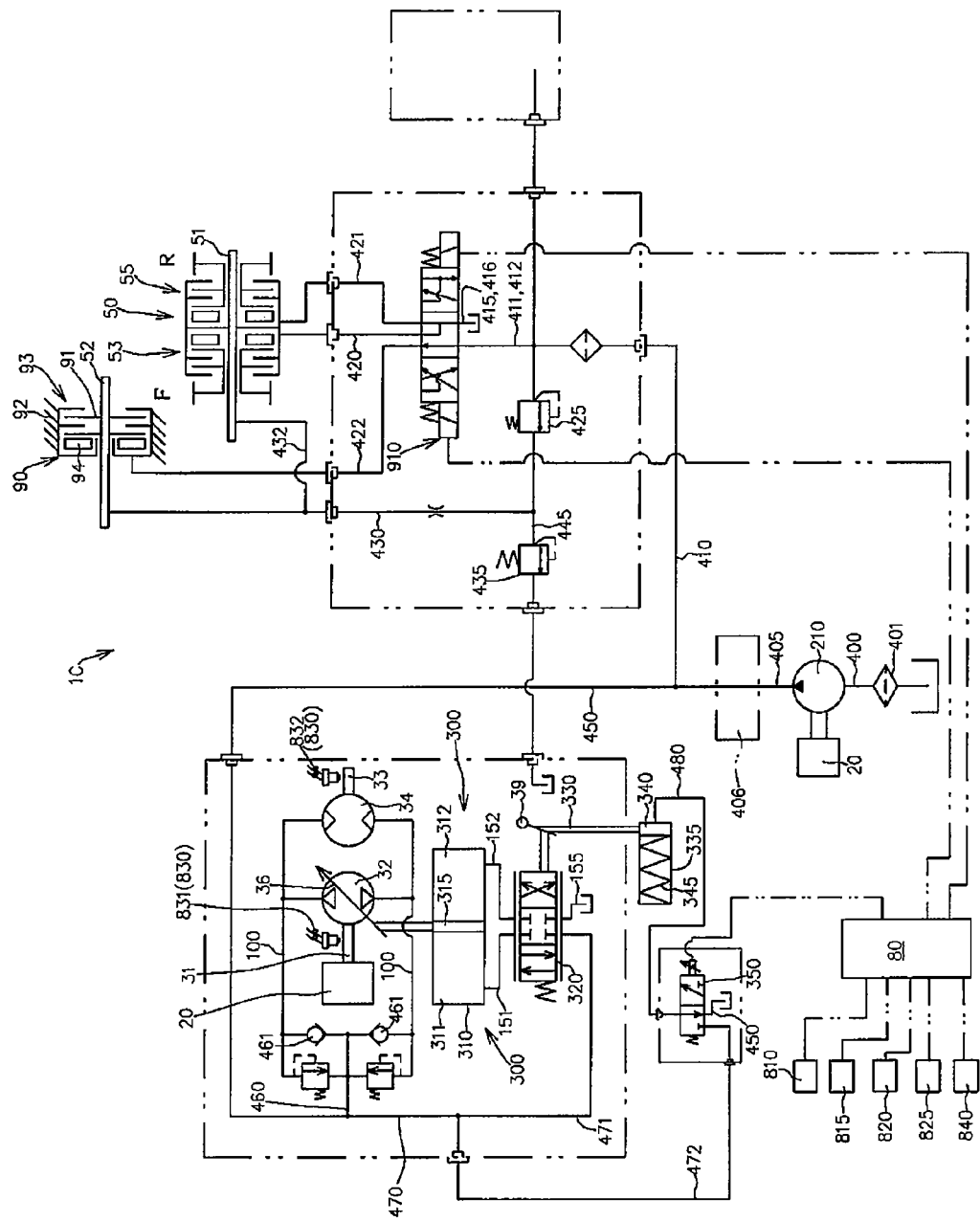
FIG. 9 is a hydraulic circuit diagram of a working vehicle to which a traveling system transmission structure according to another modification of the first embodiment is applied.

FIG. 9 is a hydraulic circuit diagram of a working vehicle 1C provided with the single solenoid valve 910 that functions as the brake solenoid valve 900 and also as the forward/rearward-travel solenoid valve 500.

In the traveling system transmission structure applied to the working vehicle 1C as shown in FIG. 9, the hydraulic brake unit 90 is of the hydraulically-actuated type.

The single solenoid valve 910 is configured so as to selectively take a forward-travel power-transmission/brake-release position, a power-transmission disengagement/brake-actuating position, and a rearward-travel power-transmission/brake-release position. When being positioned at the forward-travel power-transmission/brake-release position, the single solenoid valve 910 supplies hydraulic fluid to the forward-travel hydraulic clutch 53 and discharges hydraulic fluid from the rearward-travel hydraulic clutch 55 and the hydraulic brake unit 90. When being positioned at the power-transmission disengagement/brake-actuating position, the single solenoid valve 910 supplies hydraulic fluid to the hydraulic brake unit 90 and discharges hydraulic fluid from the forward-travel hydraulic clutch 53 and the rearward-travel hydraulic clutch 55. When being positioned at the rearward-travel power-transmission/brake-release position, the single solenoid valve 910 supplies hydraulic fluid to the rearward-travel hydraulic clutch 55 and discharges hydraulic fluid from the forward-travel hydraulic clutch 53 and the hydraulic brake unit 90.

In this configuration, the control unit 80 selectively locates the single solenoid valve 910 at the forward-travel power-transmission/brake-release position, the power-transmission disengagement/brake-actuating position or the rearward-travel power-transmission/brake-release position, based on a signal from the forward/rearward-travel switch-position detecting member 820, and also forcibly locates the single solenoid valve 910 at the power-transmission disengagement/brake-actuating position in a case where the control unit 80 determines that the HST 30 is in the power-neutral output state based on a signal from the HST output detecting member 830.

Described below with reference principally to FIG. 3 is the hydraulic circuit in the traveling system transmission structure.

In the traveling system transmission structures shown in FIGS. 8 and 9, the same member is denoted by the same reference numerals, and detailed description thereof will not be repeated.

As shown in FIG. 3, the traveling system transmission structure includes a suction line 400 that has a first end fluidly connected to a fluid sump such as the internal space of the vehicle body case 60 and a second end fluidly connected to the suction side of the auxiliary pump 210 (the first auxiliary pump 211), a main supply line 405 that has a first end fluidly connected to the discharge side of the auxiliary pump 210, and a first supply line 410 and a second supply line 450 which are branched from the main supply line 405.

A reference numeral 401 in FIG. 3 denotes a filter that is interposed in the suction line 400, and a reference numeral 406 denotes a power steering hydraulic circuit that is interposed in the main supply line 405. Specifically, in the present embodiment, the fluid excessively supplied to the power steering hydraulic circuit 406 and the fluid returned from the power steering hydraulic circuit 406 are supplied to the first supply line 410 and the second supply line 450.

The above traveling system transmission structure further includes a forward/rearward-travel supply line 411, as a brake supply line 412, a forward/rearward-travel drain line 415, a brake drain line 416, a forward-travel-clutch supply/discharge line 420, a rearward-travel-clutch supply/discharge line 421, and a brake supply/discharge line 422. The forward/rearward-travel supply line 411 and the brake supply line 412 are branched from the first supply line 410 and are fluidly connected to the primary sides of the forward/rearward-travel solenoid valve 500 and the brake solenoid valve 900, respectively. The forward/rearward-travel drain line 415 is fluidly connected to the primary side of the forward/rearward-travel solenoid valve 500. The brake drain line 416 is fluidly connected to the primary side of the brake solenoid valve 900. The forward-travel-clutch supply/discharge line 420 has a first end fluidly connected to a secondary side of the forward/rearward-travel solenoid valve 500 and a second end fluidly connected to the forward-travel hydraulic clutch 53. The rearward-travel-clutch supply/discharge line 421 has a first end fluidly connected to the secondary side of the forward/rearward-travel solenoid valve 500 and a second side fluidly connected to the rearward-travel hydraulic clutch 55. The brake supply/discharge line 422 has a first end fluidly connected to a secondary side of the brake solenoid valve 900 and a second end fluidly connected to the hydraulic brake unit 90.

When being located at the forward-travel position, the forward/rearward-travel solenoid valve 500 causes the forward-travel-clutch supply/discharge line 420 and the rearward-travel-clutch supply/discharge line 421 to be fluidly connected to the forward/rearward-travel supply line 411 and the forward/rearward-travel drain line 415, respectively. When being located at the rearward-travel position, the forward/rearward-travel solenoid valve 500 causes the forward-travel-clutch supply/discharge line 420 and the rearward-travel-clutch supply/discharge line 421 to be fluidly connected to the forward/rearward-travel drain line 415 and the forward/rearward-travel supply line 411, respectively. When being located at the interrupting position, the forward/rearward-travel solenoid valve 500 closes the forward/rearward-travel supply line 411 and also causes the forward-travel-clutch supply/discharge line 420 and the rearward-travel-clutch supply/discharge line 421 to be fluidly connected to the forward/rearward-travel drain line 415.

When being located at the brake actuating position, the brake solenoid valve 900 causes the brake supply/discharge line 422 to be fluidly connected to the brake supply line 412. When being located at the brake release position, the brake solenoid valve 900 causes the brake supply/discharge line 422 to be fluidly connected to the brake drain line 416 and also closes the brake supply line 412.

A reference numeral 425 in FIG. 3 denotes a main relief valve that sets the hydraulic pressure of the main supply line 405 (namely, the first supply line 410 and the second supply line 450).

The traveling system transmission structure according to the present embodiment includes a main drain line 445 that has a first end fluidly connected to the first supply line 410 and a second end fluidly connected to the fluid sump, and the main relief valve 425 is interposed in the main drain line 445 such that the primary end thereof is directed toward the first supply line 410.

The above traveling system transmission structure further includes a lubricant line 430 that has a first end fluidly connected to the main drain line 445 on a side close to the secondary side of the main relief valve 425, and a lubricant relief valve 435 that is interposed in the main drain line 445 so as to set the hydraulic pressure of the lubricant line 430.

The lubricant line 430 has a brake lubricant line 431 that supplies a lubricant to the brake fiction plate group 93 in the hydraulic brake unit 90, and a forward/rearward-travel lubricant line 432 that supplies a lubricant to the forward-travel friction plate group 53c and the rearward-travel friction plate group 55c in the forward/rearward-travel switch unit 50. A drain fluid exhausted from the lubricant relief valve 435 is reserved in the HST case 35 and is then circulated back to the fluid sump such as the internal space of the vehicle body case 60 or the like.

Figure 10:
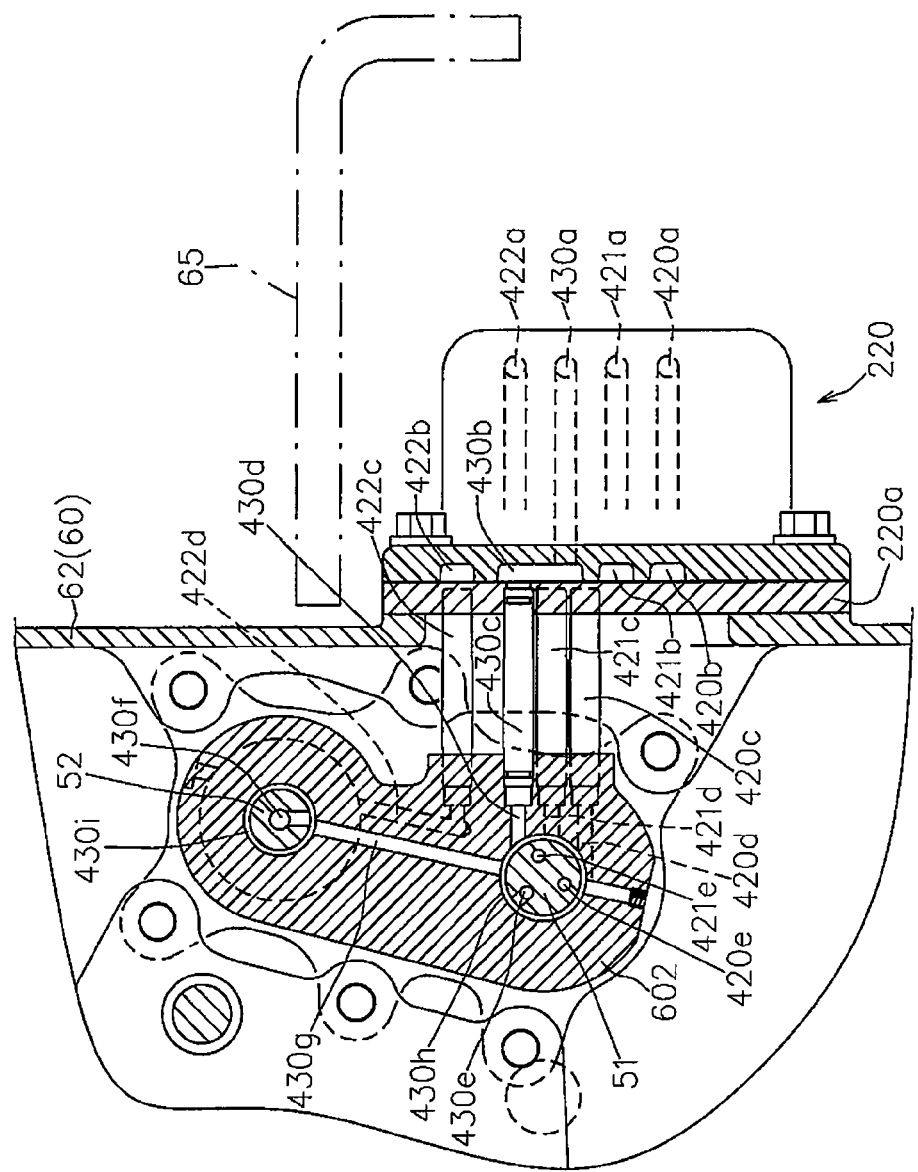
FIG. 10 is a cross-sectional view taken along line X-X indicated in FIG. 6.

FIG. 10 is a cross-sectional view taken along line X-X indicated in FIG. 6.

As shown in FIG. 10, the second bearing wall 602 is supported by the transmission case 62 so as to be suspended within the internal space thereof.

More specifically, the second bearing wall 602 is provided on the periphery thereof with leg portions to be attached with the transmission case 62, while the transmission case 62 is provided on the two inner side surfaces thereof with attachment bosses that are extended toward the leg portions. There are provided four pipes 420c, 421c, 422c, and 430c, which are to be described later, on a surface of the second bearing wall 602 facing the access opening 60c.

As shown in FIG. 6, the forward/rearward-travel solenoid valve 500 and the brake solenoid valve (not shown) are accommodated in the auxiliary pump support block 230 (the first auxiliary pump support block 231).

In the present embodiment, as shown in FIGS. 4B, 6, 7, and 10, the rearward-travel-clutch supply/discharge line 421 has a rearward-travel-clutch first fluid channel 421a formed in the auxiliary pump case 220, a rearward-travel-clutch fluid groove 421b formed in the auxiliary pump case 220 so as to be opened at the surface in contact with the lid 220a, a rearward-travel-clutch second fluid channel 421d formed in the second bearing wall 602, a rearward-travel-clutch pipe 421c for fluidly connecting the rearward-travel-clutch fluid groove 421b with the rearward-travel-clutch second fluid channel 421d, and a rearward-travel-clutch axial hole 421e formed in the forward/rearward-travel driving shaft 51. The rearward-travel-clutch second fluid channel 421d and the rearward-travel-clutch axial hole 421e are fluidly connected with each other by a rearward-travel-clutch rotary joint 421f that is formed between the second bearing wall 602 and the forward/rearward-travel driving shaft 51.

Similarly, the forward-travel-clutch supply/discharge line 420 has a forward-travel-clutch first fluid channel 420a formed in the auxiliary pump case 220, a forward-travel-clutch fluid groove 420b formed in the auxiliary pump case 220 so as to be opened at the surface in contact with the lid 220a, a forward-travel-clutch second fluid channel 420d formed in the second bearing wall 602, a forward-travel-clutch pipe 420c for fluidly connecting the forward-travel-clutch fluid groove 420b with the forward-travel-clutch second fluid channel 420d, and a forward-travel-clutch axial hole 420e formed in the forward/rearward-travel driving shaft 51. The forward-travel-clutch second fluid channel 420d and the forward-travel-clutch axial hole 420e are fluidly connected with each other by a forward-travel-clutch rotary joint 420f that is formed between the second bearing wall 602 and the forward/rearward-travel driving shaft 51.

The brake supply/discharge line 422 has a brake first fluid channel 422a formed in the auxiliary pump case 220, a brake fluid groove 422b formed in the auxiliary pump case 220 so as to be opened at the surface in contact with the lid 220a, a brake second fluid channel 422d formed in the second bearing wall 602, and a brake pipe 422c for fluidly connecting the brake fluid groove 422b with the brake second fluid channel 422d. The brake second fluid channel 422d is fluidly connected to the brake piston 94.

The lubricant line 430 has a lubricant first fluid channel 430a formed in the auxiliary pump case 220, a lubricant fluid groove 430b formed in the auxiliary pump case 220 so as to be opened at the surface that is brought into contact with the lid 220a, a lubricant second fluid channel 430d formed in the second bearing wall 602, a lubricant pipe 430c for fluidly connecting the lubricant fluid groove 430b with the lubricant second fluid channel 430d, a forward/rearward-travel lubricant axial hole 430e formed in the forward/rearward-travel driving shaft 51, a brake lubricant axial hole 430f formed in the forward/rearward-travel driven shaft 52, and a lubricant third fluid channel 430g formed in the second bearing wall 602. The lubricant second fluid channel 430d and the forward/rearward-travel lubricant axial hole 430e are fluidly connected with each other by a forward/rearward-travel lubricant rotary joint 430h that is formed between the second bearing wall 602 and the forward/rearward-travel driving shaft 51. The lubricant third fluid channel 430g is fluidly connected to the brake lubricant axial hole 430f through a brake lubricant rotary joint 430i, which is formed between the second bearing wall 602 and the forward/rearward-travel driven shaft 52, in a state where the lubricant third fluid channel 430g is fluidly connected to the lubricant second fluid channel 430d by the forward/rearward-travel lubricant rotary joint 430h.

The second supply line 450 is branched into a charge line 460 for supplying the HST 30 with a charge fluid and a servo line 470 for supplying the hydraulic servo mechanism 300 with a hydraulic fluid.

The charge line 460 is fluidly connected to the HST lines 100 via a pair of check valves 461, respectively.

The servo line 470 is branched into the servo first supply line 471 and a servo second supply line 472.

As already described, the servo first supply line 471 is fluidly connected to the primary side of the servo switch valve 320.

The servo second supply line 472 is fluidly connected to the primary side of the servo solenoid valve 350. There is provided a servo second drain line 475 that is fluidly connected to the primary side of the servo solenoid valve 350. The secondary side of the servo solenoid valve 350 is fluidly connected to the control piston 340 via a control supply/discharge line 480.

The servo solenoid valve 350 fluidly connects the control supply/discharge line 480 to the servo second supply line 472 when being located at the supply position, while the servo solenoid valve 350 fluidly connects the control supply/discharge line 480 to the servo second drain line 475 and also closes the servo second supply line 472 when being located at the discharge position.

As already described, in the present embodiment, the auxiliary pump 210 is driven with use of a constant-speed rotational power that is transmitted to the planetary gear unit 40. Alternatively, the first PTO transmission shaft 360 can be configured to support an auxiliary pump driving gear 201 (see FIG. 2) in a relatively non-rotatable manner with respect thereto such that the auxiliary pump 210 is driven by the first PTO transmission shaft 360 via the auxiliary pump driving gear 201.

In the configuration in which the hydraulic brake unit 90 or 90B is provided separately from the parking brake unit 260, when the parking brake unit 260 or a pair of travel brake units 15 (see FIG. 2) capable of applying a braking power individually to the pair of main driving wheels 11 is in the brake actuating state, preferably, the control unit 80 may forcibly bring the hydraulic brake unit 90 or 90B into the brake release state.

More specifically, when the parking brake unit 260 or the pair of travel brake units 15 is in the brake actuating state, the working vehicle can be reliably brought into the stop state by either one of these brake units.

On the other hand, if the hydraulic brake unit 90 or 90B is brought into the brake actuating state at the time when the parking brake unit 260 or the pair of travel brake units 15 is in the brake actuating state, both the upstream and downstream sides of the multistage speed-change unit 250 in the power transmission direction are locked, and there may be caused a defect that the shifting operation cannot or is hard to be performed in the multistage speed-change unit 250.

Therefore, in the case where the parking brake unit 260 or the pair of travel brake units 15 is in the brake actuating state, it is preferable that the working vehicle is stopped by a braking power of one of these brake units while the hydraulic brake unit 90 or 90B being brought into the brake release state.

Whether or not the pair of travel brake units 15 are in the brake actuating state is determined based on a signal transmitted from a travel brake operating-position detecting member 840 that detects the operating position of a travel brake operating member capable of being manually operated.

In order to realize the above control operation in the configuration provided with the single solenoid valve 910 (FIG. 9), there is provided an unloading solenoid valve (not shown) interposed in the brake supply/discharge line 422, and the unloading solenoid valve is located at an unloading position in accordance with the actuation(s) of the parking brake unit 260 and/or the pair of travel brake units 15.

Second Embodiment

Described below with reference to the accompanying drawings is a traveling system transmission structure according to another embodiment of the present invention.

Figure 11:
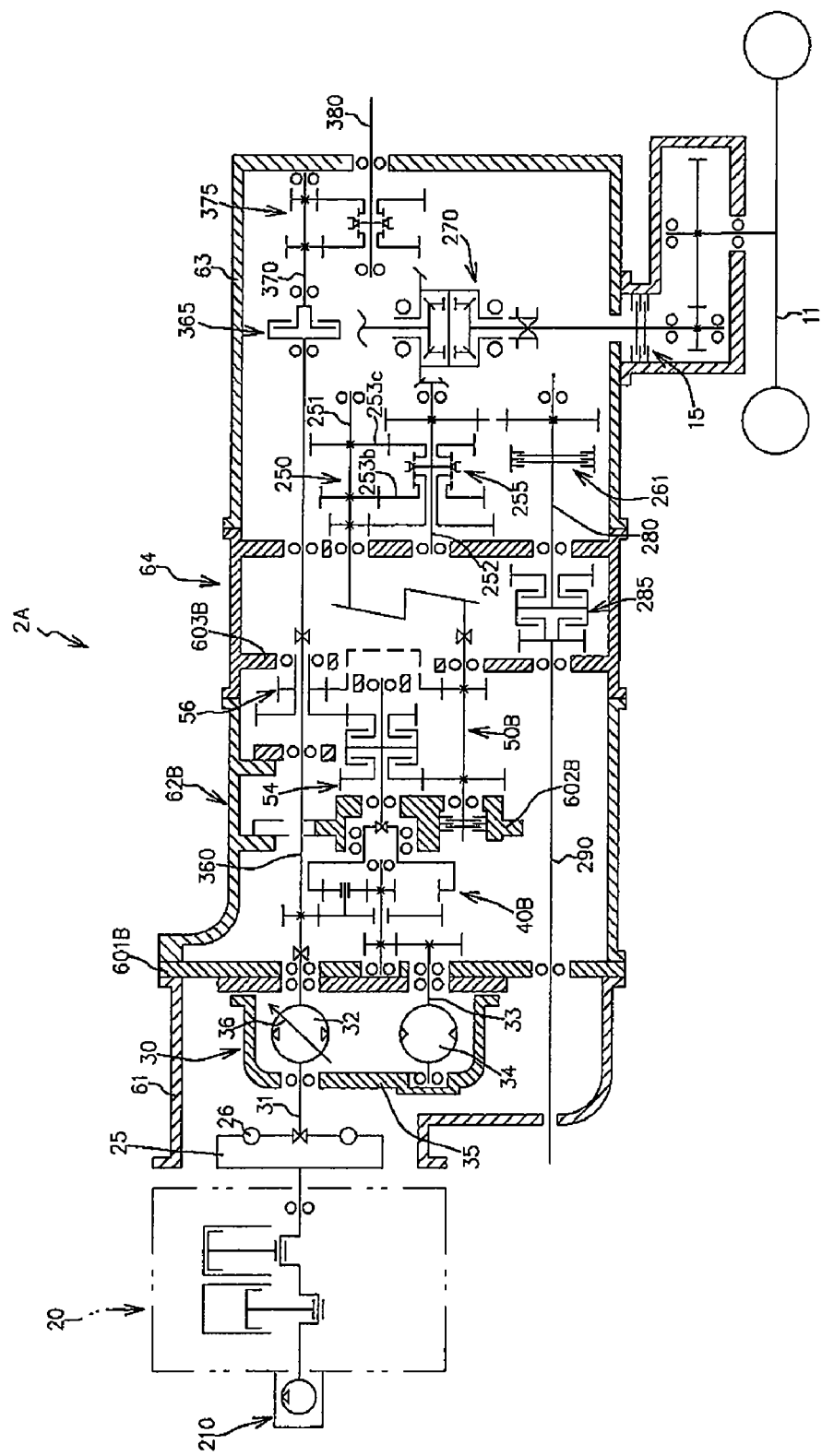
FIG. 11 is a schematic view of a power transmission of a working vehicle to which a traveling system transmission structure according to a second embodiment of the present invention is applied.
Figure 12:
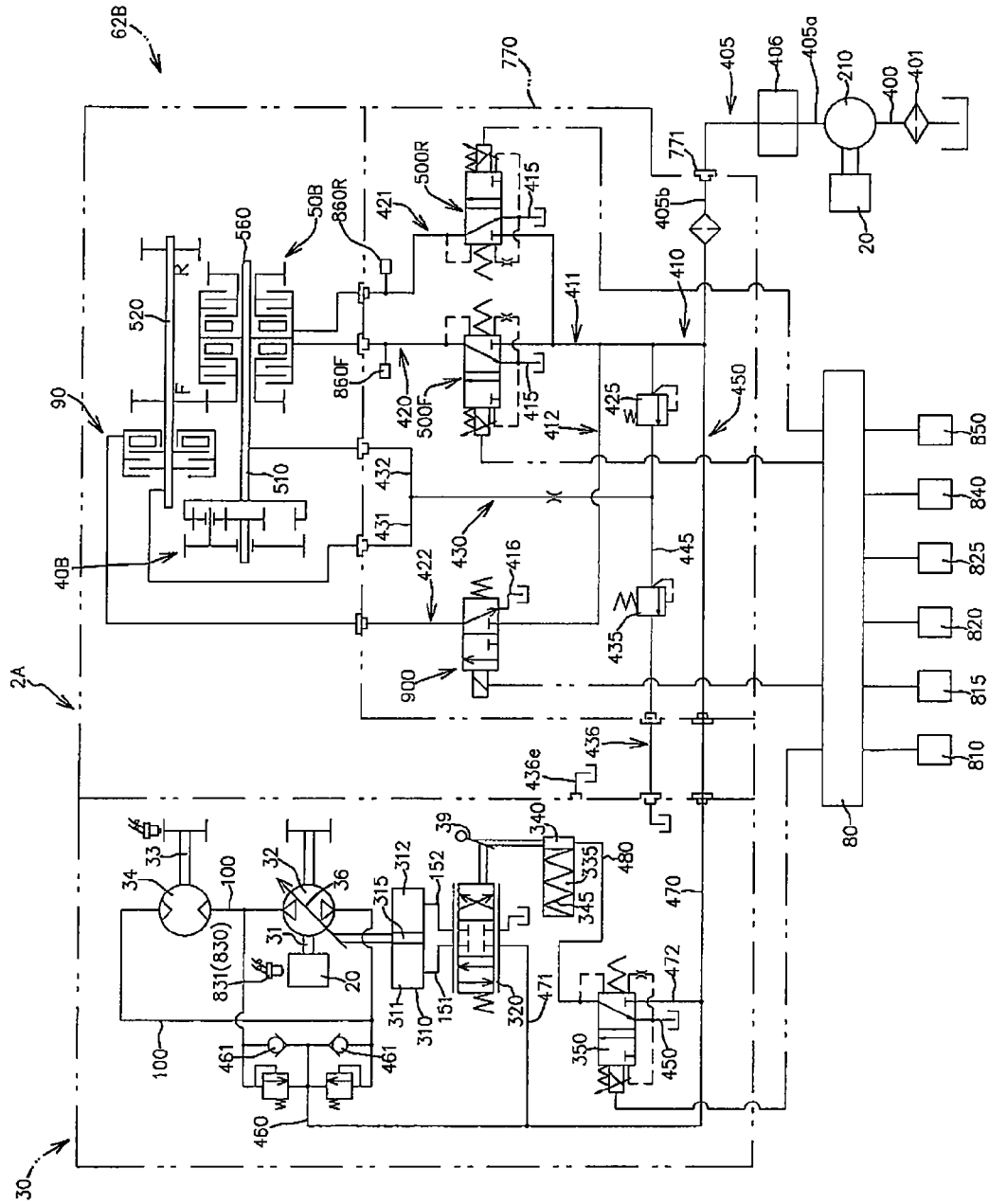
FIG. 12 is a hydraulic circuit diagram of the working vehicle shown in FIG. 11.

FIGS. 11 and 12 are a schematic view of a power transmission and a hydraulic circuit diagram of a working vehicle 2A, to which the traveling system transmission structure according to the present embodiment is applied.

In the drawings, inclusive of FIGS. 11 and 12, which are to be referred in the present embodiment, the members same as those in the first embodiment described above are denoted by the same reference numerals, and detailed description thereof will appropriately not be repeated in the present embodiment.

Similarly to the traveling system transmission structure of the first embodiment, the traveling system transmission structure according to the present embodiment includes a planetary gear unit 40B that has first and second components for receiving a constant-speed rotational power and a variable-speed rotational power respectively, as well as a third component for outputting a combined rotational power of the constant and variable-speed rotational powers, a forward/rearward-travel switch unit 50B that operatively receives the combined rotational power outputted from the third component, and a transmission case 62B that accommodates the planetary gear unit 40B and the forward/rearward-travel switch unit 50B.

Figure 13:
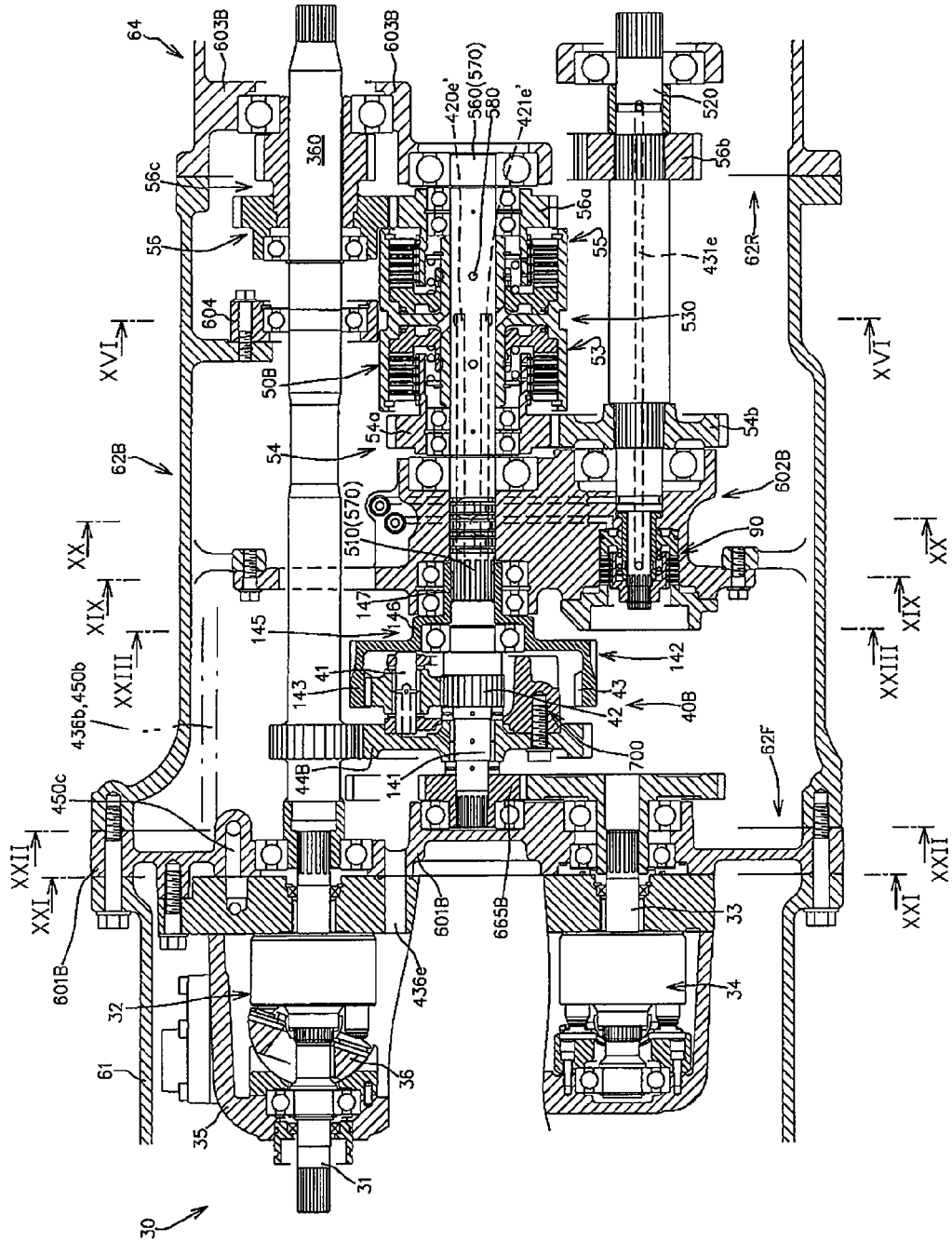
FIG. 13 is a developed vertical cross-sectional view of a transmission case and the periphery thereof in the traveling system transmission structure according to the second embodiment.

FIG. 13 is a developed vertical cross-sectional view of the transmission case 62B and the periphery thereof.

The transmission case 62B has a configuration substantially same as that of the transmission case 62 in the first embodiment.

Specifically, as shown in FIG. 13, similarly to the transmission case 62 of the first embodiment, the transmission case 62B has a front opening 62F that is provided on a front side and has a size allowing the planetary gear unit 40B to be inserted therethrough, a rear opening 62R that is provided on a rear side and has a size allowing the forward/rearward-travel switch unit 50B to be inserted therethrough, and an intermediate bearing wall 602B that is provided in the intermediate portion in the vehicle lengthwise direction.

It is noted that the second bearing wall 602 of the transmission case 62 in the first embodiment corresponds to the intermediate bearing wall 602B.

As shown in FIG. 13, similarly to the planetary gear unit 40 of the first embodiment, the planetary gear unit 40B has a sun gear shaft 141 (the variable-speed power input shaft 660 of the first embodiment) that supports the sun gear 42 in a relatively non-rotatable manner with respect thereto, and a planetary outputting member 142 (the HMT output shaft 670 of the first embodiment) that is connected to the third component of the planetary gear unit 40B in a relatively non-rotatable manner with respect thereto about the axis line of the planetary gear unit.

In both of the first and second embodiments, the sun gear 42 functions as the second component for receiving the variable-speed rotational power, the carrier 41 functions as the first component for receiving the constant-speed rotational power, and the internal gear 43 functions as the third component for outputting the combined rotational power. However, the present invention is obviously not limited to this configuration.

Figure 14:
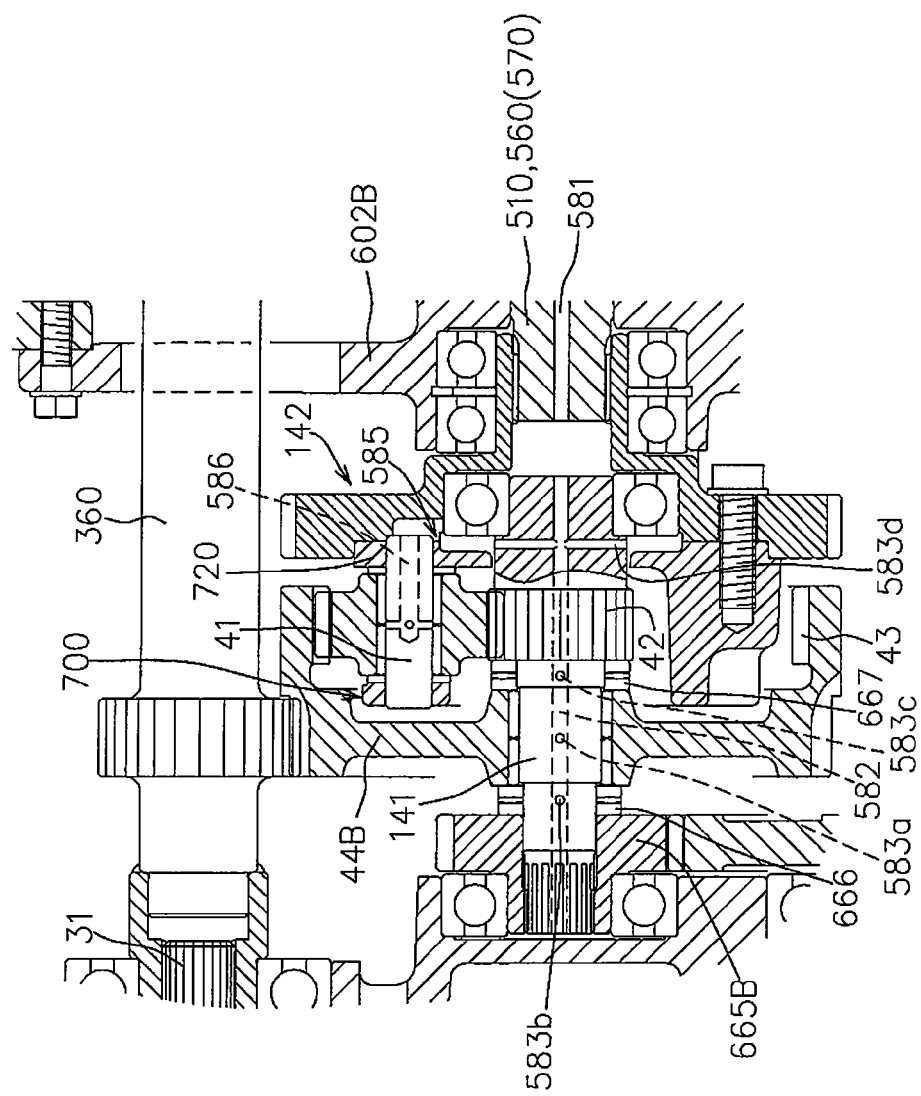
FIG. 14 is a partial vertical cross-sectional view of a traveling system transmission structure according to a first modification of the second embodiment.

FIG. 14 is a partial vertical cross-sectional view of a traveling system transmission structure according to a first modification.

As in the traveling system transmission structure according to the first modification shown in FIG. 14, in the configuration in which the sun gear 42 functions as the second component, the internal gear 43 may function as the first component for receiving the constant-speed rotational power and the carrier 41 may function as the third component for outputting the combined rotational power.

Alternatively, the sun gear 42 may function as the first component for receiving the constant-speed rotational power. In such a configuration, the sun gear shaft 141 functions as the constant-speed power input shaft for receiving the constant-speed rotational power.

In the case where the sun gear 42 functions as the first component, one of the carrier 41 and the internal gear 43 functions as the second component while the other one thereof functions as the third component.

In the present embodiment as well as in the first embodiment, the HST 30 is used as the member for outputting the variable-speed rotational power, and the second component of the planetary gear unit 40B or 40 operatively receives the variable-speed rotational power from the motor shaft 33 of the HST 30, while the first component thereof operatively receives the constant-speed rotational power from the driving power source 20 by way of the pump shaft 31 of the HST 30. However, the present invention is not limited to the configuration.

Specifically, the traveling system transmission structure according to the present invention could be applied to a working vehicle that includes a constant electric motor for outputting the constant-speed rotational power and a variable electric motor for outputting the variable-speed rotational power, as well as to a working vehicle that includes an engine for outputting the constant-speed rotational power and a variable electric motor for outputting the variable-speed rotational power.

The forward/rearward-travel switch unit 50B is in common with the forward/rearward-travel switch unit 50 in the first embodiment in having a forward/rearward-travel input shaft 510 (the forward/rearward-travel driving shaft 51 in the forward/rearward-travel switch unit 50) that operatively receives the combined rotational power, a forward/rearward-travel output shaft 520 (the forward/rearward-travel driven shaft 52 in the forward/rearward-travel switch unit 50) that outputs the rotational power to the travel unit, a forward/rearward-travel clutch mechanism 530 (the forward-travel hydraulic clutch 53 and the rearward-travel hydraulic clutch 55 in the forward/rearward-travel switch unit 50) that is capable of changing the rotational direction of the rotational power transmitted from the forward/rearward-travel input shaft 510 to the forward/rearward-travel output shaft 520, and a clutch shaft 560 (the forward/rearward-travel driving shaft 51 in the forward/rearward-travel switch unit 50) that is disposed coaxially with the forward/rearward-travel input shaft 510 and supports the forward/rearward-travel clutch mechanism 530.

As shown in FIG. 13, in the forward/rearward-travel switch unit 50B, the forward/rearward-travel input shaft 510 and the clutch shaft 560 are formed integrally with each other to be provided as a single shaft 570.

Similarly, in the forward/rearward-travel switch unit 50 in the first embodiment, the forward/rearward-travel driving shaft 51 functions as both of the forward/rearward-travel input shaft 510 and the clutch shaft 560.

More specifically, a portion of the forward/rearward-travel driving shaft 51 that is positioned on a front side functions as the forward/rearward-travel input shaft 510 for operatively receiving the combined rotational power, while a portion of the forward/rearward-travel driving shaft 51 that is positioned on a rear side functions as the clutch shaft 560 for supporting the forward/rearward-travel clutch mechanism 530.

As described above, in the present embodiment as well as in the first embodiment, the forward/rearward-travel input shaft 510 and the clutch shaft 560 are formed integrally with each other to be provided as the single shaft 570. However, the present invention is not limited to the configuration.

Figure 15:
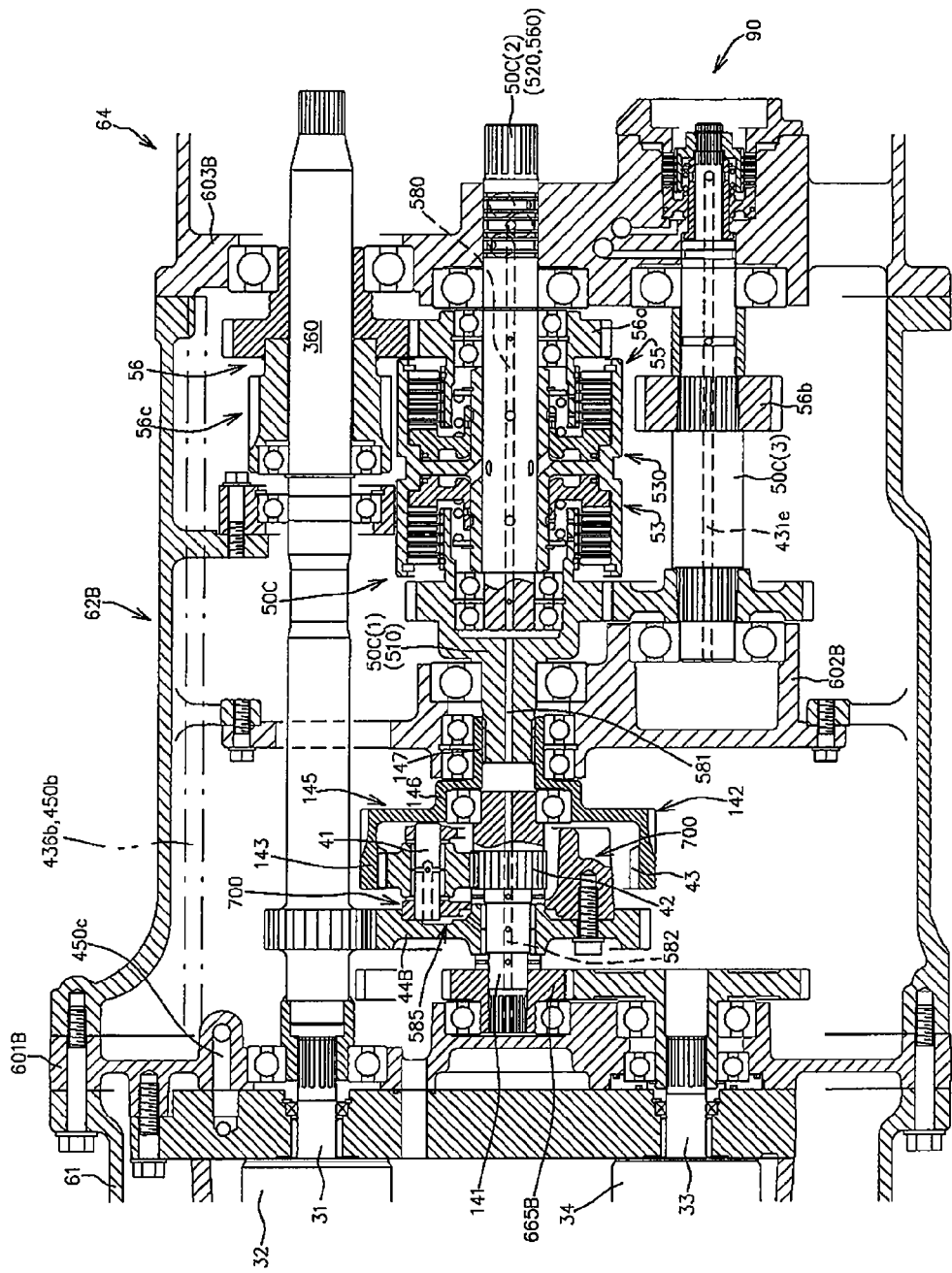
FIG. 15 is a vertical cross-sectional view of a traveling system transmission structure according to a second modification of the second embodiment.

FIG. 15 is a vertical cross-sectional view of a traveling system transmission structure according to a second modification, including a forward/rearward-travel switch unit 50C that is provided with the forward/rearward-travel input shaft 510 and the clutch shaft 560 separately from each other.

In the second modification shown in FIG. 15, the forward/rearward-travel switch unit 50C has a first shaft 50C(1) operatively connected to the third component, a second shaft 50C(2) that is disposed coaxially with the first shaft 50C(1) in a state of being relatively rotatable about the axis line with respect to the first shaft 50C(1), a third shaft 50C(3) disposed in parallel with the second shaft 50C(2), and the forward/rearward-travel clutch mechanism 530 including the forward-travel hydraulic clutch 53 and the rearward-travel hydraulic clutch 55.

In the second modification, as shown in FIG. 15, the forward-travel hydraulic clutch 53 is supported by the second shaft 50C(2) so as to selectively engage or disengage a power transmission from the first shaft 50C(1) to the second shaft 50C(2). Further, the rearward-travel hydraulic clutch 55 is supported by the second shaft 50C(2) so as to selectively engage or disengage the power transmission from the first shaft 50C(1) to the second shaft 50C(2) by way of the third shaft 50C(3).

In the forward/rearward-travel switch unit 50C, the first shaft 50C(1) functions as the forward/rearward-travel input shaft 510, while the second shaft 50C(2) functions as both of the forward/rearward-travel output shaft 520 and the clutch shaft 560.

In the present embodiment as well as in the second modification, the rearward-travel gear train 56 in the forward/rearward-travel switch unit 50B or 50C transmits rotational power in the vehicle rearward-travel direction to the forward/rearward-travel output shaft 520 with use of the first PTO transmission shaft 360.

Figure 16:
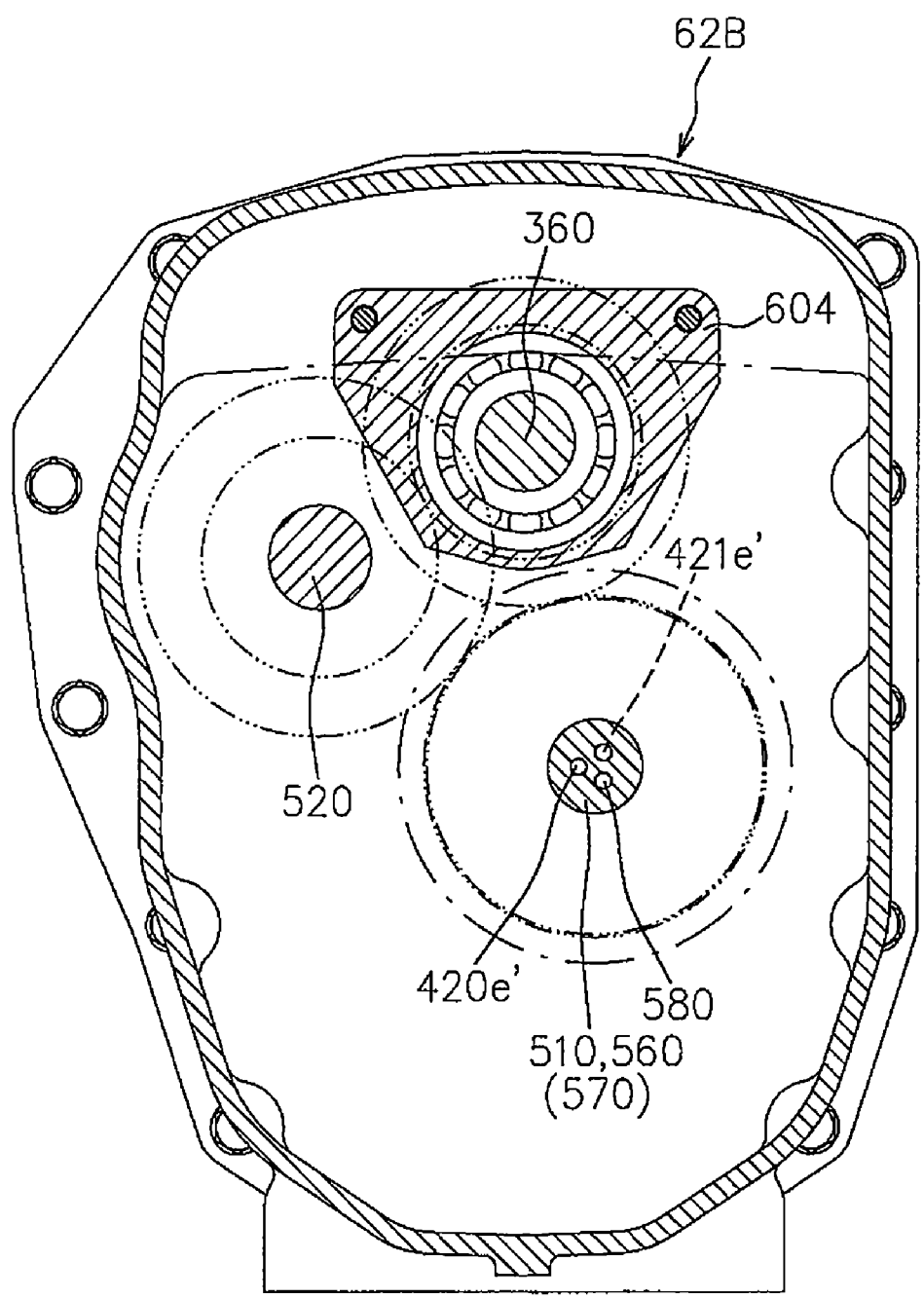
FIG. 16 is a cross-sectional view taken along line XVI-XVI indicated in FIG. 13.

FIG. 16 is a cross-sectional view taken along line XVI-XVI indicated in FIG. 13.

As shown in FIGS. 13 and 16, in the present embodiment, the rearward-travel gear train 56 has the rearward-travel driving gear 56a that is supported by the clutch shaft 560 so as to be relatively rotatable with respect thereto in a state of being operatively connected to the driven side of the rearward-travel hydraulic clutch 55, the rearward-travel driven gear 56b that is supported by the forward/rearward-travel output shaft 520 in a relatively non-rotatable with respect thereto, and a counter gear 56c that transmits the rotational power of the rearward-travel driving gear 56a to the rearward-travel driven gear 56b, wherein the counter gear 56c is supported by the first PTO transmission shaft 360 in a relatively rotatable manner with respect thereto.

A reference numeral 604 in FIGS. 13 and 16 denotes a bearing wall that is provided to the transmission case 62B so as to support the first PTO transmission shaft 360 via a bearing member.

Similarly to the traveling system transmission structure according to the first embodiment, the traveling system transmission structure according to the present embodiment is configured as follows.

As shown in FIG. 13, the front end portion of the sun gear shaft 141 is directly or indirectly supported in a rotatable manner around the axis line by a front bearing wall 601B that is detachably connected to the front side of the transmission case 62B, and the rear end portion of the planetary outputting member 142 is directly or indirectly supported in a rotatable manner around the axis line by the intermediate bearing wall 602B, so that the planetary gear unit 40B is accommodated in a front chamber that is sandwiched by the front bearing wall 601B and the intermediate bearing wall 602B.

On the other hand, the front end portion of the forward/rearward-travel input shaft 510 is directly or indirectly supported by the intermediate bearing wall 602B in a rotatable manner around the axis line in a state of being connected to the planetary outputting member 142 so as to be relatively non-rotatable with respect thereto about the axis line, and the rear end portion of the clutch shaft 560 is supported in a rotatable manner around the axis line by a rear bearing wall 603B that is detachably connected to the rear side of the transmission case 62B, so that the forward/rearward-travel switch unit 50B is accommodated in a rear chamber that is sandwiched by the intermediate bearing wall 602B and the rear bearing wall 603B.

In the first embodiment, the first to third bearing walls 601 to 603 correspond to the front bearing wall 601B, the intermediate bearing wall 602B and the rear bearing wall 603B, respectively.

As shown in FIG. 11, in the present embodiment, there is provided an intermediate case 64 between the transmission case 62B and the rear case 63, and the rear bearing wall 603B is formed integrally with the intermediate case 64.

In comparison with the conventional traveling system transmission structure where the clutch shaft of the forward/rearward-travel switch unit has the front end portion supported by the front bearing wall and the rear end portion supported by the rear bearing wall, and the sun gear shaft of the planetary gear unit is externally fitted around the clutch shaft of the forward/rearward-travel switch unit, the traveling system transmission structure with the above-explained configuration makes it possible to reduce the planetary gear unit 40B in size with respect to a radial direction, thereby allowing the speed reduction ratio of the planetary gear unit 40B to be set to a desired value without involving increase in size of the planetary gear unit 40B.

More specifically, in the conventional traveling system transmission structure described above, the clutch shaft needs to have a large length, which requires increase in diameter of the clutch shaft in order to prevent the clutch shaft from being bent. As a result, increase in diameter is required also to the sun gear shaft which is externally fitted around the clutch shaft.

Increase in diameter of the sun gear shaft causes increase in diameter of the sun gear which is provided to the sun gear shaft. Accordingly, the entire planetary gear unit needs to be radially enlarged in order to obtain a desired speed reduction ratio.

To the contrary, as already described, in the traveling system transmission structure according to the present embodiment as well as according to the first embodiment, the front end portion of the sun gear shaft 141 (the variable-speed power input shaft 660 in the first embodiment) is directly or indirectly supported in a rotatable manner around the axis line by the front bearing wall 601B (the first bearing wall 601 in the first embodiment), and the rear end portion of the planetary outputting member 142 (the HMT output shaft 670 in the first embodiment) is directly or indirectly supported in rotatable manner around the axis line by the intermediate bearing wall 602B (the second bearing wall 602 in the first embodiment), so that the planetary gear unit 40B (40) is accommodated in the front chamber that is sandwiched by the front bearing wall 601B (601) and the intermediate bearing wall 602B (602). Furthermore, the front end portion of the forward/rearward-travel input shaft 510 (the forward/rearward-travel driving shaft 51 in the first embodiment) is directly or indirectly supported by the intermediate bearing wall 602B (602) in a rotatable manner around the axis line in a state of being connected to the planetary outputting member 142 (670) so as to be relatively non-rotatable with respect thereto about the axis line, and the rear end portion of the clutch shaft 560 (the forward/rearward-travel driving shaft 51 in the first embodiment) is supported in a rotatable manner around the axis line by the rear bearing wall 603B (the third bearing wall 603 in the first embodiment), so that the forward/rearward-travel switch unit 50B (50) is accommodated in the rear chamber that is sandwiched by the intermediate bearing wall 602B (602) and the rear bearing wall 603B (603).

The diameter of the sun gear shaft 141 (660) can be therefore set irrespective of the diameter of the clutch shaft 560 (51), so that the speed reduction ratio of the planetary gear unit 40B (40) can be set to a desired value without increasing the planetary gear unit 40B (40) in a radially outward direction.

Moreover, in the conventional traveling system transmission structure, the rear bearing wall for supporting the rear end portion of the clutch shaft is formed integrally with the peripheral wall part of the transmission case that surrounds the planetary gear unit and the forward/rearward-travel switch unit. In this configuration, both of the planetary gear unit and the forward/rearward-travel switch unit need to be inserted to the peripheral wall part from the front portion thereof.

To the contrary, in the traveling system transmission structure according to the present embodiment as well as according to the first embodiment, the transmission case 62B (62) includes the front opening 62F that is provided on the front side and has such a size as to allow the planetary gear unit 40B (40) to be inserted therethrough, as well as the rear opening 62R that is provided on the rear side and has such a size as to allow the forward/rearward-travel switch unit 50B (50) to be inserted therethrough.

Further, with the rear end portion of the planetary outputting member 142 (670) being directly or indirectly supported by the intermediate bearing wall 602B (602) of the transmission case 62B (62), the front end portion of the sun gear shaft 141 (660) is directly or indirectly supported by the front bearing wall 601B (601) that is detachably connected to the front side of the transmission case 62B (62).

Moreover, the front end portion of the forward/rearward-travel input shaft 510 (51) is directly or indirectly supported by the intermediate bearing wall 602B (602) while being connected to the planetary outputting member 142 (670) in a relatively non-rotatable manner with respect thereto about the axis line, and the rear end portion of the clutch shaft 560 (51) is supported by the rear bearing wall 603B (603) that is detachably connected to the rear side of the transmission case 62B (62).

In the traveling system transmission structures with the above configuration according to the present embodiment and the first embodiment, the planetary gear unit 40B (40) and the forward/rearward-travel switch unit 50B (50) can be independently installed into the transmission case 62B (62) from the front side and the rear side, respectively.

Therefore, in comparison with the conventional traveling system transmission structure, the traveling system transmission structures according to the present embodiment and the first embodiment make it possible to achieve improved efficiency in assembling the planetary gear unit 40B (40) and the forward/rearward-travel switch unit 50B (50) into the transmission case 62B (62).

Figure 17:
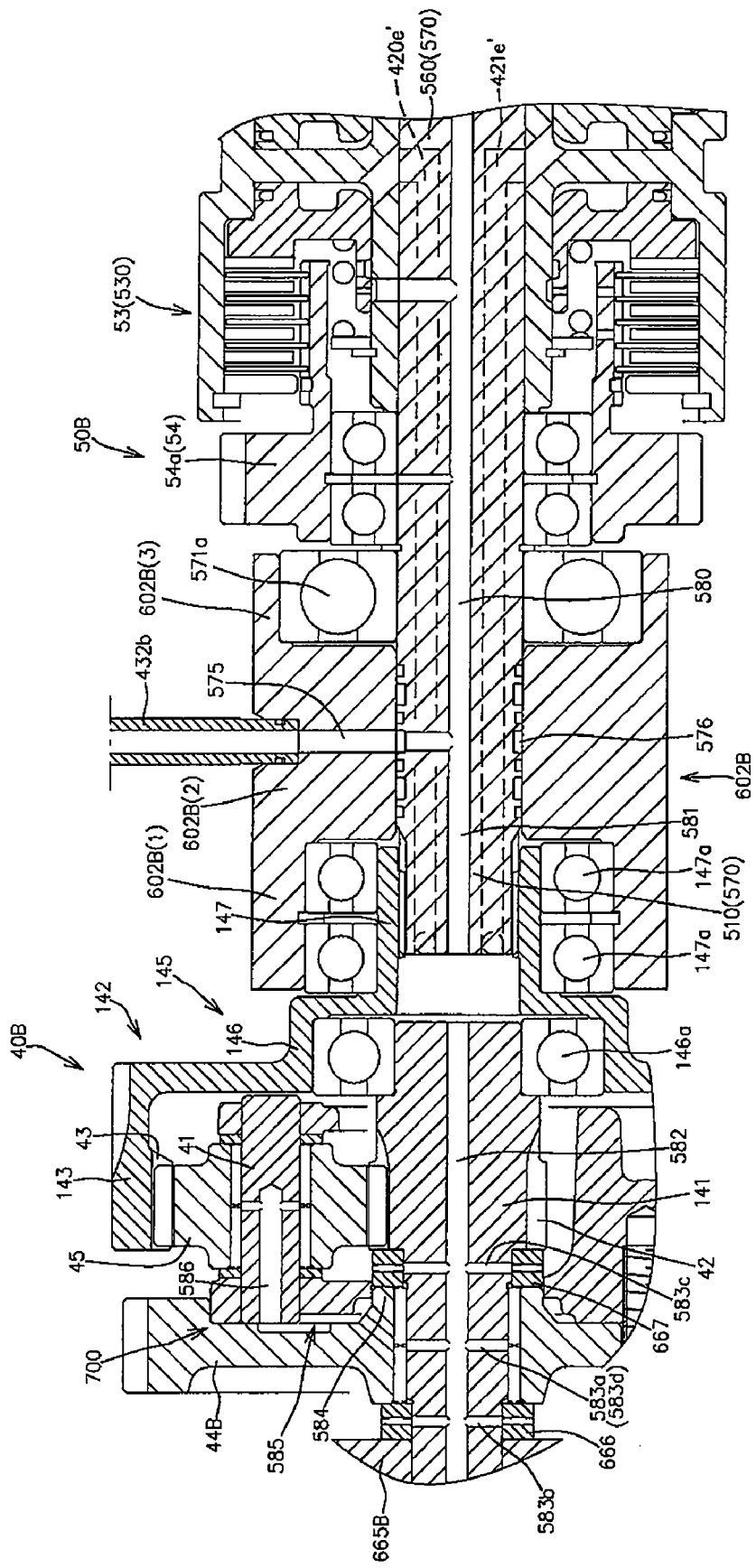
FIG. 17 is a partially enlarged horizontal cross-sectional view of a planetary gear unit and a forward/rearward-travel switch unit as well as the periphery thereof in the traveling system transmission structure according to the second embodiment.

FIG. 17 is a partially enlarged horizontal cross-sectional view of the planetary gear unit 40B and the forward/rearward-travel switch unit 50B as well as the periphery thereof.

As shown in FIGS. 13 and 17, similarly to the HMT output shaft 670 of the first embodiment, the planetary outputting member 142 has a connecting portion 143 that is connected to the third component, and a hollow cylindrical portion 145 that extends from the connecting portion 143 toward the forward/rearward-travel switch unit 50B and is directly or indirectly supported by the intermediate bearing wall 602B.

In the present embodiment, the connecting portion 143 is formed integrally with the internal gear 43 that functions as the third component.

The front end portion of the forward/rearward-travel input shaft 510 is fitted into the cylindrical portion 145 from the rear side of the cylindrical portion 145 so as to be relatively non-rotatable with respect thereto about the axis line. The rear end portion of the sun gear shaft 141 is inserted into the cylindrical portion 145 from the front side of the cylindrical portion 145 so as to be faced the front end of the forward/rearward-travel input shaft 510, and is supported by the cylindrical portion 145 in a relatively rotatable manner with respect thereto about the axis line.

The traveling system transmission structures configured as described above according to the present embodiment as well as the first embodiment make it possible to stably support the sun gear shaft 141 while reducing the sun gear shaft 141 in diameter.

As shown in FIGS. 4B, 13 and 17, in the present embodiment as well as in the first embodiment, the cylindrical portion 145 includes a front-side cylindrical portion 146 that extends from the connecting portion 143, and a rear-side cylindrical portion 147 that extends rearward from the front-side cylindrical portion 146 and has a diameter smaller than that of the front-side cylindrical portion 146.

As shown in FIG. 17, the front-side cylindrical portion 146 is externally fitted around the rear end portion of the sun gear shaft 141 via a bearing member 146a.

The rear-side cylindrical portion 147 is externally fitted around the front end portion of the forward/rearward-travel input shaft 510 in a relatively non-rotatable manner with respect thereto about the axis line in a state of being supported in a rotatable manner around the axis line by the intermediate bearing wall 602B via a bearing member 147a that is disposed on the outer peripheral surface.

As shown in FIG. 4B, in the HMT output shaft 670 in the first embodiment, the cylindrical portion is provided separately from the connecting portion that is formed integrally with the internal gear 43 functioning as the third component, and the connecting portion and the cylindrical portion are connected with each other in a separable manner via a fastening member in a state that they are connected through a gear engagement so as to be relatively non-rotatable to each other about the axis line.

To the contrary, in the planetary outputting member 142 in the present embodiment, as shown in FIGS. 13 and 17, the connecting portion 143 and the cylindrical portion 145 are formed integrally with each other.

In a preferable configuration, the lubricant to be supplied to the forward/rearward-travel clutch mechanism 530 can be partially supplied to the planetary gear unit 40B.

More specifically, as shown in FIGS. 13 to 15 and 17, the clutch shaft 560 is provided with a forward/rearward-travel lubricant fluid supply channel 580 for guiding the lubricant from a fluid source to the forward/rearward-travel clutch mechanism 530.

In the traveling system transmission structure according to the first embodiment, the forward/rearward-travel lubricant axial hole 430*e* formed in the forward/rearward-travel driving shaft 51 that functions as both of the forward/rearward-travel input shaft 510 and the clutch shaft 560 corresponds to the forward/rearward-travel lubricant fluid supply channel 580.

The supply of the lubricant to the planetary gear unit 40B (40) is performed with use of the forward/rearward-travel lubricant fluid supply channel 580.

Specifically, there is provided a lubricant fluid connective channel 581 that is formed in the forward/rearward-travel input shaft 510 and has a front end opened in the front end surface of the forward/rearward-travel input shaft 510 inside the cylindrical portion 145 in a state of being fluidly connected to the forward/rearward-travel lubricant fluid supply channel 580. Also provided is a lubricant fluid introductive channel 582 that is formed in the sun gear shaft 141 and has a rear end opened at the rear end surface of the sun gear shaft 141 inside the cylindrical portion 145. Accordingly, the lubricant is introduced from the front end of the lubricant fluid connective channel 581 to the rear end of the lubricant fluid introductive channel 582 through the cylindrical portion 145.

According to the above configuration, the lubricant flown in the forward/rearward-travel lubricant fluid supply channel 580, which is formed in the clutch shaft 560, could be partially guided toward the planetary gear unit 40B (40) with high reliability.

As already described, in the present embodiment, the first modification and the first embodiment, the clutch shaft 560 and the forward/rearward-travel input shaft 510 are formed integrally with each other by the single shaft 570.

In the configuration, the lubricant fluid connective channel 581 is configured so as to have a rear end fluidly connected to the forward/rearward-travel lubricant fluid supply channel 580 and a front end opened in the front end surface of the single shaft 570 inside the cylindrical portion 145.

To the contrary, in the second modification shown in FIG. 15, the forward/rearward-travel input shaft 510 and the clutch shaft 560 are separately provided and are disposed coaxially with each other.

In the configuration, as shown in FIG. 15, there can be provided a concave portion that is formed in one of the rear end portion of the forward/rearward-travel input shaft 510 and the front end portion of the clutch shaft 560, and allows the other one of the end portions to be inserted into the one of the end portions so that the other one of the end portions is supported by the concave portion in the one of the end portions via a bearing member. Further, the forward/rearward-travel lubricant fluid supply channel 580 may be configured so as to have a front end opened at the front end of the clutch shaft 560 inside the concave portion. Furthermore, the lubricant fluid connective channel 581 may be configured so as to have a rear end opened at the rear end of the forward/rearward-travel input shaft 510 inside the concave portion and a front end opened at the front end of the forward/rearward-travel input shaft 510 inside the cylindrical portion 145.

In the present embodiment shown in FIGS. 13 and 17, in the first modification shown in FIG. 14, and in the first embodiment shown in FIG. 4B, as described above, the forward/rearward-travel input shaft 510 and the clutch shaft 560 are formed integrally by the single shaft 570.

In the configuration, the intermediate bearing wall 602B (602) may be formed with an intermediate-bearing-wall-side forward/rearward-travel lubricant fluid channel 575 that is fluidly connected to the fluid source and is fixedly located, and a forward/rearward-travel lubricant rotary joint 576 that fluidly connects the intermediate-bearing-wall-side forward/rearward-travel lubricant fluid channel 575 with the forward/rearward-travel lubricant fluid supply channel 580 or the lubricant fluid connective channel 581.

Specifically, as shown in FIG. 17, the intermediate bearing wall 602B includes a planetary-gear-unit-side support region 602B(1), a forward/rearward-travel-switch-unit-side support region 602B(3), and an intermediate region 602B(2). The planetary-gear-unit-side support region 602B(1) supports the cylindrical portion 145 via the bearing member 147*a*. The forward/rearward-travel-switch-unit-side support region 602B(3) supports the single shaft 570 via a bearing member 571*a*. The intermediate region 602B(2) is located between the planetary-gear-unit-side support region 602B(1) and the forward/rearward-travel-switch-unit-side support region 602B(3).

The intermediate region 602B(2) is formed with the forward/rearward-travel lubricant rotary joint 576 that fluidly connects the intermediate-bearing-wall-side forward/rearward-travel lubricant fluid channel 575 with the forward/rearward-travel lubricant fluid supply channel 580 or the lubricant fluid connective channel 581.

The configuration makes it possible to reliably introduce the lubricant from the fluid source into the forward/rearward-travel lubricant fluid supply channel 580 and the lubricant fluid connective channel 581, while realizing stable support for the single shaft 570.

As shown in FIGS. 13 to 17 and 4B, the lubricant fluid introductive channel 582 has a rear end opened inside the cylindrical portion 145 so as to receive the lubricant from the front end of the lubricant fluid connective channel 581 via the cylindrical portion 145, and also has a front end opened in a bearing concave portion of the front bearing wall 601B (601).

Such a configuration makes it possible to realize effective supply of the lubricant to a bearing member provided in the bearing concave portion.

The sun gear shaft 141 may be formed with a lubricant fluid distributive channel that distributes the lubricant in the lubricant fluid introductive channel 582 toward a different component.

As shown in FIG. 4B, in the first embodiment, the carrier gear 44 for transmitting the constant-speed rotational power to the carriers 41 is supported by the variable-speed power input shaft 660, which functions as the sun gear shaft 141, in a relatively rotatable manner with respect thereto.

In the configuration, the variable-speed power input shaft 660 is formed with a first lubricant fluid distributive channel 583*a* that has a first end fluidly connected to the lubricant fluid introductive channel 582 and a second end opened at an outer surface of a portion for supporting the carrier gear 44.

In the present embodiment shown in FIG. 13, in the first modification shown in FIG. 14, and in the second modification shown in FIG. 15, there is provided a first rotational power input gear 44B that is supported by the sun gear shaft 141 in a relatively rotatable manner with respect thereto.

In the present embodiment shown in FIG. 13 as well as in the second modification shown in FIG. 15, the first rotational power input gear 44B transmits the constant-speed rotational power to the carrier 41.

To the contrary, in the first modification shown in FIG. 14, the first rotational power input gear 44B transmits the constant-speed rotational power to the internal gear 43.

The sun gear shaft 141 is formed with the first lubricant fluid distributive channel 583a (see FIGS. 14 and 17) that has the first end fluidly connected to the lubricant fluid introductive channel 582 and the second end opened in the outer surface of the portion for supporting the first rotational power input gear 44B.

In each of the configurations shown in FIGS. 13 to 15, the sun gear shaft 141 is provided with a second rotational power input gear 665B for transmitting the variable-speed rotational power to the sun gear 42, and a first thrust bearing 666 located between the first rotational power input gear 44B and the second rotational power input gear 665B.

In the configuration, the sun gear shaft 141 may be formed with a second lubricant fluid distributive channel 583b (see FIGS. 14 and 17) that has a first end fluidly connected to the lubricant fluid introductive channel 582 and a second end opened at an outer surface of a portion for supporting the first thrust bearing 666.

Furthermore, in each of the configurations shown in FIGS. 13 to 15, the sun gear shaft 141 is provided with a second thrust bearing 667 that is located between the sun gear 42 and the first rotational power input gear 44B.

In the configuration, the sun gear shaft 141 may be formed with a third lubricant fluid distributive channel 583c (see FIGS. 14 and 17) that has a first end fluidly connected to the lubricant fluid introductive channel 582 and a second end opened at an outer surface of a portion for supporting the second thrust bearing 667.

In the present embodiment as well as in the first and second modifications, the planetary gear unit 40B is provided with a planetary gear lubricant supply structure for supplying a lubricant to the planetary gear 45.

Described below is the planetary gear lubricant supply structure.

As shown in FIG. 17 and the like, the planetary gear unit 40B has the carriers 41 that support the planetary gears 45, which engages with the sun gear 42, in a rotatable manner around the respective axis lines and revolve about the sun gear 42 together with the planetary gears 45, the carriers 41 functioning as one of the first to third components; the internal gear 43 that is provided with internal teeth in engagement with the planetary gears 45 and functions as the other one of the first to third components; a carrier supporting member 700 that supports the carrier 41 so as to be rotated about the sun gear 42 together with the carrier 41; and the first rotational power input gear 44B that is connected to one of the carrier supporting member 700 and the internal gear 43 so as to transmit the constant-speed rotational power or the variable-speed rotational power to the same one of the carrier supporting member 700 and the internal gear 43, the first rotational power input gear 44B being supported by the sun gear shaft 141 in a relatively rotatable manner with respect thereto.

In the present embodiment and in the second modification, the carrier 41 functions as the first component while the internal gear 43 functions as the third component.

To the contrary, in the third modification, the internal gear 43 functions as the first component while the carrier 41 functions as the third component.

Figure 18:
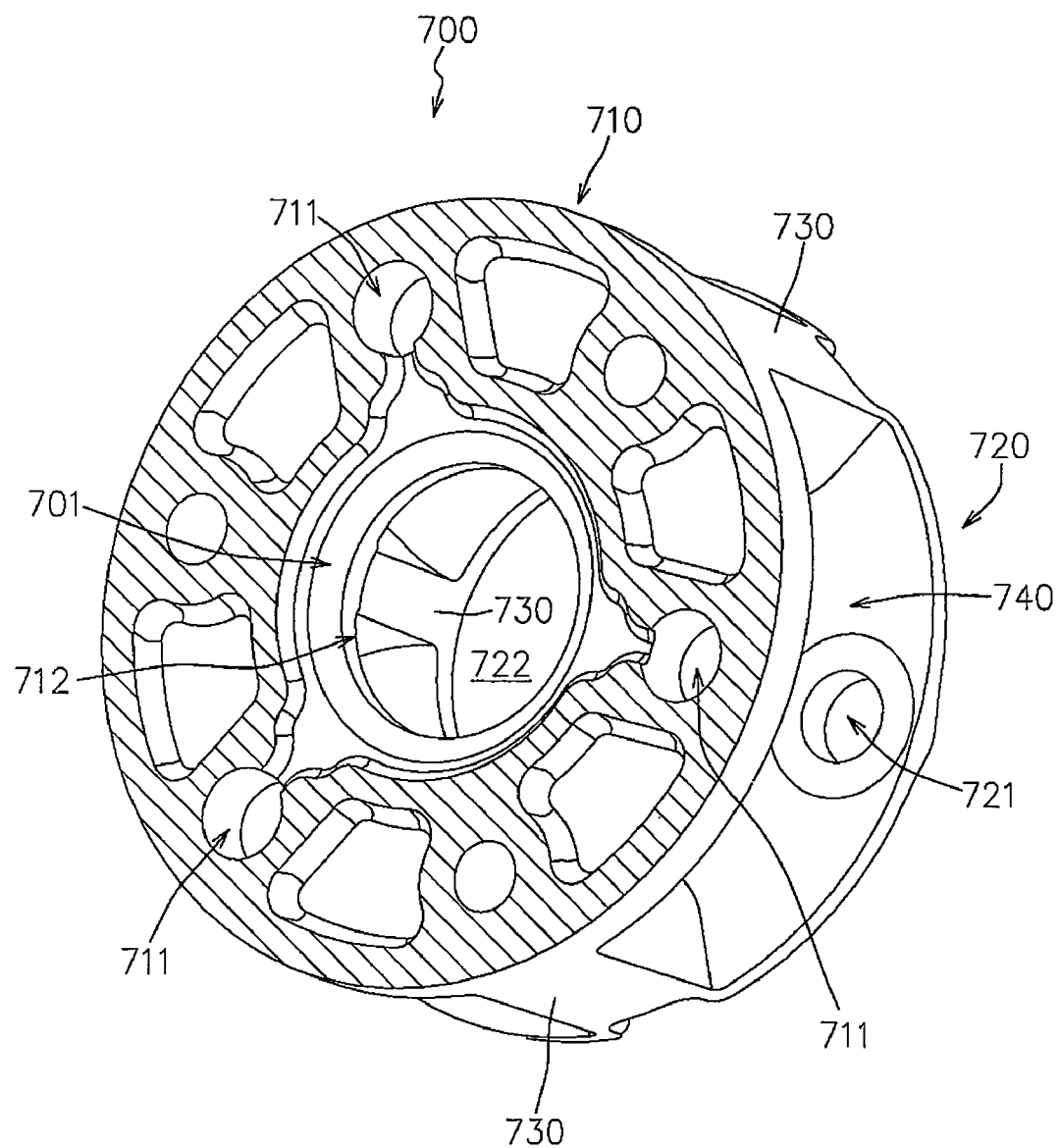
FIG. 18 is a perspective view of a carrier supporting member used in the planetary gear unit of the traveling system transmission structure according to the second embodiment.

FIG. 18 is a perspective view of the carrier supporting member 700 that is adopted in the present embodiment as well as in the second modification.

As shown in FIG. 18, the carrier supporting member 700 has a front wall 710 that is provided with front support holes 711 for supporting the front ends of the carriers 41 and a central opening 712 for allowing the sun gear shaft 141 to be inserted therethrough, a rear wall 720 that is provided with rear support holes 721 for supporting the rear ends of the carriers 41 and a central opening 722 for allowing the sun gear shaft 141 to be inserted therethrough, and a connecting portion 730 for connecting the front wall 710 with the rear wall 720.

In the present embodiment (see FIGS. 13 and 17) as well as in the second modification (see FIG. 15), the carrier supporting member 700 and the first rotational power input gear 44B are configured so that a fluid pocket space 585 is provided between the front wall 710 of the carrier supporting member 700 and the first rotational power input gear 44B so as to radially extend with the sun gear shaft 141 as a reference, the fluid pocket space 585 having a radially inner portion opened toward the outer peripheral surface of the sun gear shaft 141 and a radially outer portion opened toward the corresponding end of the carrier 41.

On the other hand, in the first modification (see FIG. 14), the carrier supporting member 700 and the planetary outputting member 142 are configured so that the fluid pocket space 585 is provided between the rear wall 720 of the carrier supporting member 700 and the planetary outputting member 142 so as to radially extend with the sun gear shaft 141, the fluid pocket space 585 having the radially inner portion opened toward the outer peripheral surface of the sun gear shaft 141 and also having the radially outer portion opened toward the corresponding end of the carrier 41.

The sun gear shaft 141 is formed with a carrier lubricant fluid distributive channel 583d that has a first end fluidly connected to the lubricant fluid introductive channel 582 and a second end opened at the outer peripheral surface of the sun gear shaft 141 so as to be directed to the fluid pocket space 585.

In the present embodiment as well as in the second modification, the first lubricant fluid distributive channel 583a functions as the carrier lubricant fluid distributive channel 583d.

More specifically, as shown in FIG. 17 and the like, in the present embodiment as well as in the second modification, the first rotational power input gear 44B is formed with a connective fluid channel 584 that fluidly connects the first lubricant fluid distributive channel 583a with the fluid pocket space 585. In the configuration, the lubricant in the lubricant fluid introductive channel 582 is introduced into the fluid pocket space 585 by way of the first lubricant fluid distributive channel 583a and the connective fluid channel 584.

On the other hand, in the first modification, as shown in FIG. 14, the carrier lubricant fluid distributive channel 583d is formed in the sun gear shaft 141 such that the first end is fluidly connected to the lubricant fluid introductive channel 582 and the second end is opened in the outer peripheral surface of the sun gear shaft 141 so as to be directed to the fluid pocket space 585.

As shown in FIGS. 14, 17, and the like, the carrier 41 is formed with a planetary gear lubricant fluid channel 586 that has a first end opened at the end (the front end in the present embodiment as well as in the second modification, while the rear end in the first modification) facing the fluid pocket space 585, and a second end opened at the outer surface of a portion of the carrier 41 that supports the planetary gear 45.

The planetary gear lubricant supply structure thus configured makes it possible to achieve reliable supply of the lubricant to the planetary gear 45 as well as to the periphery thereof.

More preferably, the fluid pocket space 585 is formed such that the radially inner portion thereof is opened toward the outer peripheral surface of the sun gear shaft 141 over an entire region in a circumferential direction.

The preferable configuration makes it possible to achieve reliable supply of the lubricant to the planetary gear 45 that has a rotational speed different from that of the sun gear shaft 141.

As shown in FIG. 18, the front wall 710, the rear wall 720, and the connecting portion 730 of the carrier supporting member 700 are formed integrally together such that the carrier supporting member 700 has a planetary gear accommodation space 740 formed between the front wall 710 and the rear wall 720 at a position corresponding to the front support hole 711 and the rear support hole 721 in the circumferential direction thereof.

The planetary gear accommodation space 740 has a radially inner portion opened inward so as to allow the planetary gear 45 to be engaged with the sun gear 42, and a radially outer portion opened outward so as to allow the planetary gear 45 to be inserted from radially outside into the planetary gear accommodation space 740.

Provision of the carrier supporting member 700 configured as described above makes it possible to improve the efficiency in assembling the planetary gear unit 40B.

A reference numeral 701 in FIG. 18 denotes a concave portion that is formed in the corresponding end surface of the carrier supporting member 700 so as to form the fluid pocket space 585.

Described next is the working vehicle 2A to which the traveling system transmission structure according to the present embodiment is applied.

The members same as those in the working vehicles 1A to 1C described in first embodiment are denoted by the same reference numerals, and description thereof will appropriately not be repeated in the present embodiment. Mainly described hereinafter are portions different from those of the working vehicles 1A to 1C.

As shown in FIGS. 11 and 12, similarly to the working vehicle 1A to 1C, the working vehicle 2A includes the driving power source 20 that functions as a power source for the constant-speed rotational power, the HST 30 that functions as a power source for the variable-speed rotational power, and the auxiliary pump 210 that is operatively driven by the rotational power from the driving power source 20.

As shown in FIG. 11, in the present embodiment, the auxiliary pump 210 is connected to the driving power source 20 so as to directly receive the rotational power from the driving power source 20.

As shown in FIG. 12, in the present embodiment, there are provided a forward-travel proportional solenoid valve 50OF and a rearward-travel proportional solenoid valve 500R in place of the single forward/rearward-travel solenoid valve 500 that can be selectively located at the forward-travel position, the rearward-travel position, or the interrupting position.

More specifically, as shown in FIG. 12, the forward-travel proportional solenoid valve 500F can be selectively located at a forward-travel-clutch engaged position or at a forward-travel-clutch released position. When being located at the forward-travel-clutch engaged position, the valve 500F fluidly connects the forward-travel-clutch supply/discharge line 420 to the forward/rearward-travel supply line 411. When being located at the forward-travel-clutch released position, the valve 500F closes the forward/rearward-travel supply line 411 and also fluidly connects the forward-travel-clutch supply/discharge line 420 to the forward/rearward-travel drain line 415.

As shown in FIG. 12, the rearward-travel proportional solenoid valve 500R can be selectively located at a rearward-travel-clutch engaged position or at a rearward-travel-clutch released position. When being located at the rearward-travel-clutch engaged position, the valve 500R fluidly connects the rearward-travel-clutch supply/discharge line 421 to the forward/rearward-travel supply line 411. When being located at the forward-travel-clutch released position, the valve 500R closes the forward/rearward-travel supply line 411 and also fluidly connects the rearward-travel-clutch supply/discharge line 421 to the forward/rearward-travel drain line 415.

As shown in FIG. 6, in the first embodiment, the auxiliary pump 210 is accommodated in the auxiliary pump support block 230 that is attached to the side wall of the transmission case 62. The forward/rearward-travel solenoid valve 500, the brake solenoid valve 900, the main relief valve 425 and the lubricant relief valve 435 are also accommodated in the auxiliary pump support block 230.

To the contrary, in the present embodiment, as already described, the auxiliary pump 210 is connected directly to the driving power source 20, and the forward-travel proportional solenoid valve 500F, the rearward-travel proportional solenoid valve 500R, the brake solenoid valve 900, the main relief valve 425 and the lubricant relief valve 435 are disposed away from the auxiliary pump 210.

Figure 19:
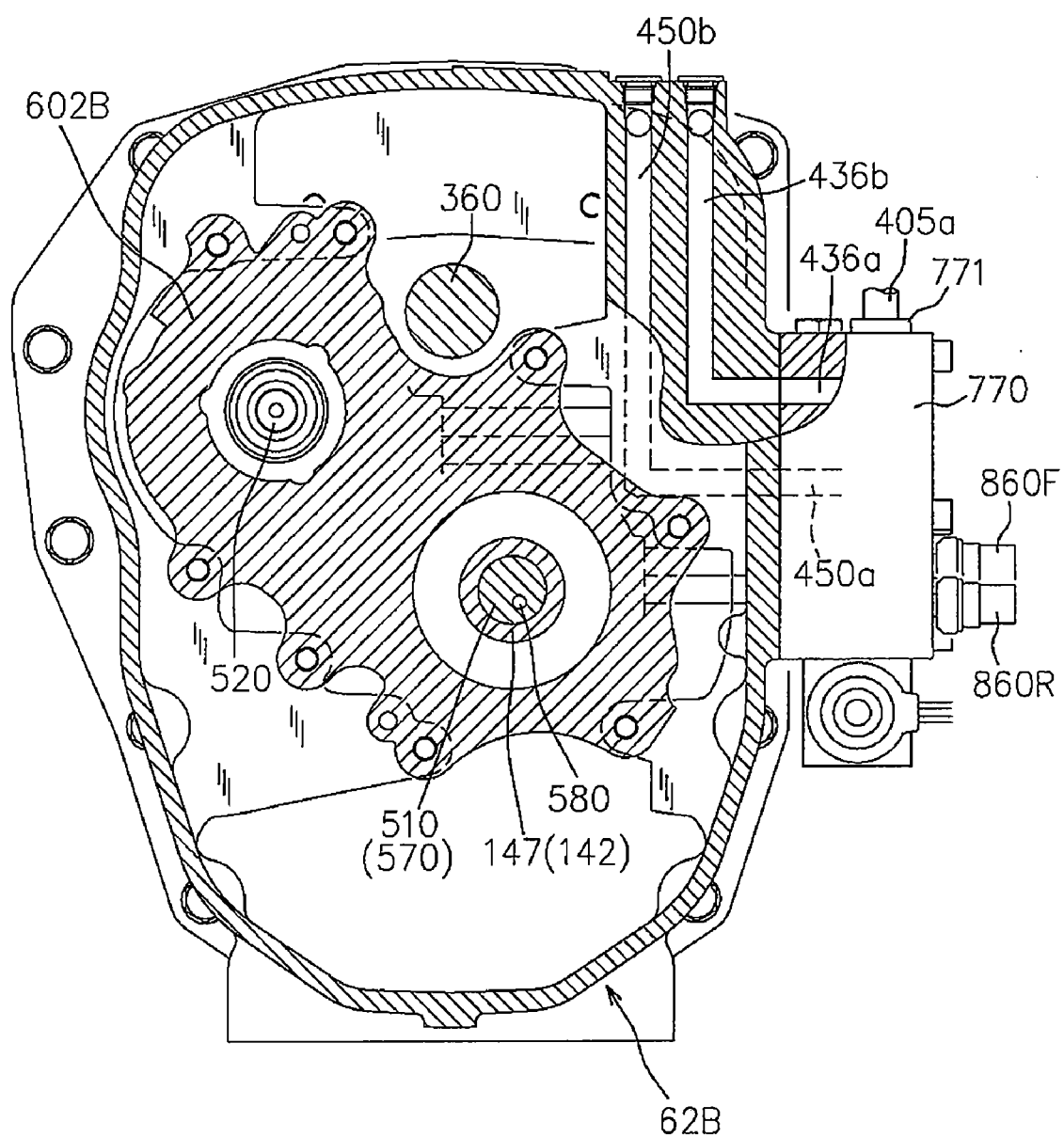
FIG. 19 is a cross-sectional view taken along line XIX-XIX indicated in FIG. 13.
Figure 20:
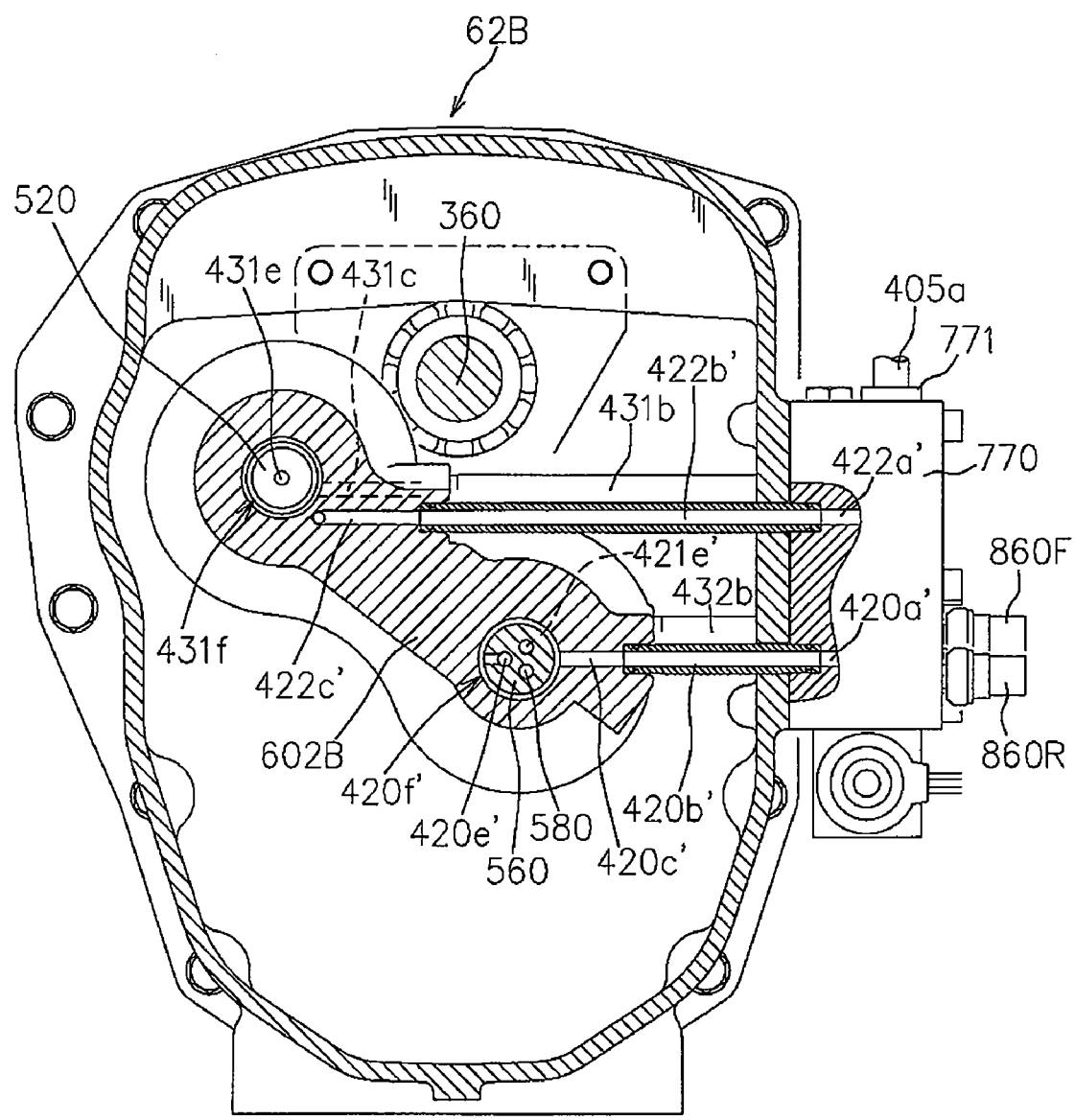
FIG. 20 is a cross-sectional view taken along line XX-XX indicated in FIG. 13.

FIGS. 19 and 20 are cross-sectional views taken along line XIX-XIX and line XX-XX indicated in FIG. 13, respectively.

As shown in FIGS. 19 and 20, in the present embodiment, there is a valve block 770 attached to a side wall of the transmission case 62B, and accommodated in the valve block 770 are the forward-travel proportional solenoid valve 500F, the rearward-travel proportional solenoid valve 500R, the brake solenoid valve 900, the main relief valve 425 and the lubricant relief valve 435.

As shown in FIGS. 12 and 19, in the present embodiment, the main supply line 405 has a main supply conduit 405a and a main supply fluid channel 405b. The main supply conduit 405a has a first end fluidly connected to the discharge side of the auxiliary pump 210 and a second end fluidly connected to a suction port of the valve block 770. The main supply fluid channel 405b is formed in the valve block 770 so as to have a first end fluidly connected to the suction port 771. The first supply line 410 and the second supply line 450 are branched from a second end of the main supply fluid channel 405b.

Similarly to first embodiment (see FIG. 3), in the present embodiment, as shown in FIG. 12, the drain fluid from the lubricant relief valve 435 is guided into the HST case 35 through a drain line 436, which effectively cools the HST 30.

Figure 21:
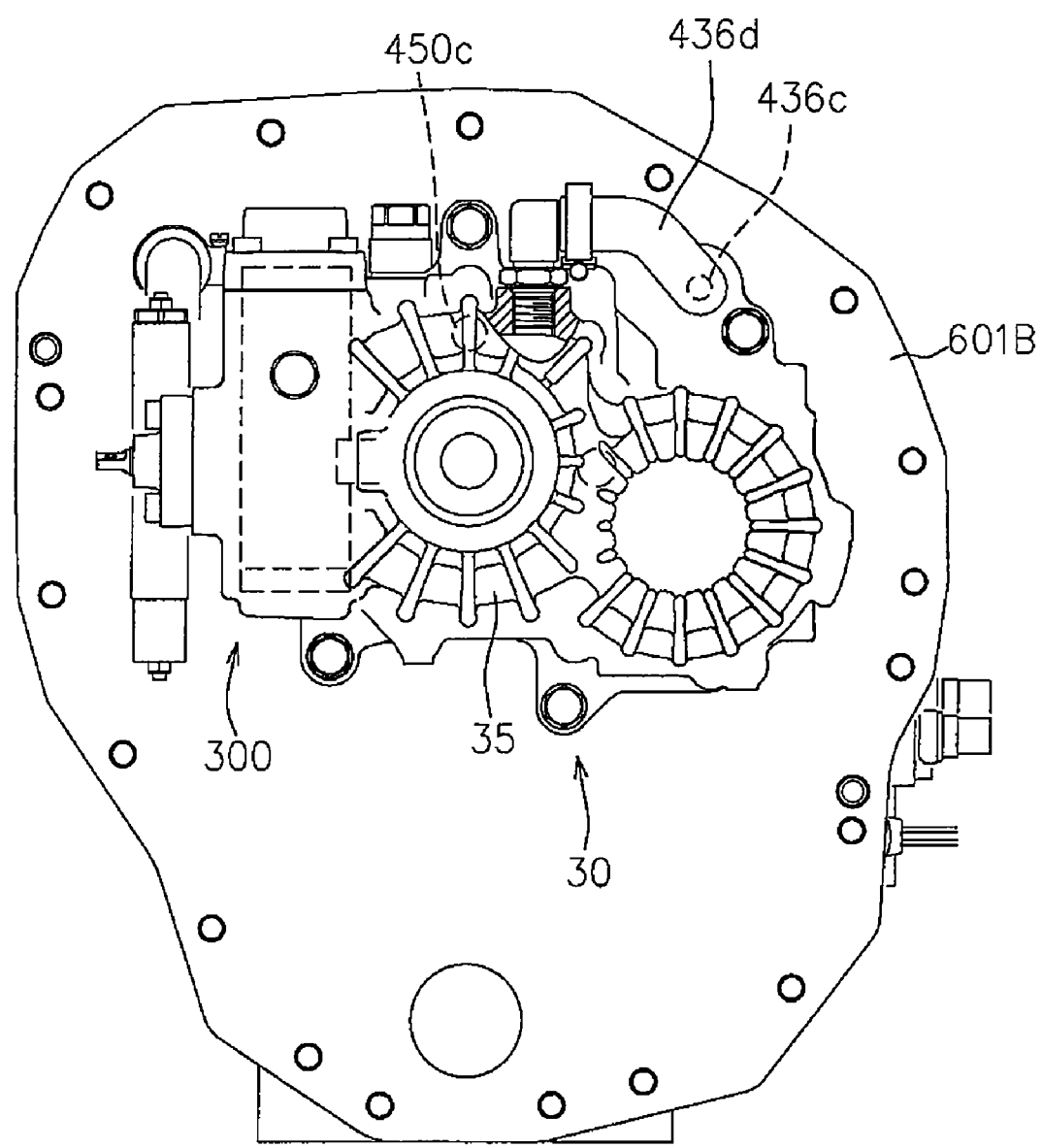
FIG. 21 is a cross-sectional view taken along line XXI-XXI indicated in FIG. 13.
Figure 22:
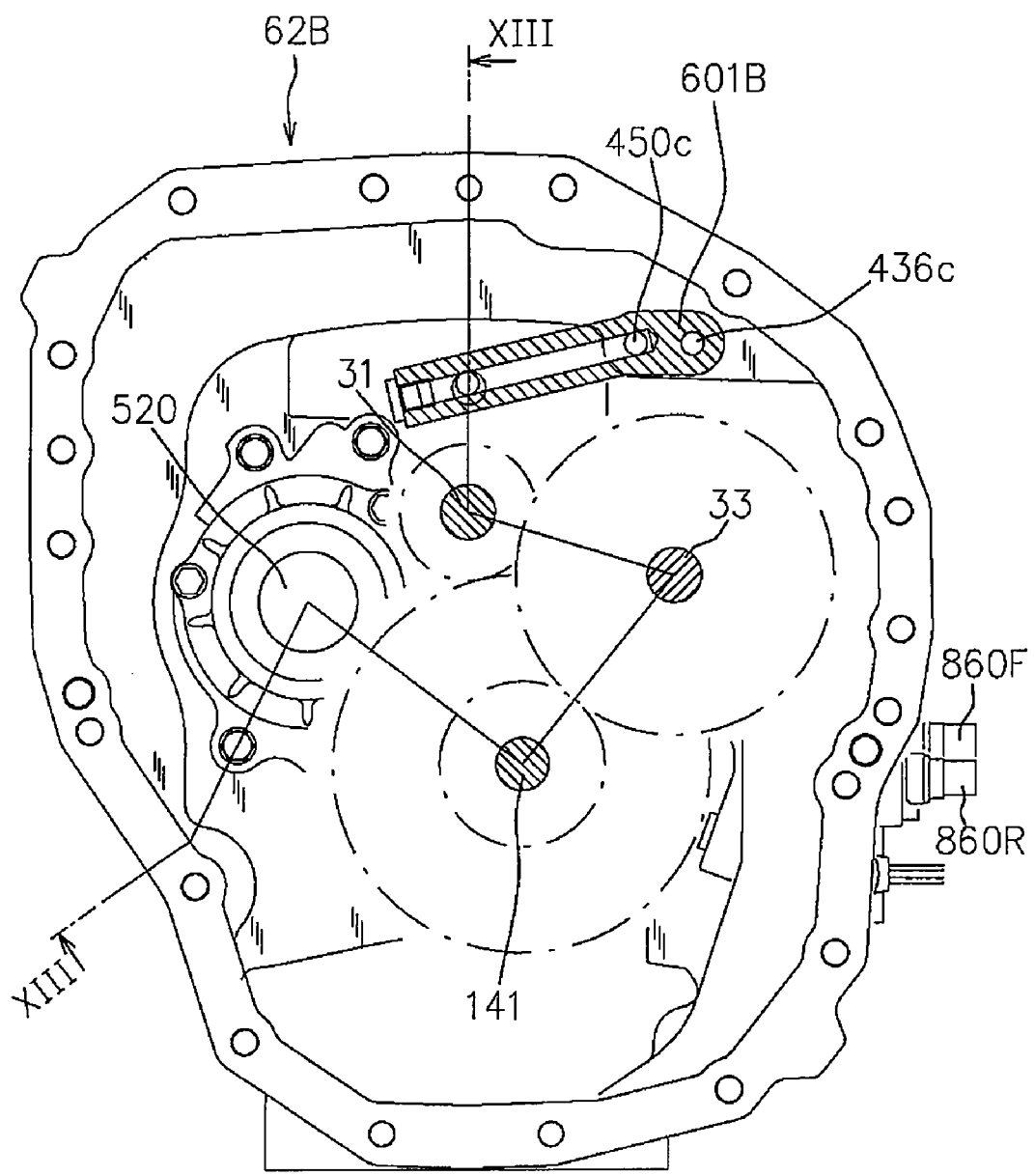
FIG. 22 is a cross-sectional view taken along line XXII-XXII indicated in FIG. 13.
Figure 23:
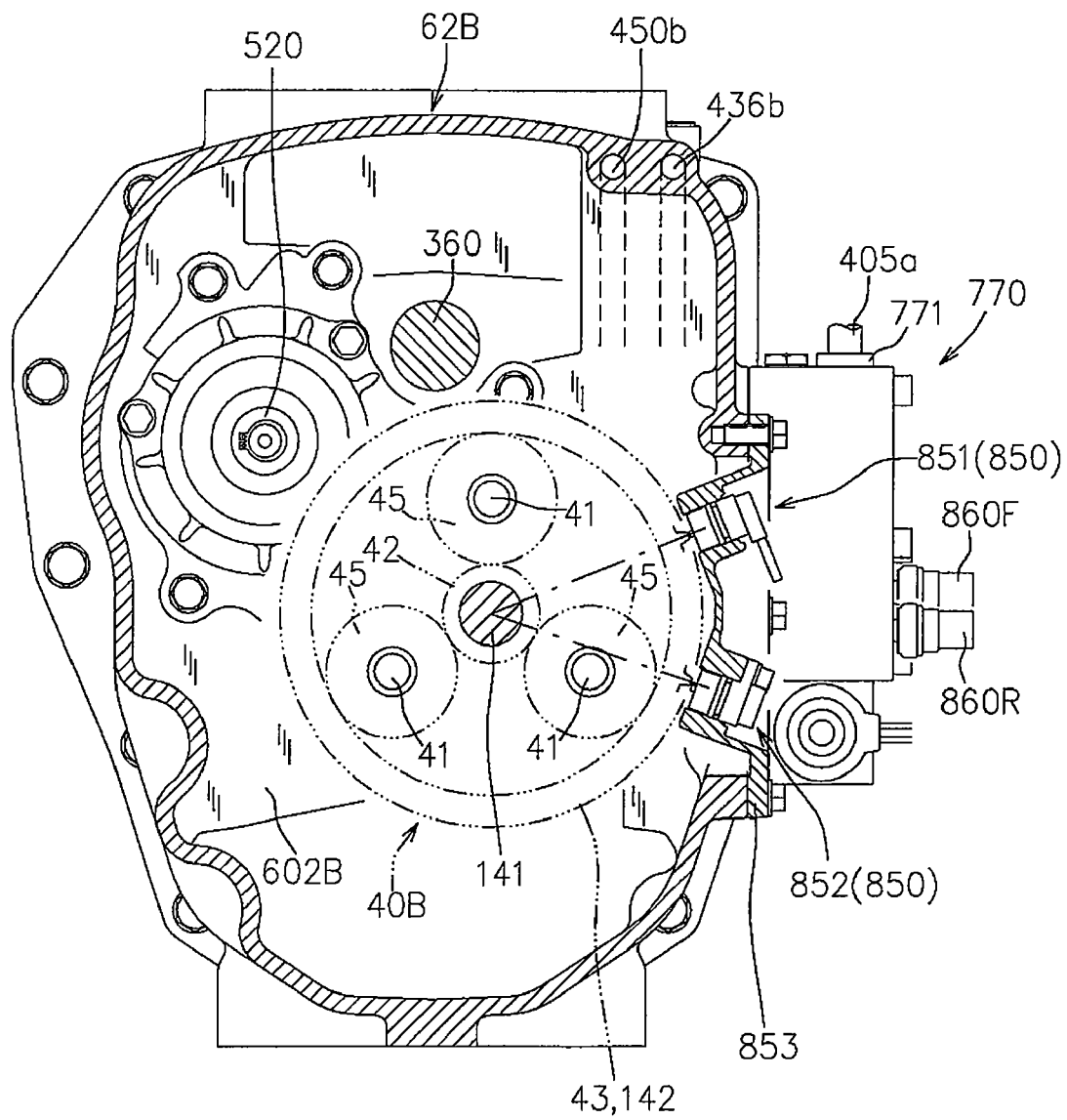
FIG. 23 is a cross-sectional view taken along line XXIII-XXIII indicated in FIG. 13.

FIGS. 21 to 23 are cross-sectional views taken along line XXI-XXI, line XXII-XXII, and line XXIII-XXIII indicated in FIG. 13, respectively.

It is noted that line XIII-XIII indicated in FIG. 22 is a development reference line for the developed cross-sectional view shown in FIG. 13.

As shown in FIGS. 19 and 21 to 23, the drain line 436 is configured so as to supply the drain fluid from the valve block 770 to the HST case 35 through the transmission case 62B.

More specifically, the drain line 436 has a valve-block-side drain fluid channel 436a, a transmission-case-side drain fluid channel 436b, a front-bearing-wall-side drain fluid channel 436c, and an internal drain conduit 436d. The valve-block-side drain fluid channel 436a is formed in the valve block 770 so as to have a first end fluidly connected to the drain port of the lubricant relief valve 435 and a second end opened at a surface in contact with the transmission case 62B (see FIG. 19). The transmission-case-side drain fluid channel 436b is formed in the peripheral wall of the transmission case 62B so as to have a first end opened at a surface in contact with the valve block 770 to be fluidly connected to the valve-block-side drain fluid channel 436a and a second end opened at a surface in contact with the front bearing wall 601B (see FIGS. 13, 19, and 23). The front-bearing-wall-side drain fluid channel 436c is formed in the front bearing wall 601B so as to have a first end opened at the rear end surface to be fluidly connected to the transmission-case-side drain fluid channel 436b and a second end opened at the front end surface (see FIG. 22). The internal drain conduit 436d has a first end fluidly connected to the front-bearing-wall-side drain fluid channel 436c and a second end fluidly connected into the HST case 35 (see FIG. 21).

As shown in FIGS. 12 and 13, the excessive fluid in the HST case 35 is discharged into the transmission case 62B though an discharge fluid channel 436e that is formed in the HST case 35 (more specifically, the center section configuring the HST case 35) and the front bearing wall 601B.

In the present embodiment, the second supply line 450 is fluidly connected to the charge line 460 and the servo line 470 via the valve block 770, the peripheral wall of the transmission case 62B, and the front bearing wall 601B.

More specifically, the second supply line 450 has a valve-block-side second supply fluid channel 450a, a transmission-case-side second supply fluid channel 450b, and a front-bearing-wall-side second supply fluid channel 450c. The valve-block-side second supply fluid channel 450a is formed in the valve block 770 so as to have a first end fluidly connected to the main supply line 405 and a second end opened at the surface in contact with the transmission case 62B (see FIG. 19). The transmission-case-side second supply fluid channel 450b is formed in the peripheral wall of the transmission case 62B so as to have a first end opened at the surface in contact with the valve block 770 to be fluidly connected to the valve-block-side second supply fluid channel 450a and a second end opened at the surface in contact with the front bearing wall 601B (see FIGS. 13, 19, and 23). The front-bearing-wall-side second supply fluid channel 450c is formed in the front bearing wall 601B so as to have a first end opened at the rear end surface to be fluidly connected to the transmission-case-side second supply fluid channel 450b and a second end opened at the front end surface (see FIGS. 13 and 22).

Figure 24:
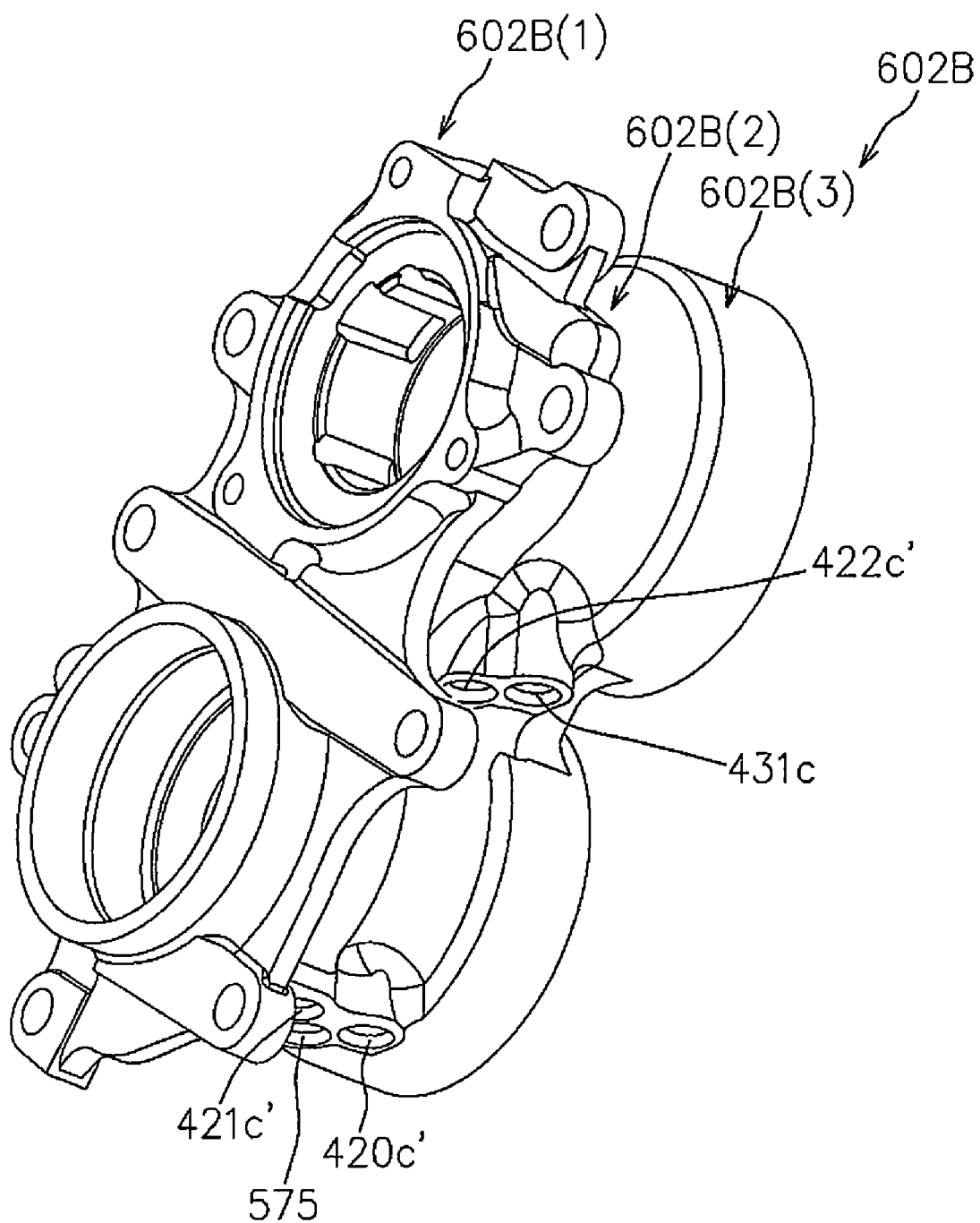
FIG. 24 is a perspective view of an intermediate bearing wall of the traveling system transmission structure according to the second embodiment.

FIG. 24 is a perspective view of the intermediate bearing wall 602B.

As shown in FIGS. 13, 20, and 24, in the present embodiment, the forward-travel-clutch supply/discharge line 420 has a valve-block-side forward-travel supply/discharge fluid channel 420a', an intermediate-bearing-wall-side forward-travel supply/discharge fluid channel 420c', a forward-travel internal conduit 420b', a forward-travel-clutch axial hole 420e', and a forward-travel-clutch rotary joint 420f. The valve-block-side forward-travel supply/discharge fluid channel 420a' is formed in the valve block 770 so as to have a first end fluidly connected to the secondary side of the forward-travel proportional solenoid valve 500F and a second end opened at the surface in contact with the transmission case 62B. The intermediate-bearing-wall-side forward-travel supply/discharge fluid channel 420c' has a first end opened at the outer surface of the intermediate bearing wall 602B and a second end opened in a bearing hole for supporting the clutch shaft 560. The forward-travel internal conduit 420b' is disposed in the transmission case 62B so as to fluidly connect the valve-block-side forward-travel supply/discharge fluid channel 420a' with the intermediate-bearing-wall-side forward-travel supply/discharge fluid channel 420c'. The forward-travel-clutch axial hole 420e' is formed in the clutch shaft 560. The forward-travel-clutch rotary joint 420f is formed at a contact portion between the intermediate bearing wall 602B and the clutch shaft 560 so as to fluidly connect the intermediate-bearing-wall-side forward-travel supply/discharge fluid channel 420c' with the forward-travel-clutch axial hole 420e'.

Similarly, the rearward-travel-clutch supply/discharge line 421 has a valve-block-side rearward-travel supply/discharge fluid channel, an intermediate-bearing-wall-side rearward-travel supply/discharge fluid channel 421c', a rearward-travel internal conduit, a rearward-travel-clutch axial hole 421e', and a rearward-travel-clutch rotary joint. The valve-block-side rearward-travel supply/discharge fluid channel is formed in the valve block 770 so as to have a first end fluidly connected to the secondary side of the rearward-travel proportional solenoid valve 500R and a second end opened at the surface in contact with the transmission case 62B. The intermediate-bearing-wall-side rearward-travel supply/discharge fluid channel 421c' has a first end opened at the outer surface of the intermediate bearing wall 602B and a second end opened at the bearing hole for supporting the clutch shaft 560 (see FIG. 24). The rearward-travel internal conduit is disposed in the transmission case 62B so as to fluidly connect the valve-block-side rearward-travel supply/discharge fluid channel with the intermediate-bearing-wall-side rearward-travel supply/discharge fluid channel 421c'. The rearward-travel-clutch axial hole 421e' is formed in the clutch shaft 560 (see FIGS. 13 and 20). The rearward-travel-clutch rotary joint is formed at the contact portion between the intermediate bearing wall 602B and the clutch shaft 560 so as to fluidly connect the intermediate-bearing-wall-side rearward-travel supply/discharge fluid channel 421c' with the rearward-travel-clutch axial hole 421e'.

As shown in FIGS. 13, 20, and 24, the brake supply/discharge line 422 has a valve-block-side brake supply/discharge fluid channel 422a', an intermediate-bearing-wall-side brake supply/discharge fluid channel 422c', and a brake internal conduit 422b'. The valve-block-side brake supply/discharge fluid channel 422a' is formed in the valve block 770 so as to have a first end fluidly connected to the secondary side of the brake solenoid valve 900 and a second end opened at the surface in contact with the transmission case 62B. The intermediate-bearing-wall-side brake supply/discharge fluid channel 422c' has a first end opened at the outer surface of the intermediate bearing wall 602B and a second end fluidly connected to the hydraulic brake unit 90. The brake internal conduit 422b' is disposed in the transmission case 62B so as to fluidly connect the valve-block-side brake supply/discharge fluid channel 422a' with the intermediate-bearing-wall-side brake supply/discharge fluid channel 422c'.

As shown in FIG. 12, in the present embodiment, the lubricant line 430 is branched into a forward/rearward-travel lubricant line 432 and a brake lubricant line 431 inside the valve block 770.

The forward/rearward-travel lubricant line 432 has a valve-block-side forward/rearward-travel lubricant fluid channel, the intermediate-bearing-wall-side forward/rearward-travel lubricant fluid channel 575, a forward/rearward-travel lubricant internal conduit 432b, the forward/rearward-travel lubricant fluid supply channel 580, and the forward/rearward-travel lubricant rotary joint 576. The valve-block-side forward/rearward-travel lubricant fluid channel is formed in the valve block 770 so as to have a first end fluidly connected to the lubricant line 430 and a second end opened at the surface in contact with the transmission case 62B. The intermediate-bearing-wall-side forward/rearward-travel lubricant fluid channel 575 has a first end opened at the outer surface of the intermediate bearing wall 602B and a second end opened at the bearing hole for supporting the clutch shaft 560 (see FIG. 17). The forward/rearward-travel lubricant internal conduit 432b is disposed in the transmission case 62B so as to fluidly connect the valve-block-side forward/rearward-travel lubricant fluid channel with the intermediate-bearing-wall-side forward/rearward-travel lubricant fluid channel 575 (see FIG. 17). The forward/rearward-travel lubricant fluid supply channel 580 is formed in the clutch shaft 560 (see FIGS. 17, 19, and 20). The forward/rearward-travel lubricant rotary joint 576 is formed at the contact portion between the intermediate bearing wall 602B and the clutch shaft 560 so as to fluidly connect the intermediate-bearing-wall-side forward/rearward-travel lubricant fluid channel 575 with the forward/rearward-travel lubricant fluid supply channel 580 (see FIG. 17).

The brake lubricant line 431 has a valve-block-side brake lubricant fluid channel, an intermediate-bearing-wall-side brake lubricant fluid channel 431c, a brake lubricant internal conduit 431b, a brake lubricant fluid supply channel 431e, and a brake lubricant rotary joint 431f. The valve-block-side brake lubricant fluid channel is formed in the valve block 770 so as to have a first end fluidly connected to the lubricant line 430 and a second end opened at the surface in contact with the transmission case 62B. The intermediate-bearing-wall-side brake lubricant fluid channel 431c has a first end opened at the outer surface of the intermediate bearing wall 602B and a second end opened at the bearing hole for supporting the forward/rearward-travel output shaft 520 (see FIG. 20). The brake lubricant internal conduit 431b is disposed in the transmission case 62B so as to fluidly connect the valve-block-side brake lubricant fluid channel with the intermediate-bearing-wall-side brake lubricant fluid channel 431c (see FIG. 20). The brake lubricant fluid supply channel 431e is formed in the forward/rearward-travel output shaft 520 (see FIGS. 13 and 20). The brake lubricant rotary joint 431f is formed at the contact portion between the intermediate bearing wall 602B and the forward/rearward-travel output shaft 520 so as to fluidly connect the intermediate-bearing-wall-side brake lubricant fluid channel 431c with the brake lubricant fluid supply channel 431e.

In the present embodiment, similarly to the first embodiment, the planetary outputting member 142 of the planetary gear unit 40B is shifted from the substantially non-output state to the maximum output state as the HST 30 is shifted from the first maximum output state of outputting the rotational power that has the maximum rotational speed in one of the normal and reverse directions to the second maximum output state of outputting the rotational power that has a maximum rotational speed in the other one of the normal and reverse directions. Moreover, the control unit 80 locates the brake solenoid valve 900 at the brake actuating position upon determination that the HST 30 is in the power-neutral output state.

Generally, the HST 30 and the planetary gear unit 40B are set so that the HST 30 outputs such a rotational power as to allow the output of the planetary outputting member 142 to be equal to zero at the time when the movable swash plate of the HST 30 is located at a vehicle stop reference position that is slightly displaced toward the neutral position from a first maximum slanting position in one of the normal and reverse directions.

Under the above conditions, in a case where the output from the planetary outputting member 142 is not equal to zero despite the fact that the speed-change operating member 71 is located at the neutral position (the vehicle stop position), the control unit 80 performs vehicle stop control of slanting the movable swash plate from the vehicle stop reference position in such a direction as to cause the output of the planetary outputting member 142 to be equal to zero.

As shown in FIG. 23, there is thus provided a planetary output sensor 850 for detecting the rotational direction and the rotational speed of the planetary outputting member 142. When the speed-change operating member 71 is located at the neutral position, the control unit 80 controls the movable swash plate so as to be located at the vehicle stop reference position, and subsequently performs vehicle stop control by slightly adjusting the movable swash plate into any one of the normal and reverse directions from the vehicle stop reference position based on a signal transmitted from the planetary output sensor 850.

In this regard, in the present embodiment and the first embodiment, the control unit 80 locates the brake solenoid valve 900 at the brake actuating position upon determination that the HST 30 is in the power-neutral output state. Therefore, the vehicle can be reliably stopped without necessity of increasing accuracy of vehicle stop control by the control unit 80.

As exemplified in FIG. 23, the planetary output sensor 850 for detecting a rotational direction and a rotational speed can be embodied by two rotational pickups 851 and 852, which are disposed to have detection timings different from each other for detecting the detected position of the planetary outputting member 142. These rotational pickups 851 and 852 may be supported by a common lid 853 that closes the opening formed in the side wall of the transmission case 62B.

FIGS. 25A to 25D are graphs for exemplarily describing the vehicle travel-direction switch control method that is applicable to the traveling system transmission structure according to the present embodiment as well as according to the first embodiment.

Indicated in FIGS. 25A to 25D are the relationship between time and the operating position of the speed-change operating member 71, the relationship between time and the angle of the movable swash plate of the HST, the relationship between time and the clutch pressure of the forward/rearward-travel switch unit 50 or 50B, and the relationship between time and the vehicle traveling speed, respectively.

As already described, the control unit 80 operates, based on signals from the speed-change operating-position detecting member 810 and the HST operating-state detecting member 815, the servo solenoid valve 350 so that the movable swash plate is slanted at a slanting angle corresponding to the operating position of the speed-change operating member 71 (hereinafter, referred to as ordinary swash plate control). The servo solenoid valve 350 in the present embodiment is of the proportional solenoid type.

Upon performing the ordinary swash plate control in a case where the speed-change operating member 71 is manipulated from the forward-travel side to the rearward-travel side through a neutral position N (or in a case where the speed-change operating member 71 is manipulated from the rearward-travel side to the forward-travel side via the neutral position N), the swash plate being slanted at the forward-travel side (the rearward-travel side) is moved to the vehicle stop reference position (see FIG. 25B) to be located at the time when the speed-change operating member 71 is located at the neutral position, and is then slanted to the rearward-travel side (the forward-travel side).

In other words, if the ordinary swash plate control is performed in the case where the speed-change operating member 71 is manipulated from one of the forward-travel side and the rearward-travel side to the other one thereof through the neutral position N located therebetween, the planetary outputting member 142 is shifted from one of a forward-travel power output state and a rearward-travel power output state to the other one thereof through the non-output state. In this case, there tends to be caused a time-lag in switch of the vehicle travel direction.

In view of the above, in the vehicle travel-direction switch control method shown in FIGS. 25A to 25D is configured so that the control unit 80 performs a swash plate control for travel-direction switch, instead of the ordinary swash plate control, when the speed-change operating member 71 is manipulated from one of the forward-travel side and the rearward-travel side to the other one thereof via the neutral position N.

Figure 25A:
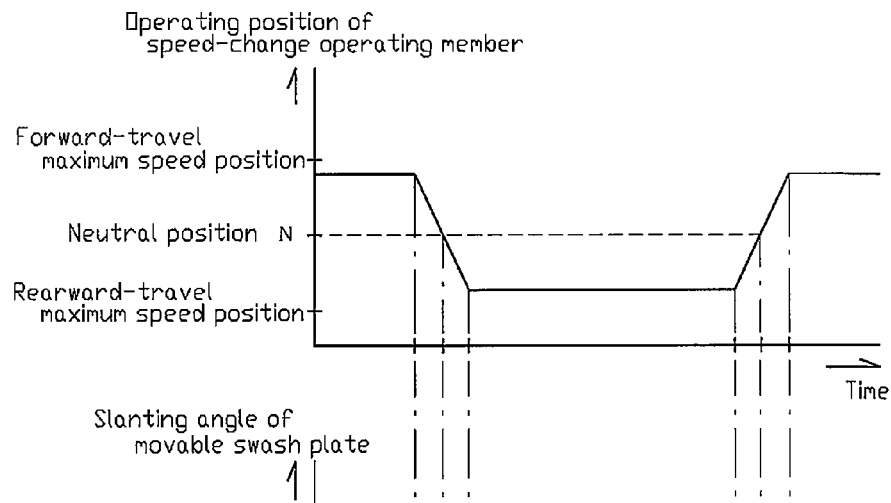
FIGS. 25A to 25D are graphs for exemplarily describing a vehicle travel-direction switch control method that is applicable to the traveling system transmission structure according to the first and second embodiments.
Figure 25B:
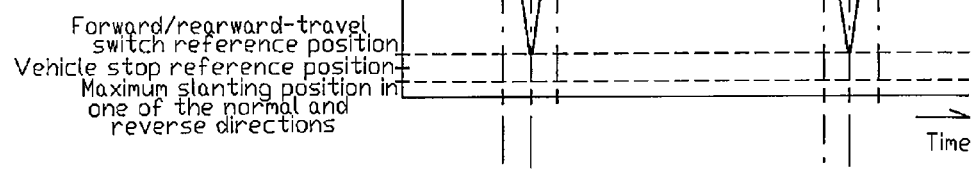

As shown in FIG. 25B, in the swash plate control for travel-direction switch, when the speed-change operating member 71 is manipulated from one of the forward-travel side and the rearward-travel side to the other one thereof via the neutral position N, the control unit 80 operates the servo solenoid valve 350 so that the movable swash plate is slanted from a slanting position A1 corresponding to the operating position of the speed-change operating member 71 prior to manipulation thereof into one of the normal and reverse directions only to a forward/rearward-travel switch reference position that is displaced into the other one of the normal and reverse directions from the vehicle stop reference position, and is subsequently slanted in the other one of the normal and reverse directions to a slanting position A2 corresponding to the operating position of the speed-change operating member 71 after manipulation thereof (see FIG. 25B).

In other words, in the swash plate control for travel-direction switch, upon manipulation of the speed-change operating member 71 from the forward-travel side (the rearward-travel side) to the rearward-travel side (the forward-travel side), the speed of output of the planetary outputting member 142 is reduced, from a speed corresponding to the operating position of the speed-change operating member 71 prior to manipulation thereof, not to zero but only to a predetermined speed corresponding to the forward/rearward-travel switch reference position. Thereafter, the speed is increased to a speed corresponding to the operating position of the speed-change operating member 71 after manipulation thereof.

The forward/rearward-travel switch reference position is set such that the output of the HST at the time when the movable swash plate is located at the forward/rearward-travel switch reference position is fallen within the range of the power-neutral output state.

Accordingly, upon manipulation of the speed-change operating member 71 from the forward-travel side (the rearward-travel side) to the rearward-travel side (the forward-travel side), at least within a predetermined period of time from a time point when the speed of output of the planetary outputting member 142 is reduced to the predetermined value corresponding to the forward/rearward-travel switch reference position, the control unit 80 performs power neutral control of locating the brake solenoid valve 900 at the brake actuating position, so that the braking force is applied to the driving wheels in a creeping state (in a state slightly before rotation thereof is stopped).

As described above, upon manipulation of the speed-change operating member 71 from the forward-travel side (the rearward-travel side) to the rearward-travel side (the forward-travel side), the speed of output of the planetary outputting member 142 is reduced only to the predetermined value corresponding to the forward/rearward-travel switch reference position. In comparison with a case of reducing the speed of output of the planetary outputting member 142 to be equal to zero, the above configuration makes it possible to more quickly increase the speed of output of the planetary outputting member 142 to the value corresponding to the operating position of the speed-change operating member 71 after manipulation thereof.

Figure 25C:
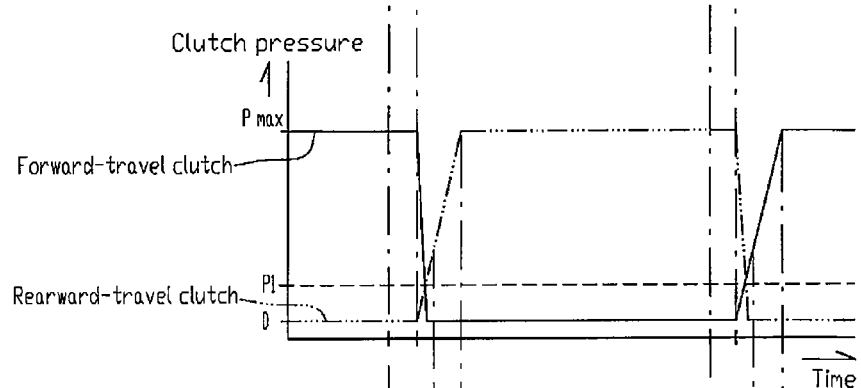
Figure 25D:
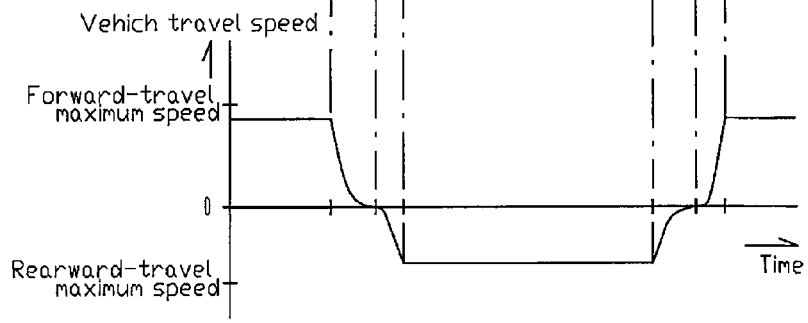

As shown in FIGS. 25B and 25C, in the present embodiment, upon the swash plate being located at the forward/rearward-travel switch reference position in accordance with manipulation of the speed-change operating member 71 from the forward-travel side (the rearward-travel side) to the rearward-travel side (the forward-travel side), the hydraulic pressure of the forward-travel hydraulic clutch 53 (the rearward-travel hydraulic clutch 55) starts to be reduced and the hydraulic pressure of the rearward-travel hydraulic clutch 55 (the forward-travel hydraulic clutch 53) starts to be increased.

Switching from the forward-travel side (the rearward-travel side) to the rearward-travel side (the forward-travel side) is completed, in the course of being increased up to a preliminarily set value, at a time point when the hydraulic pressure of the rearward-travel hydraulic clutch 55 (the forward-travel hydraulic clutch 53) to be subsequently engaged exceeds the reducing hydraulic pressure of the forward-travel hydraulic clutch 53 (the rearward-travel hydraulic clutch 55) having been engaged.

Upon completion of switching the forward/rearward-travel switch unit, the swash plate is already slanted by a predetermined angle into the other one of the normal and reverse directions from the forward/rearward-travel switch reference position. There is thus generated an impact upon completion of switching the forward/rearward-travel switch unit. However, such an impact is absorbed by both of the forward-travel hydraulic clutch 53 and the rearward-travel hydraulic clutch 55 in the forward/rearward-travel switch unit 50 being double-engaged while being slipped in a state where the output of the planetary outputting member 142 is low.

More specifically, as shown in FIGS. 12, and 19 to 23, the traveling system transmission structure is further provided with a forward-travel clutch-pressure sensor 860F and a rearward-travel clutch-pressure sensor 860R for detecting hydraulic pressures of the forward-travel-clutch supply/discharge line 420 and the rearward-travel-clutch supply/discharge line 421, respectively.

As shown in FIG. 25C, the control unit 80 operates the forward-travel proportional solenoid valve 500F and the rearward-travel proportional solenoid valve 500R so that the clutch pressure of the hydraulic clutch to be subsequently engaged starts to be increased while the clutch pressure of the hydraulic clutch being engaged and to be disengaged starts to be reduced upon the movable swash plate reaching the forward/rearward-travel switch reference position, as well as so that the clutch pressures of the two hydraulic clutches are equal to each other at a predetermined hydraulic pressure P1 (0 □ P1 □ maximum clutch pressure Pmax) upon the movable swash plate being slanted by a predetermined angle in the other one of the normal and reverse directions from the forward/rearward-travel switch reference position.

According to the configuration, the rotational power in the forward-travel direction transmitted from the planetary outputting member 142 to the forward/rearward-travel output shaft 520 via the forward-travel hydraulic clutch 53 and the rotational power in the rearward-travel direction transmitted from the planetary outputting member 142 to the forward/rearward-travel output shaft 520 via the rearward-travel hydraulic clutch 55 are counteracted to each other. Therefore, the travel direction of the working vehicle can be switched smoothly without causing the output of the planetary outputting member 142 to be zero at the time when the speed-change operating member 71 is operated from the forward-travel side (the rearward-travel side) to the rearward-travel side (the forward-travel side).

What is claimed is:

1. A traveling system transmission structure for a vehicle comprising a planetary gear unit that has a first component and a second component for respectively receiving a constant-speed rotational power and a variable-speed rotational power and also has a third component for outputting a combined rotational power formed by combining the rotational powers of the first and second components, a forward/rearward-travel switch unit that operatively receives the combined rotational power outputted from the third component, and a transmission case that accommodates the planetary gear unit and the forward/rearward-travel switch unit, the traveling system transmission structure being characterized in that, the transmission case has a front opening that is provided on a front side and has such a size as to allow the planetary gear unit to be inserted therethrough, a rear opening that is provided on a rear side and has such a size as to allow the forward/rearward-travel switch unit to be inserted therethrough, and an intermediate bearing wall that is provided at an intermediate portion in a fore-and-aft direction, the planetary gear unit has a sun gear shaft that supports a sun gear in a relatively non-rotatable manner with respect thereto, the sun gear functioning as one of the first and second components, and a planetary outputting member that is connected to the third component in a relatively non-rotatable manner with respect thereto about an axis line of the planetary gear unit, the forward/rearward-travel switch unit has a forward/rearward-travel input shaft that operatively receives the combined rotational power, a forward/rearward-travel output shaft that outputs the rotational power to a travel unit, a forward/rearward-travel clutch mechanism capable of changing the rotational direction of the rotational power transmitted from the forward/rearward-travel input shaft to the forward/rearward-travel output shaft, and a clutch shaft that is disposed coaxially with the forward/rearward-travel input shaft and supports the forward/rearward-travel clutch mechanism, a front end portion of the sun gear shaft is directly or indirectly supported in a rotatable manner around the axis line by a front bearing wall that is detachably connected to a front side of the transmission case and a rear end portion of the planetary outputting member is directly or indirectly supported in a rotatable manner around the axis line by the intermediate bearing wall, so that the planetary gear unit is accommodated in a front chamber that is sandwiched by the front bearing wall and the intermediate bearing wall, a front end portion of the forward/rearward-travel input shaft is directly or indirectly supported by the intermediate bearing wall in a rotatable manner around the axis line in a state of being connected to the planetary outputting member so as to be relatively non-rotatable with respect thereto about the axis line and a rear end portion of the clutch shaft is supported in a rotatable manner around the axis line by a rear bearing wall that is detachably connected to the rear side of the transmission case, so that the forward/rearward-travel switch unit is accommodated in a rear chamber that is sandwiched by the intermediate bearing wall and the rear bearing wall.

2. A traveling system transmission structure for a vehicle according to claim 1, wherein the planetary output shaft has a connecting portion that is connected to the third component, and a hollow cylindrical portion that extends from the connecting portion toward the forward/rearward-travel switch unit and is directly or indirectly supported by the intermediate bearing wall, the front end portion of the forward/rearward-travel input shaft is fitted into the cylindrical portion from the rear side of the cylindrical portion so as to be relatively non-rotatable with respect thereto about the axis line, and the sun gear shaft has a rear end portion that inserts into the cylindrical portion via the front end of the cylindrical portion to face a front end of the forward/rearward-travel input shaft and is supported by the cylindrical portion in a relatively rotatable manner with respect thereto about the axis line.

3. A traveling system transmission structure for a vehicle according to claim 2, wherein the forward/rearward-travel clutch mechanism is of a hydraulic clutch type, the clutch shaft is formed with a forward/rearward-travel lubricant fluid supply channel for guiding lubricant fluid from a fluid source to the forward/rearward-travel clutch mechanism, the forward/rearward-travel input shaft is formed with a lubricant fluid connective channel that has a front end opened at the front end surface of the forward/rearward-travel input shaft inside the cylindrical portion in a state of being fluidly connected to the forward/rearward-travel lubricant fluid supply channel, the sun gear shaft is formed with a lubricant fluid introductive channel that has a rear end opened at the rear end surface of the sun gear shaft inside the cylindrical portion, and the lubricant fluid is introduced from the front end of the lubricant fluid connective channel to the rear end of the lubricant fluid introductive channel through the cylindrical portion.

4. A traveling system transmission structure for a vehicle according to claim 3, wherein the forward/rearward-travel input shaft and the clutch shaft are formed integrally with each other by a single shaft, the intermediate bearing wall includes a planetary-gear-unit-side support region that supports the cylindrical portion via a bearing member, a forward/rearward-travel-switch-unit-side support region that supports the single shaft via a bearing member, and an intermediate region that is located between the planetary-gear-unit-side support region and the forward/rearward-travel-switch-unit-side support region, and the intermediate region is formed with a forward/rearward-travel lubricant rotary joint that fluidly connects an intermediate-bearing-wall-side forward/rearward-travel lubricant fluid channel, which is formed in the intermediate bearing wall, with the forward/rearward-travel lubricant fluid supply channel or the lubricant fluid connective channel.

5. A traveling system transmission structure for a vehicle according to claim 3, wherein the planetary gear unit has a carrier that support a planetary gear, which engages with the sun gear, in a rotatable manner around the axis line and revolve about the sun gear together with the planetary gear, the carrier functioning as one of the first to third components; an internal gear that is provided with an internal teeth in engagement with the planetary gear and functions as the other one of the first to third components; a carrier supporting member that supports the carrier so as to be rotated about the sun gear together with the carrier; and a rotational power input gear that is connected to one of the carrier supporting member and the internal gear so as to transmit the constant-speed rotational power or the variable-speed rotational power to the same one of the carrier supporting member and the internal gear, the rotational power input gear being supported by the sun gear shaft in a relatively rotatable manner with respect thereto, the carrier supporting member has a front wall that is provided with a front support hole for supporting a front end of the carrier and a central opening for allowing the sun gear shaft to be inserted therethrough, a rear wall that is provided with a rear support hole for supporting the rear end of the carrier and a central opening for allowing the sun gear shaft to be inserted therethrough, and a connecting portion for connecting the front wall with the rear wall, a fluid pocket space is provided in at least one of between the front wall and the rotational power input gear and between the rear wall and the planetary outputting member so as to radially extend with the sun gear shaft as a reference, the fluid pocket space having a radially inner portion opened toward the outer peripheral surface of the sun gear shaft and a radially outer portion opened toward the corresponding end of the carrier, the sun gear shaft is formed with a carrier lubricant fluid distributive channel that has a first end fluidly connected to the lubricant fluid introductive channel and a second end opened at the outer peripheral surface of the sun gear shaft so as to be directed to the fluid pocket space, and the carrier is formed with a planetary gear lubricant fluid channel having a first end opened at an end of the carrier that faces the fluid pocket space and a second end opened at the outer surface of a portion of the carrier that supports the planetary gear.

6. A traveling system transmission structure for a vehicle according to claim 5, wherein the radially inner portion of the fluid pocket space is opened toward the outer peripheral surface of the sun gear shaft over an entire region in a circumferential direction.

7. A traveling system transmission structure for a vehicle according to claim 5, wherein the front wall, the rear wall and the connecting portion are formed integrally together such that the carrier supporting member has a planetary gear accommodation space that is sandwiched by the front wall and the rear wall and is located at a position corresponding to the front support hole and the rear support hole in the circumferential direction, and the planetary gear accommodation space has a radially inner portion opened inward so as to allow the planetary gear to be engaged with the sun gear, and a radially outer portion opened outward so as to allow the planetary gear to be inserted from radially outside into the planetary gear accommodation space.

* * * * *